US012552013B2

(12) United States Patent
Allen

(10) Patent No.: US 12,552,013 B2
(45) Date of Patent: Feb. 17, 2026

(54) SYSTEMS AND METHODS FOR PROVIDING DETECTION PROCESSING WITH VELOCITY MATCHING

(71) Applicant: Berkshire Grey Operating Company, Inc., Bedford, MA (US)

(72) Inventor: Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 666 days.

(21) Appl. No.: 17/964,661

(22) Filed: Oct. 12, 2022

(65) Prior Publication Data

US 2023/0123724 A1 Apr. 20, 2023

Related U.S. Application Data

(60) Provisional application No. 63/256,392, filed on Oct. 15, 2021.

(51) Int. Cl.
*B25J 9/00* (2006.01)
*B07C 3/06* (2006.01)
(Continued)

(52) U.S. Cl.
CPC ............. *B25J 9/0093* (2013.01); *B07C 3/06* (2013.01); *B07C 3/08* (2013.01); *B07C 5/36* (2013.01);
(Continued)

(58) Field of Classification Search
CPC .. B65G 1/1371; B65G 1/1376; B65G 1/1378; B65G 15/30; B65G 47/04; B65G 47/962;
(Continued)

(56) References Cited

U.S. PATENT DOCUMENTS

| 3,734,286 A | 5/1973 | Simjian |
| 4,031,998 A * | 6/1977 | Suzuki ................. B65G 47/962 198/802 |

(Continued)

FOREIGN PATENT DOCUMENTS

| AU | 2006204622 A1 | 3/2007 |
| CA | 2985166 A1 | 12/2016 |

(Continued)

OTHER PUBLICATIONS

International Preliminary Report on Patentability issued by the International Bureau of WIPO in related international application No. PCT/US2022/046448 on Apr. 16, 2024, 9 pages.

(Continued)

*Primary Examiner* — Thomas Randazzo
(74) *Attorney, Agent, or Firm* — Gesmer Updegrove LLP

(57) ABSTRACT

A dynamic movement analytics system is disclosed that includes a programmable motion device including an end-effector, and a perception transfer system for receiving an object from the end-effector and for moving the object toward a distribution conveyance system moving in a first direction at a first speed. The perception transfer system includes at least one perception system for providing perception data regarding any of weight, shape, pose authority, position authority or identity information regarding the object and for moving the object along the first direction at the first speed for transferring the object to the distribution conveyance system.

24 Claims, 39 Drawing Sheets

(51) Int. Cl.
| | |
|---|---|
| *B07C 3/08* | (2006.01) |
| *B07C 5/36* | (2006.01) |
| *B25J 9/16* | (2006.01) |
| *B65G 1/137* | (2006.01) |
| *B65G 15/30* | (2006.01) |
| *B65G 47/04* | (2006.01) |
| *B65G 47/48* | (2006.01) |
| *B65G 47/96* | (2006.01) |
| *G05B 19/418* | (2006.01) |
| *G06Q 10/0833* | (2023.01) |

(52) U.S. Cl.
CPC ........... *B25J 9/1602* (2013.01); *B25J 9/1653* (2013.01); *B25J 9/1669* (2013.01); *B25J 9/1679* (2013.01); *B65G 1/1371* (2013.01); *B65G 1/1376* (2013.01); *B65G 1/1378* (2013.01); *B65G 15/30* (2013.01); *B65G 47/04* (2013.01); *B65G 47/485* (2013.01); *B65G 47/962* (2013.01); *G05B 19/4182* (2013.01); *G06Q 10/0833* (2013.01); *B07C 2501/0063* (2013.01); *B65G 2203/0233* (2013.01); *B65G 2203/0258* (2013.01); *B65G 2203/046* (2013.01); *G05B 2219/45047* (2013.01)

(58) Field of Classification Search
CPC .... B65G 2203/0233; B65G 2203/0258; B65G 2203/046; B65G 47/485; B25J 9/0093; B25J 9/1602; B25J 9/1653; B25J 9/1669; B25J 9/1679; G05B 19/4182; G05B 2219/39106; G05B 2219/45047; G06Q 10/0833; B07C 2501/0063; B07C 5/36; B07C 3/06; B07C 3/08
See application file for complete search history.

(56) References Cited

U.S. PATENT DOCUMENTS

| | | | |
|---|---|---|---|
| 4,722,653 A | 2/1988 | Williams et al. | |
| 4,819,784 A | 4/1989 | Sticht | |
| 4,846,335 A | 7/1989 | Hartlepp | |
| 4,895,242 A | 1/1990 | Michel | |
| 6,011,998 A | 1/2000 | Lichti et al. | |
| 6,079,570 A | 6/2000 | Oppliger et al. | |
| 6,179,129 B1* | 1/2001 | Powell, Jr. ............ B07C 5/3422 | 209/912 |
| 6,390,756 B1 | 5/2002 | Isaacs et al. | |
| 6,685,031 B2 | 2/2004 | Takizawa | |
| 6,762,382 B1* | 7/2004 | Danelski ............... B65G 17/002 | 209/912 |
| 8,952,284 B1 | 2/2015 | Wong et al. | |
| 9,604,358 B1 | 3/2017 | Brazeau | |
| 9,926,138 B1 | 3/2018 | Brazeau et al. | |
| 9,962,743 B2 | 5/2018 | Bombaugh et al. | |
| 9,975,148 B2 | 5/2018 | Zhu et al. | |
| 10,065,807 B1 | 9/2018 | Garrett et al. | |
| 10,583,553 B2 | 3/2020 | Wagner et al. | |
| 10,625,305 B2* | 4/2020 | Wagner ..................... B07C 3/14 | |
| 11,077,470 B2 | 8/2021 | Torang | |
| 11,365,051 B2 | 6/2022 | Wagner et al. | |
| 11,511,417 B1* | 11/2022 | Meiswinkel ........... B25J 13/088 | |
| 11,795,012 B1 | 10/2023 | Bacon et al. | |
| 11,964,830 B2 | 4/2024 | McCopy, Jr. et al. | |
| 12,179,806 B2 | 12/2024 | Heggebø et al. | |
| 2013/0110280 A1 | 5/2013 | Folk | |
| 2015/0032252 A1 | 1/2015 | Galluzzo et al. | |
| 2016/0199884 A1* | 7/2016 | Lykkegaard ....... G05B 19/4182 | 700/223 |
| 2016/0257502 A1* | 9/2016 | Fujihara ................. B07C 3/003 | |
| 2017/0121113 A1 | 5/2017 | Wagner et al. | |
| 2017/0225330 A1 | 8/2017 | Wagner et al. | |
| 2017/0322561 A1 | 11/2017 | Stiernagle | |
| 2018/0127219 A1 | 5/2018 | Wagner et al. | |
| 2018/0215546 A1* | 8/2018 | High ......................... B25J 9/06 | |
| 2018/0330134 A1 | 11/2018 | Wagner et al. | |
| 2019/0039247 A1* | 2/2019 | Katagiri ............... G05B 19/402 | |
| 2019/0091730 A1 | 3/2019 | Torang | |
| 2019/0332096 A1* | 10/2019 | Porter .................. G05D 1/2446 | |
| 2020/0055091 A1 | 2/2020 | Ma et al. | |
| 2020/0126025 A1 | 4/2020 | Kumar et al. | |
| 2020/0143127 A1 | 5/2020 | Wagner et al. | |
| 2020/0151408 A1 | 5/2020 | Wagner et al. | |
| 2020/0151409 A1 | 5/2020 | Wagner et al. | |
| 2020/0151410 A1 | 5/2020 | Wagner et al. | |
| 2020/0151507 A1 | 5/2020 | Siemionow et al. | |
| 2020/0160011 A1 | 5/2020 | Wagner et al. | |
| 2021/0001489 A1 | 1/2021 | Peterson et al. | |
| 2021/0039140 A1 | 2/2021 | Geyer et al. | |
| 2021/0188554 A1* | 6/2021 | Kalouche ................. B07C 3/08 | |
| 2022/0063928 A1* | 3/2022 | Christen .............. B65G 17/345 | |
| 2022/0072587 A1 | 3/2022 | Gealy et al. | |
| 2023/0121781 A1 | 4/2023 | Allen | |
| 2023/0144252 A1 | 5/2023 | Lukka et al. | |
| 2023/0191608 A1 | 6/2023 | Horowitz et al. | |
| 2023/0303338 A1 | 9/2023 | Williams et al. | |
| 2023/0405639 A1 | 12/2023 | Holopainen et al. | |
| 2025/0083316 A1* | 3/2025 | Ichien .................... B25J 9/1653 | |

FOREIGN PATENT DOCUMENTS

| | | |
|---|---|---|
| CN | 102390701 A | 3/2012 |
| CN | 105921419 B | 2/2018 |
| CN | 118103179 A | 5/2024 |
| CN | 118103308 A | 5/2024 |
| DE | 102004001181 A1 | 8/2005 |
| DE | 102005061309 A1 | 7/2007 |
| DE | 102006057658 A1 | 6/2008 |
| DE | 102007038834 A1 | 2/2009 |
| DE | 102010002317 A1 | 8/2011 |
| EP | 0613841 B1 | 2/1998 |
| EP | 2233400 B1 | 5/2013 |
| GB | 2084531 A | 4/1982 |
| JP | 2007182286 A | 7/2007 |
| JP | 2014141313 A | 8/2014 |
| WO | 2016198565 A1 | 12/2016 |
| WO | 2021198053 A1 | 10/2021 |
| WO | 2023064389 A1 | 4/2023 |
| WO | 2023064392 A1 | 4/2023 |

OTHER PUBLICATIONS

International Preliminary Report on Patentability issued by the International Bureau of WIPO in related international application No. PCT/US2022/046445 on Apr. 25, 2024, 8 pages.
Communication pursuant to Rules 161(2) and 162 EPC issued by the European Patent Office in related European Patent Application No. 22881725.0 on Aug. 14, 2024, 3 pages.
Communication pursuant to Rules 161(2) and 162 EPC issued by the European Patent Office in related European Patent Application No. 22802354.5 on May 23, 2024, 3 pages.
International Search Report and Written Opinion of the International Searching Authority, the European Patent Office, in related international application No. PCT/US2022/046448 on Feb. 14, 2023, 15 pages.
International Search Report and Written Opinion of the International Searching Authority, the European Patent Office, in related international application No. PCT/US2022/046445 on Mar. 6, 2023, 11 pages.

* cited by examiner

SYSTEMS AND METHODS FOR PROVIDING DETECTION PROCESSING WITH VELOCITY MATCHING

PRIORITY

The present application claims priority to U.S. Provisional Patent Application No. 63/256,392, filed Oct. 15, 2021, the disclosure of which is hereby incorporated by reference in its entirety.

BACKGROUND

The invention generally relates to object processing systems, and relates in particular to object processing systems such as distribution center systems and sortation systems that are used for processing a variety of objects.

Current object processing systems generally involve the processing of a large number of objects, where the objects are received in either organized or disorganized batches, and must be routed to desired destinations in accordance with a manifest or specific addresses on the objects (e.g., in a mailing system). Current distribution center sorting systems generally assume an inflexible sequence of operations whereby a disorganized stream of input objects is first singulated into a single stream of isolated objects presented one at a time to a scanner that identifies the object. An induction element transports the objects to the desired destination or further processing station, which may include a bin, a tote, a box, a chute, a bag or a conveyor etc.

Current state-of-the-art sortation systems rely on human labor to some extent. Most solutions rely on a worker that is performing sortation, by scanning an object from an induction area (chute, table, etc.) and placing the object in a staging location, conveyor, or collection bin. All objects may be presumed to be accurately labelled, and the object processing system is presumed to have accurate information about each object. New objects may be separated and inducted individually by human personnel as exceptions, presenting challenges to automated processing systems and processes.

Adding to these challenges are the conditions that some objects may have information about the object entered into the manifest or a shipping label incorrectly. For example, if a manifest in a distribution center includes a size or weight for an object that is not correct (e.g., because it was entered manually incorrectly), or if a shipping sender enters an incorrect size or weight on a shipping label, the processing system may reject the object as being unknown if inconsistent data is encountered in connection with the object.

There remains a need for more efficient and more cost-effective object processing systems that process objects of a variety of sizes and weights into appropriate destination locations such as collection bins, totes or boxes, yet is efficient in handling objects of widely varying sizes and weights.

SUMMARY

In accordance with an aspect the invention provides a dynamic movement analytics system that includes a programmable motion device including an end-effector, and a perception transfer system for receiving an object from the end-effector and for moving the object toward a distribution conveyance system moving in a first direction at a first speed. The perception transfer system includes at least one perception system for providing perception data regarding any of weight, shape, pose authority, position authority or identity information regarding the object and for moving the object along the first direction at the first speed for transferring the object to the distribution conveyance system.

In accordance with another aspect the invention provides a dynamic movement analytics system that includes a programmable motion device including an end-effector, and a perception transfer system for receiving an object from the end-effector and for moving the object toward a distribution conveyance system moving in a first direction at a first speed. The perception transfer system includes a perception system for providing perception data regarding the object and for moving the object along the first direction at the first speed for transfer to the distribution conveyance system, said perception system including at least one optical perception unit and at least one weight detection sensor.

In accordance with a further aspect the invention provides a dynamic movement analytics system that includes a programmable motion device including an end-effector, and a perception transfer system for receiving an object from the end-effector and for moving the object in a distribution conveyance system moving in a first direction at a first speed. The perception transfer system including a perception system for providing perception data regarding the object and for moving the object along the first direction at the first speed for transferring the object to the distribution conveyance system, and an actuation system for transferring the object received from the perception transfer system to any of the plurality of destination containers.

In accordance with a further aspect the invention includes a method of processing objects that includes moving an object from an input area using a programmable motion device including an end-effector, receiving the object from the programmable motion device in a perception transfer system, moving the object toward a distribution conveyance system that is moving in a first direction at a first speed, providing perception data regarding any of weight, shape, pose authority, position authority or identity information regarding the object, moving the object along the first direction at the first speed, and transferring the object to the distribution conveyance system.

BRIEF DESCRIPTION OF THE DRAWINGS

The following description may be further understood with reference to the accompanying drawings in which.

The drawings are shown for illustrative purposes only.

DETAILED DESCRIPTION

Figure 1:
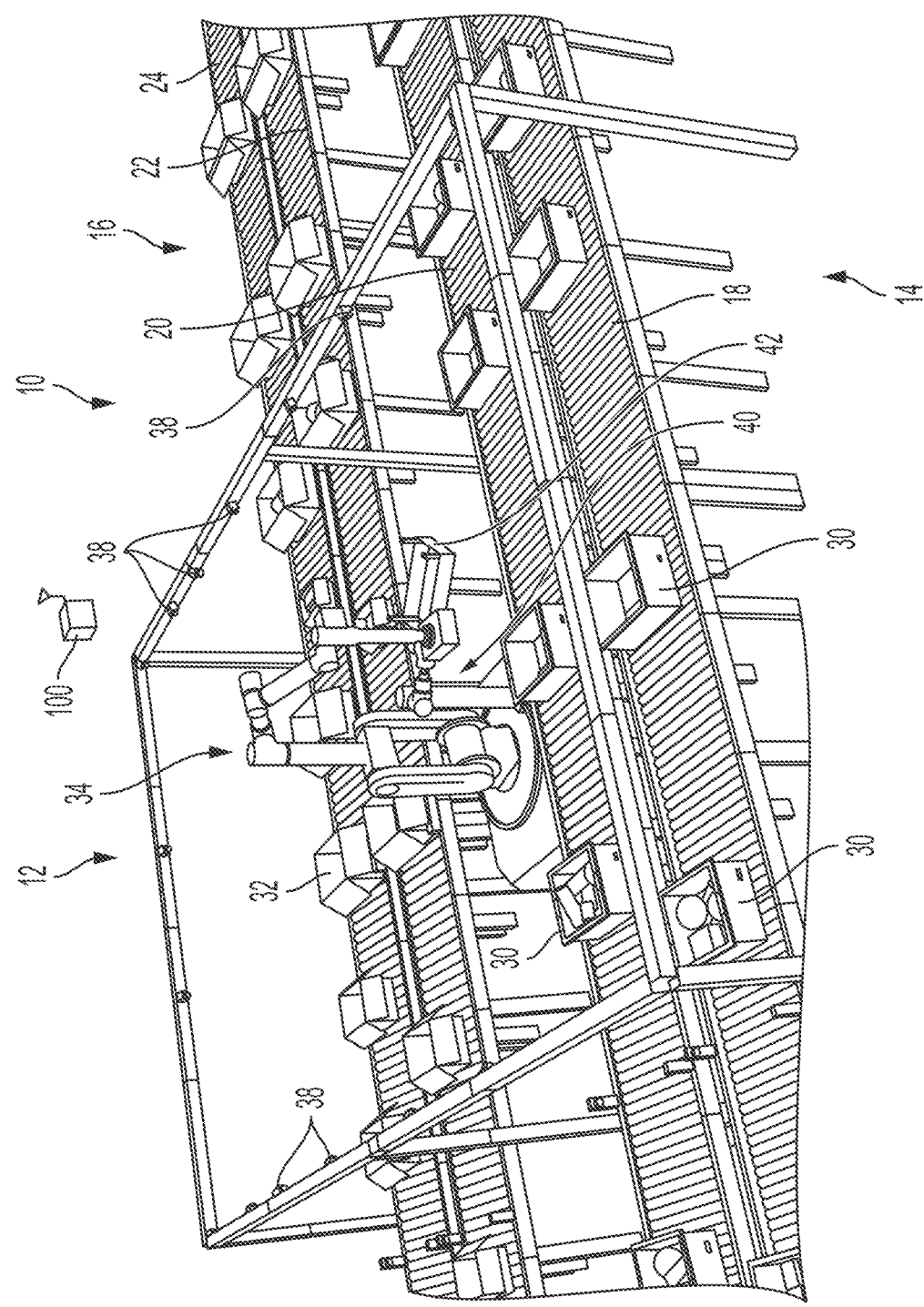
FIG. 1 shows an illustrative diagrammatic view of an object processing system in accordance with an aspect of the present invention.

In accordance with an aspect, the invention provides a dynamic movement analysis system 10 that includes a processing station 12 that is positioned between an infeed area 14 and an output area 16 as shown in FIG. 1. The infeed area includes one or more input conveyors 18, 20, and the output area includes one or more output conveyors 22, 24. Generally, objects from input containers 30 (e.g., boxes, bins, totes, etc.), are retrieved by a programmable motion device 34 of the processing station 12 and routed to output containers 32 (e.g., boxes, bins, totes, etc.). Each object is selectively removed from an input container by an end effector 36 of the programmable motion device 34, and is placed onto a transfer unit 42 of a perception transfer system 40. The input containers 30 and output containers 32 may all include indicia markers that are detectable by any of a plurality of marker detection units on the conveyors. One or more perception units 38 may be used to assess objects in the work area of the processing station 12, may be relied upon during grasping and movement, and may be used to confirm movement of objects. Operation of the system, in communication with all perception units, programmable motion devices and conveyors etc., is controlled by one or more processing systems 100.

Figure 2:
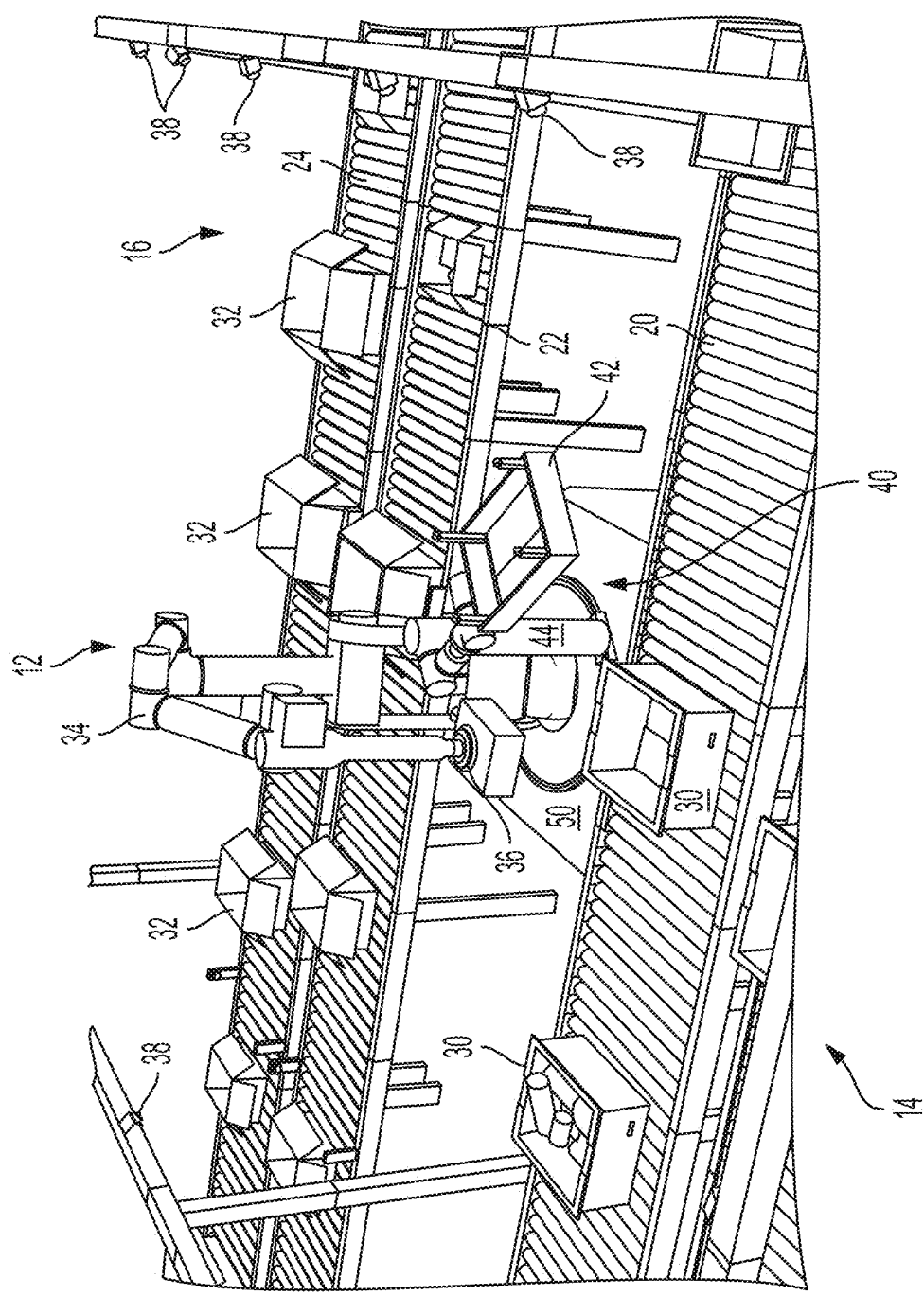
FIG. 2 shows an illustrative diagrammatic enlarged view of a portion of the system of FIG. 1 showing a perception transfer unit.

With further reference to FIG. 2, the perception transfer system 40 also includes an articulated mount 44 that travels on a circular track 46 along a base 50 on which the programmable motion device 34 is also mounted. The track 46, in an aspect, encircles at least a portion of the base of the programmable motion device 34. The perception transfer unit 42 includes perception transfer units and actuatable drop floor panels as discussed in more detail below with reference to FIGS. 3A-3D. Generally, the perception transfer unit 42 receives an object from the programmable motion device 34, and the system collects perception data regarding the object while the object is being moved to a destination location. The perception information may include any of weight data, dimensional data (including 3D information from 3D scanner(s)), barcode(s) information, RFID information from RFID scanner(s), other label information (e.g., text and symbols), and other identifying features such as color, color combinations, and non-standard shape(s).

Figure 3A:
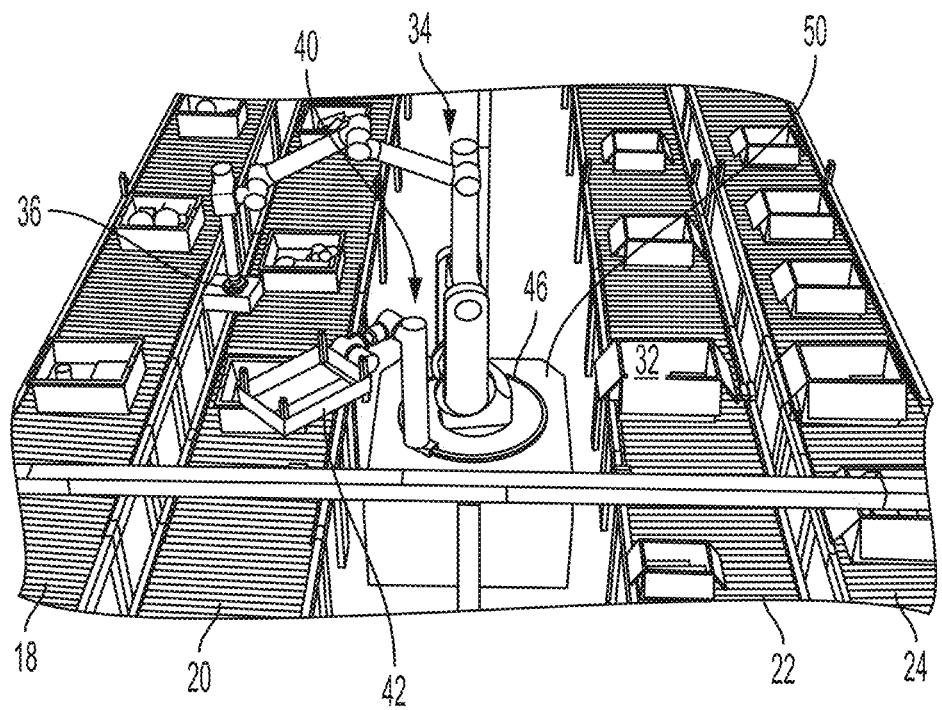
FIGS. 3A-3D show illustrative diagrammatic side elevational views of the system of FIG. 1, showing the perception unit positioned to be loaded (FIG. 3A), showing the perception unit being loaded (FIG. 3B), showing the perception unit rotated to an unloading position (FIG. 3C), and showing the perception unit dropping an object into a destination location (FIG. 3D)
Figure 3B:
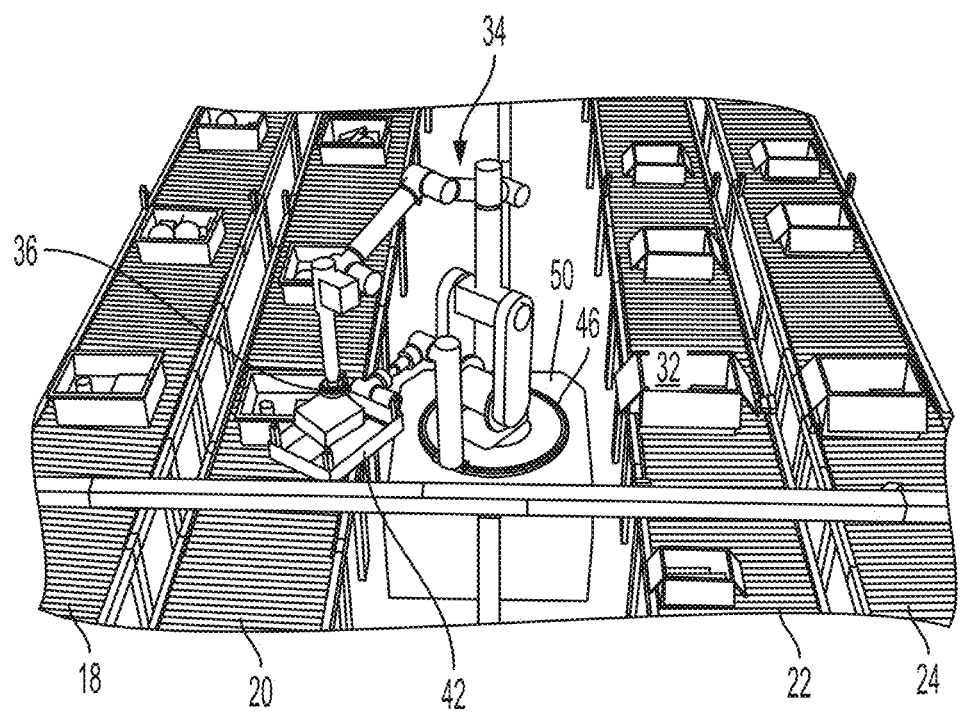

FIG. 3A shows the end effector 36 of the programmable motion device 34 engaging and lifting an object from an input container, and FIG. 3B shows the end effector 36 of the programmable motion device 34 having moved the end effector over the perception transfer unit 42 and dropping (or placing) the object into the perception transfer unit 42. Perception units on the perception transfer unit then begin to collect data regarding the object as it is being moved as discussed in more detail below. The perception data may include any of weight data, dimensional data (including 3D information from 3D scanner(s)), barcode(s) information, RFID information from RFID scanner(s), other label information (e.g., text and symbols), and other identifying features such as color, color combinations, and non-standard shape(s).

Figure 3C:
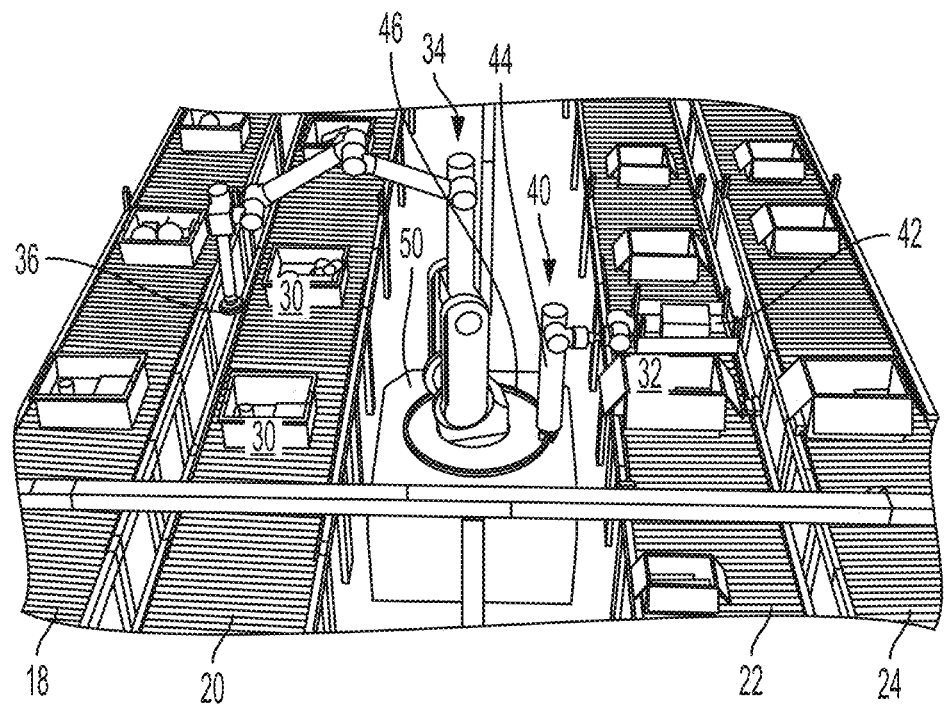
Figure 3D:
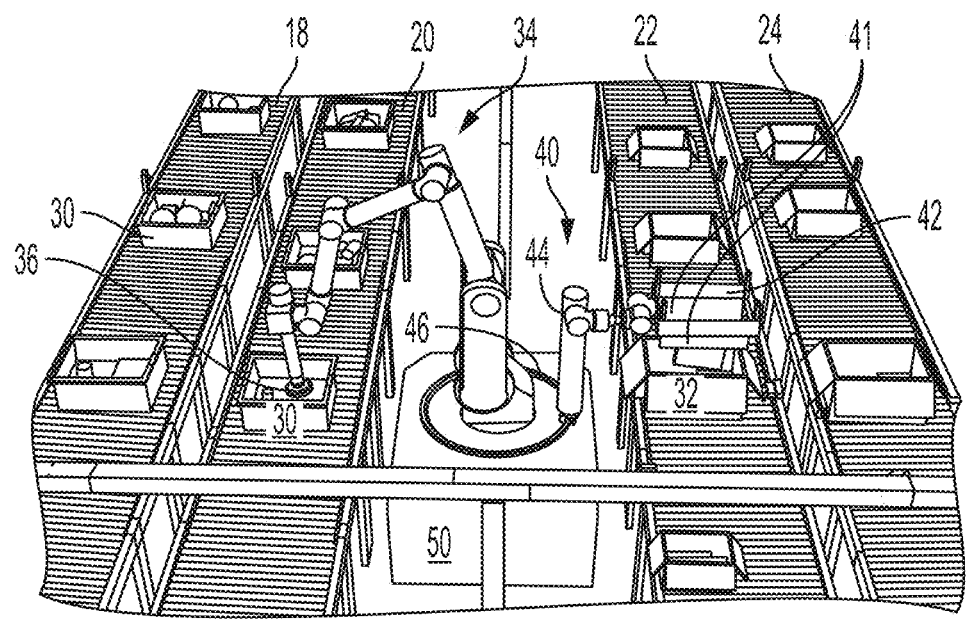

FIG. 3C shows the articulated mount 44 having travelled along a section of the track 46 to a destination location at which one or more output containers 32 may be provided. At the same time, the programmable motion device 34 has returned the end effector 36 to a position at which it is ready to select a new object. With reference to FIG. 3D, the perception transfer unit 42 may then drop the object into the selected destination output container via actuatable drop floor panels 41 (as further shown in FIG. 4B), while the end effector 36 of the programmable motion device 34 is grasping a new object.

The system provides that a substantial amount of perception data may be obtained regarding the object while it is being transferred in a rotational direction to the output container (as will be discussed in more detail below). The detection via transfer system, for example, may capture any of weight data, dimensional data (including 3D information from 3D scanner(s)), barcode(s) information, RFID information from RFID scanner(s), other label information (e.g., text and symbols), and other identifying features such as color, color combinations, and non-standard shape(s). Further, the programmable motion device may much more quickly turn to the task of acquiring and lifting a new object while the first object is being delivered to an output container, providing improved efficiencies in processing. In this way, the system provides buffering of each object so the articulated arm may begin the process of picking another object while the object being transferred is moved toward conveyance system(s) leading to destination locations. Additionally, the system may maintain providing a stream of singulated objects (singulation) and any desired spacing (time and/or distance) between objects in advance of the conveyance system(s).

Figure 4A:
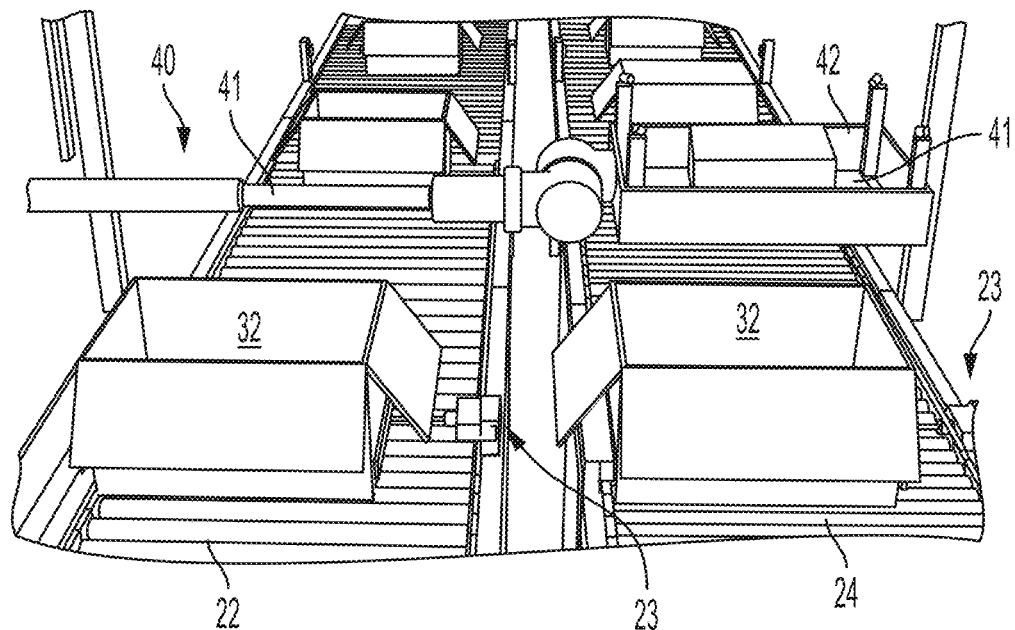
FIGS. 4A-4B show illustrative diagrammatic enlarged views of the system of FIG. 1, showing the perception unit positioned to move linearly toward an extended unloading position (FIG. 4A), and showing the perception unit dropping an object from an extended position into a destination location (FIG. 4B)
Figure 4B:
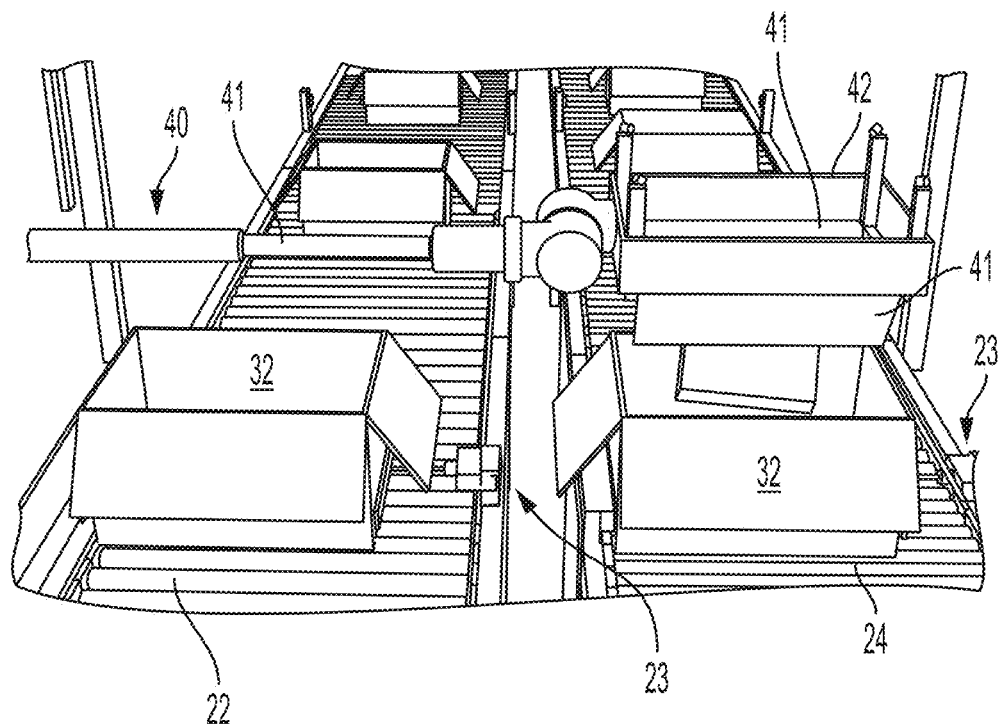

With further reference to FIGS. 4A and 4B, the articulated mount 40 may provide for movement of the perception transfer unit 42 radially from the track 46 by extension of an extension arm member 41. When so extended (as shown in FIG. 4A), the perception transfer unit 42 (and object therein) may be positioned over an output container 32 on the outer output conveyor 24, whereupon the object may be dropped into the output container 32 on the outer output conveyor 24 as shown in FIG. 4B by actuation of the actuatable drop floor panels 41. As further shown in FIGS. 4A and 4B, the output conveyors 22, 24 may include actuatable brace units 23 for securing output containers on the output conveyors while the containers are being loaded. This permits a plurality of conveyors to provide output containers to the work area reachable by the dynamic movement analytics system of FIG. 1.

Figure 5A:
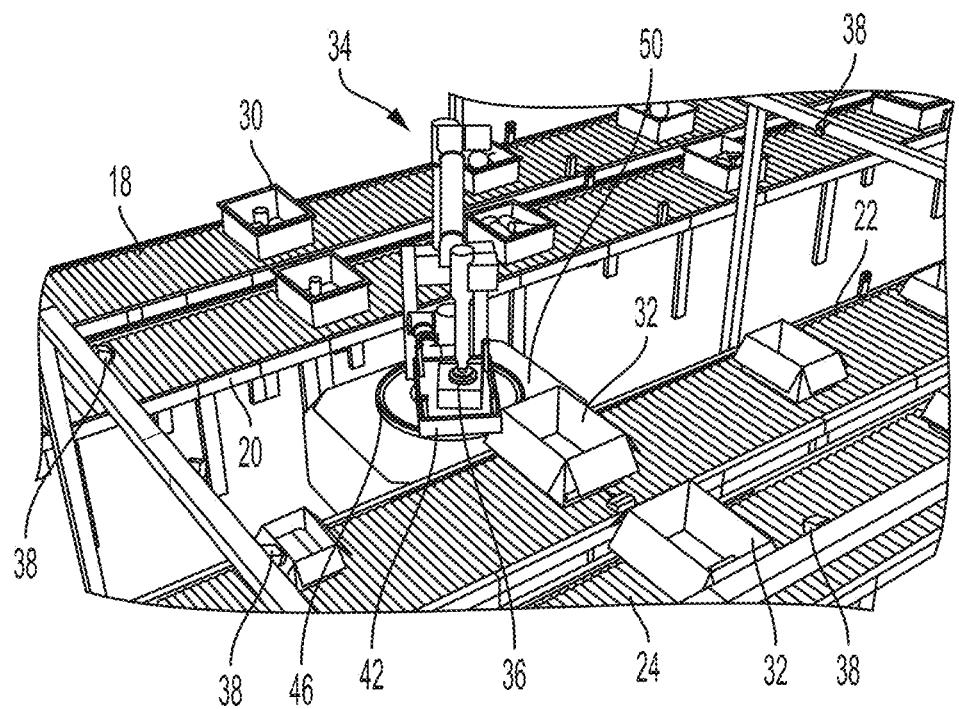
FIGS. 5A-5B show illustrative diagrammatic views of an object processing system of FIG. 1, showing a heavy or fragile object being grasped (FIG. 5A), and showing the fragile or heavy object being placed into a destination location (FIG. 5B)
Figure 5B:
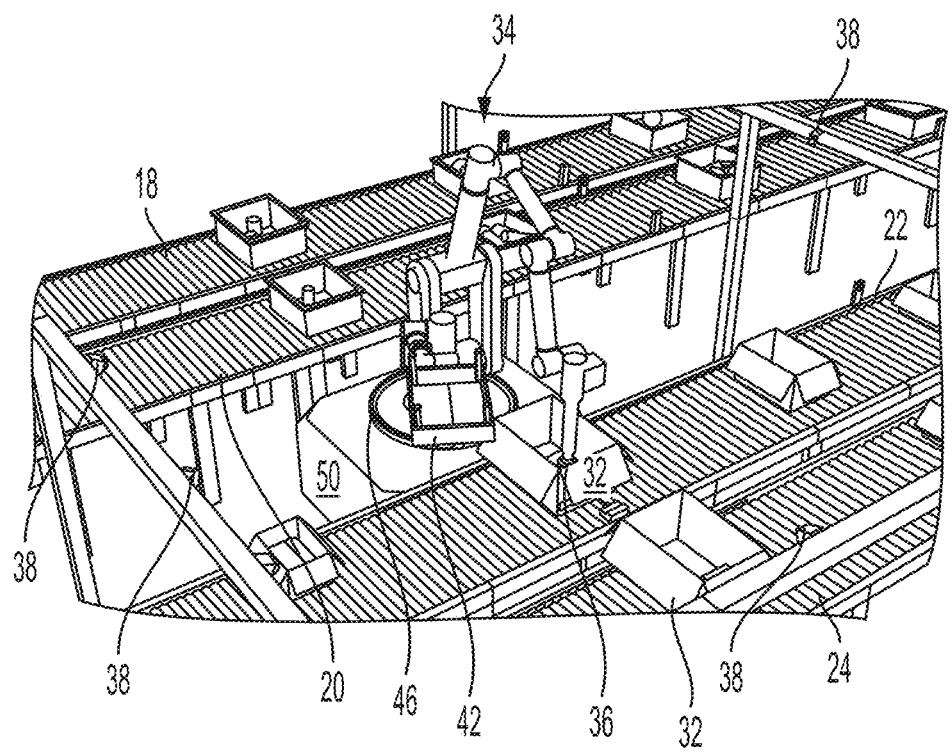

The perception units on the perception transfer unit 42 may be used for any of confirming an identity of an object, gathering further information regarding an object (such as weight, shape, size, pose authority, position authority, or further identity information), or gathering information to determine any special handling considerations, for example if the object is fragile, too large to be dropped from the perception transfer unit, too light to be reliably dropped from the perception transfer unit, or too heavy to be dropped from the perception transfer unit. In any of these situations, the programmable motion device 34 may bring the end effector 36 over to the object, may lift the object from the perception transfer unit 42 (as shown in FIG. 5A), and may place the object into the desired output container (as shown in FIG. 5B). The perception units on the perception transfer unit, as well as the perception units 38 positioned on a frame surrounding the processing system, may further provide information regarding any reaction (e.g., movement) of the object to rotational or linear acceleration or deceleration of the perception transfer unit as discussed in more detail below.

Systems and methods in accordance with aspects of the invention, therefore, may provide a dynamic movement analytics system that includes a programmable motion device including an end-effector, and a perception transfer system for receiving an object from the end-effector and for moving the object toward any of a plurality of destination containers. The perception transfer system includes at least one perception unit for providing perception data regarding any of weight, shape, pose authority, position authority or identity information regarding the object as it is moved toward the any of the plurality of destination containers.

Figure 6A:
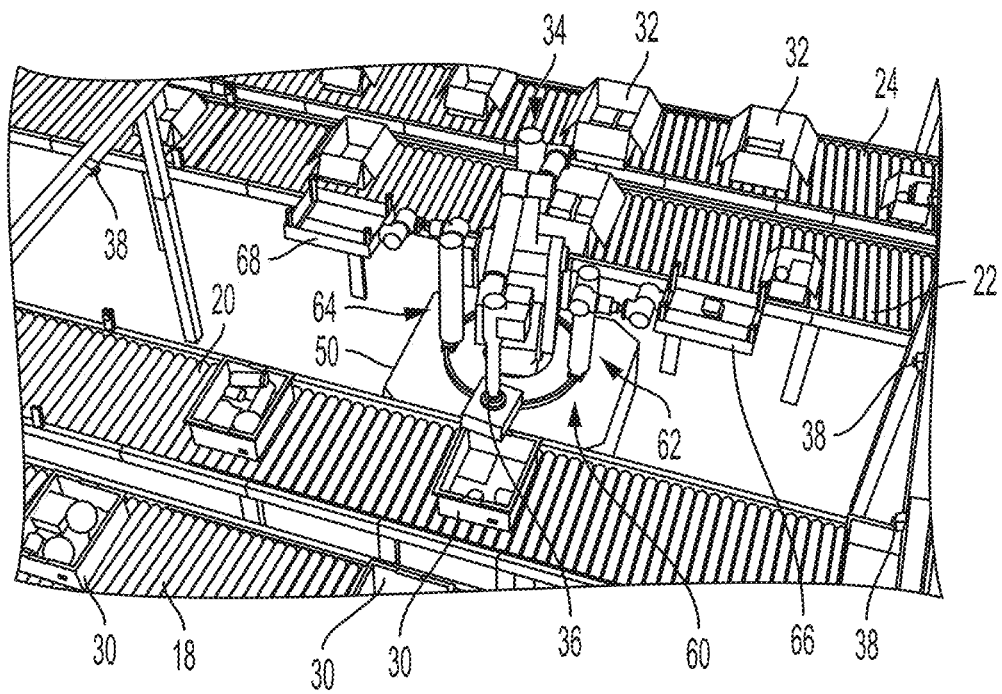
FIGS. 6A-6B show illustrative diagrammatic views of an object processing system in accordance with another aspect of the present invention that includes dual perception transfer units, showing an object being grasped for movement to a first perception transfer unit (FIG. 6A), and showing the dual perception transfer units having moved such that the first perception unit is closer to a loading position (FIG. 6B)
Figure 6B:
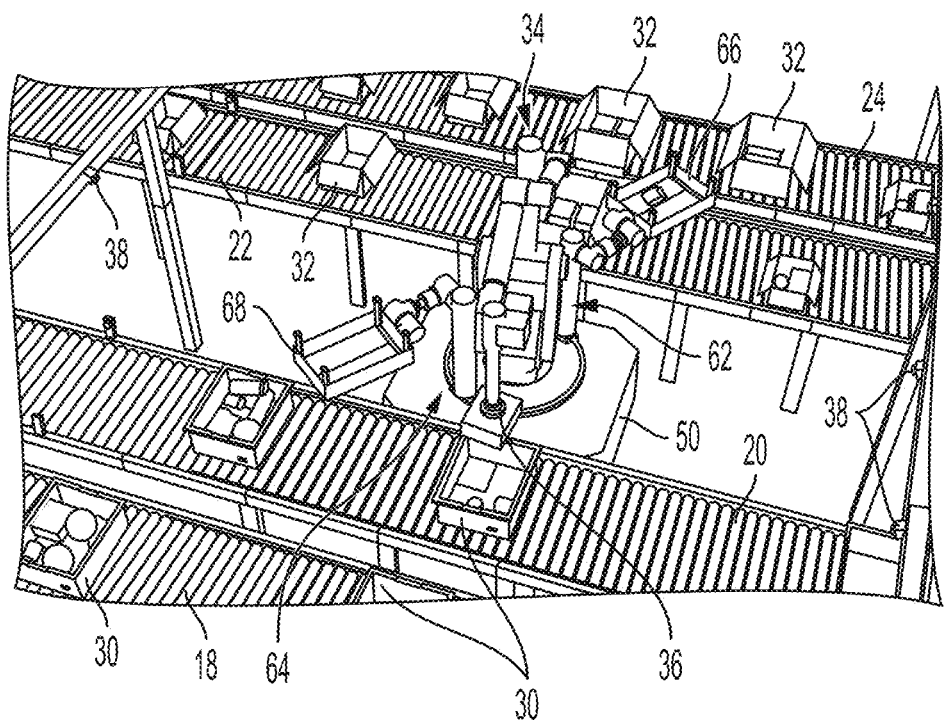

In accordance with a further aspect of the present invention (and with reference to FIGS. 6A and 6B), a perception transfer system 60 may include a pair of articulated mounts 62, 64, that travel along a circular track 63 that encircles the base of the programmable motion device 34. The articulated mount 62 may carry a perception transfer unit 66, and the articulated mount 64 may carry a perception transfer unit 68. The articulated mounts may, in accordance with an aspect of the invention, generally move in directions opposite one another as shown, such that they generally alternately provide objects to the pair of output conveyors 22, 24, being alternately provided objects by the end effector 36 of the programmable motion device 34. FIG. 6A shows the perception transfer unit 68 having been unloaded and FIG. 6B shows the perception transfer unit 66 moving toward the input area for re-loading. The perception transfer units 66, 68 therefore cooperate to increase the speed of processing of the objects.

Figure 7A:
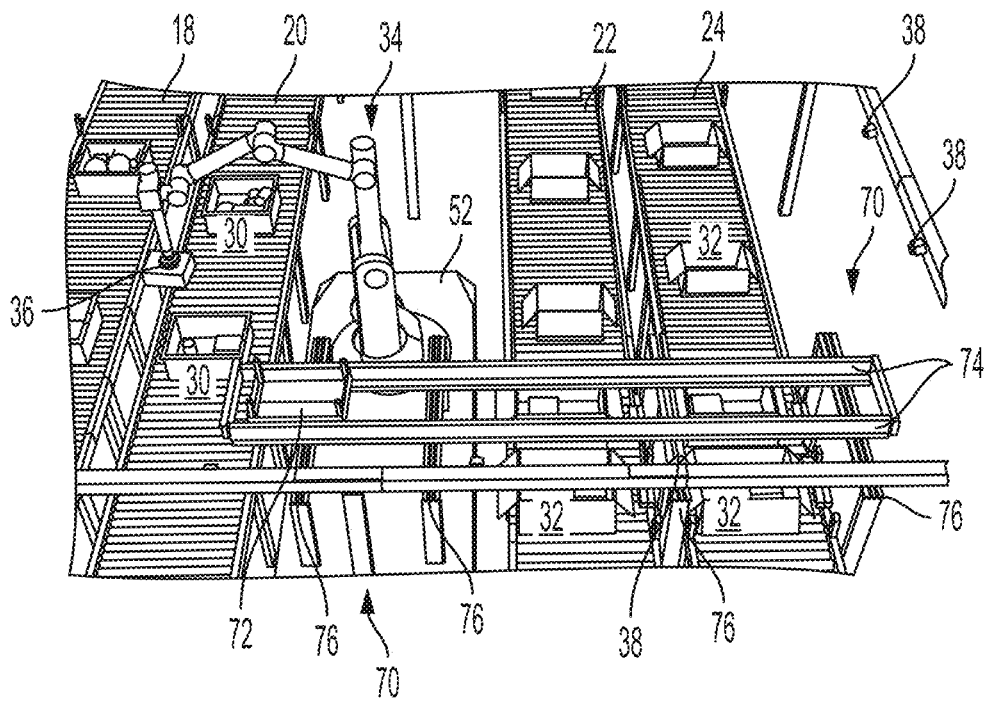
FIGS. 7A-7D show illustrative diagrammatic side elevational views of an object processing system in accordance with a further aspect of the present invention that includes a linearly movable perception transfer unit, showing the perception unit positioned to be loaded (FIG. 7A), showing the perception unit being loaded (FIG. 7B), showing the perception unit linearly moved to an unloading position (FIG. 7C), and showing the perception unit dropping an object into a destination location (FIG. 7D)
Figure 7B:
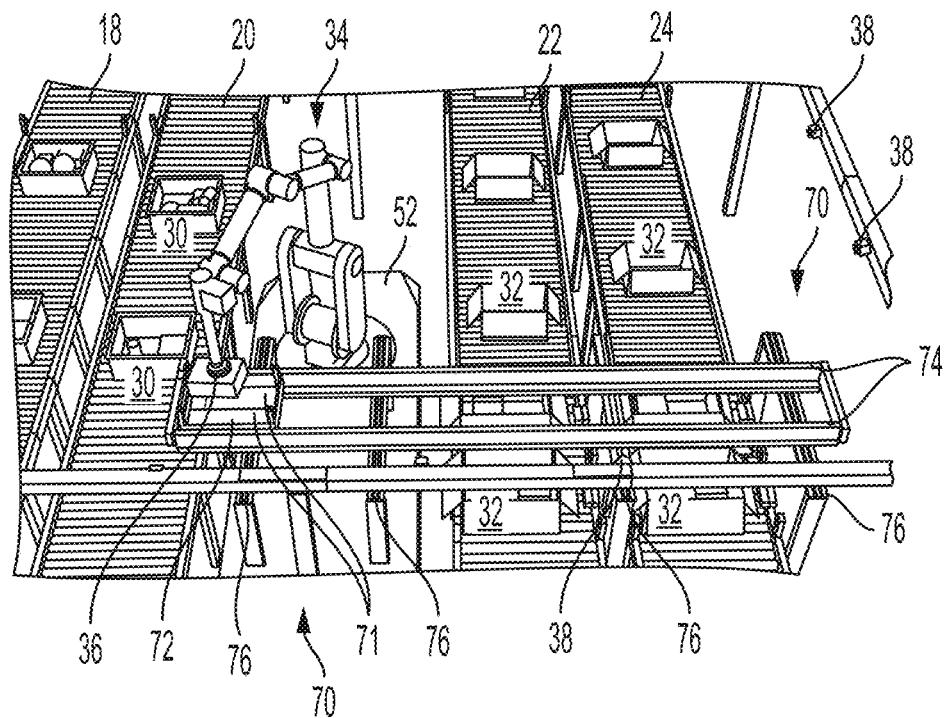
Figure 7C:
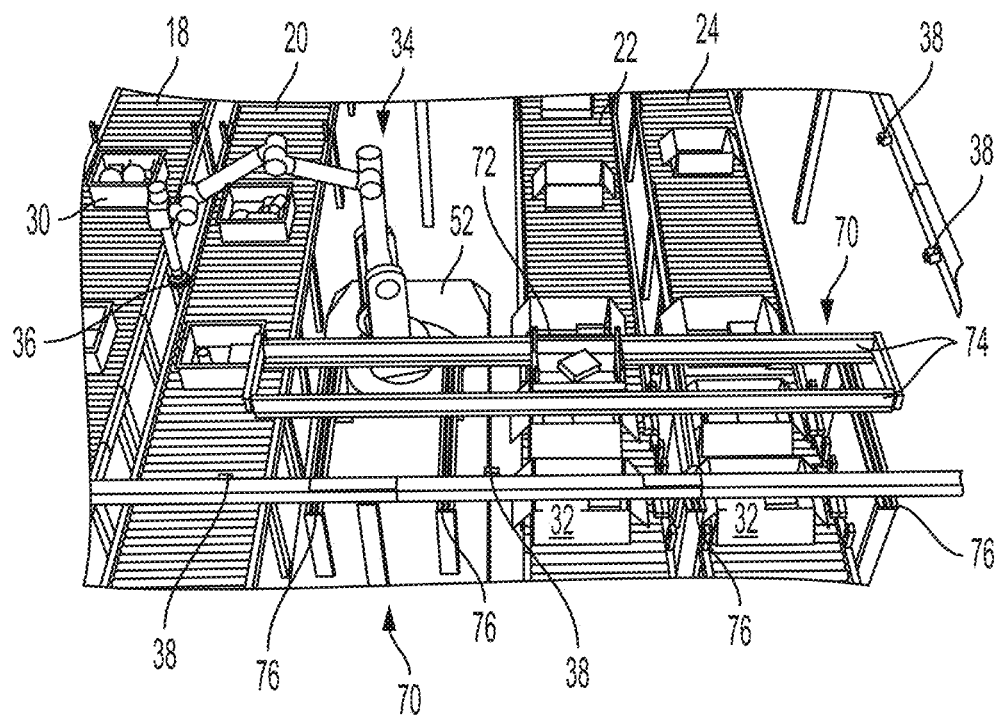
Figure 7D:
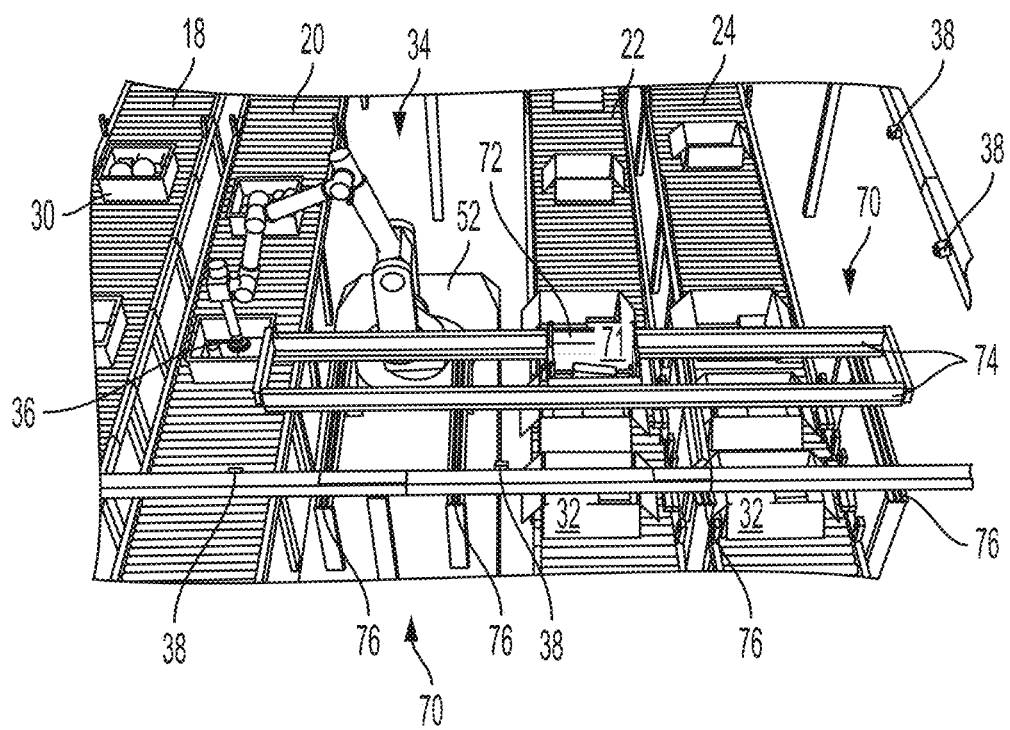

In accordance with another aspect, the invention provides a dynamic movement analysis system that again includes a processing station that is positioned between an infeed area 14 with input conveyors 18, 20, and an output area 16 with output conveyors 22, 24, but with a different perception transfer system as shown in FIGS. 7A-7D. FIG. 7A shows the perception unit positioned to be loaded, FIG. 7B shows the perception unit being loaded, FIG. 7C shows the perception unit linearly moved to an unloading position, and FIG. 7D shows the perception unit dropping an object into a destination location. Again, objects from input containers 30 (e.g., boxes, bins, totes, etc.), are generally retrieved by a programmable motion device 34 of the processing station and routed to output containers 32 (e.g., boxes, bins, totes, etc.). Each object is selectively removed from an input container (e.g., by the use of one or more perception units 38) by an end effector 36 of the programmable motion device 34, and is placed onto a transfer unit 72 of a perception transfer system 70, which perceives perception information. The perception information may include any of weight data, dimensional data (including 3D information from 3D scanner(s)), barcode(s) information, RFID information from RFID scanner(s), other label information (e.g., text and symbols), and other identifying features such as color, color combinations, and non-standard shape(s).

The perception transfer system 70 also includes a linear track 74 on which the transfer unit 72 may travel. The linear track 74 itself is mounted on a set of transversely running tracks 76, some of which are mounted on a base 52 on which the programmable motion device 34 is also mounted. Similarly, the perception transfer unit 72 includes perception transfer units and actuatable drop floor panels 71 as discussed in more detail below with reference to FIGS. 7A-7D.

FIG. 7A shows the end effector 36 of the programmable motion device 34 engaging and lifting an object from an input container, and FIG. 7B shows the end programmable motion device having moved the end effector over the perception transfer unit 72 and dropping (or placing) the object into the perception transfer unit 72. Perception units on the perception transfer unit then begin to collect data regarding the object as it is being moved as discussed in more detail below. Again, the perception information may include any of weight data, dimensional data (including 3D information from 3D scanner(s)), barcode(s) information, RFID information from RFID scanner(s), other label information (e.g., text and symbols), and other identifying features such as color, color combinations, and non-standard shape(s).

FIG. 7C shows the perception transfer unit 72 having travelled along a section of the linear track 74 to a destination location at which one or more output containers 32 may be provided. The linear track 74 has also traveled on the transversely running tracks 76 to position the perception transfer unit 72 over a selected destination location. At the same time, the programmable motion device 34 has returned the end effector 36 to a position at which it is ready to select a new object. With reference to FIG. 7D, the perception transfer unit 72 may then drop the object into the selected destination output container actuatable drop floor panels, while the end effector 36 of the programmable motion device 34 is grasping a new object.

Again, the system provides that a substantial amount of perception data may be obtained regarding the object while it is being transferred in a linear direction to the output container (e.g., any of weight data, dimensional data (including 3D information from 3D scanner(s)), barcode(s) information, RFID information from RFID scanner(s), other label information (e.g., text and symbols), and other identifying features such as color, color combinations, and non-standard shape(s)). Moreover, the system provides that the programmable motion device may much more quickly turn to the task of acquiring and lifting a new object while the first object is being delivered to an output container, providing improved efficiencies in processing.

Figure 8A:
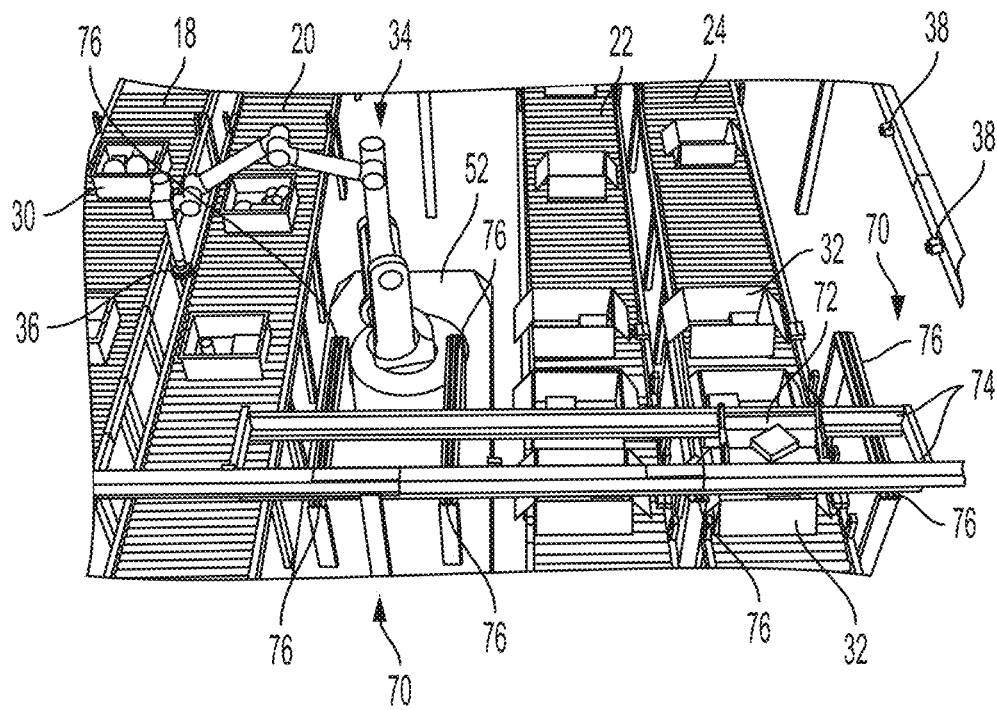
FIGS. 8A-8B show illustrative diagrammatic enlarged views of the system of FIGS. 7A-7D, showing the perception unit positioned to move linearly toward a further extended unloading position (FIG. 8A), and showing the perception unit dropping an object from an extended position into a destination location (FIG. 8B)
Figure 8B:
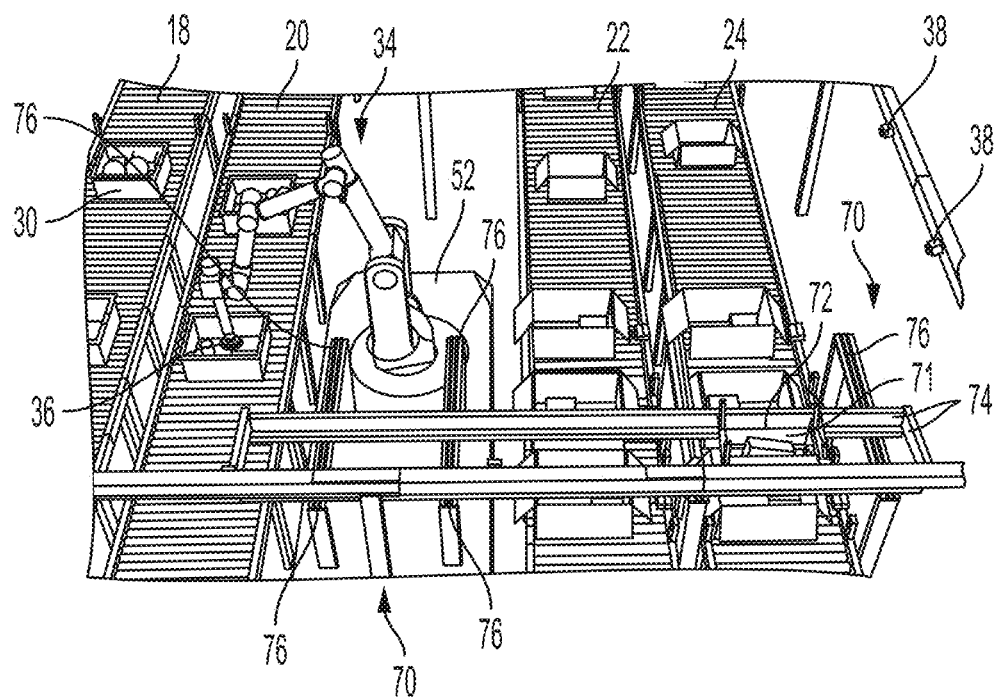

With further reference to FIGS. 8A and 8B, the perception transfer unit 72 may travel to a position over a destination location over the outer output conveyor 24 (whereas the transfer unit 72 shown in FIGS. 7C and 7D travelled to a position over a destination location of the inner output conveyor 22). FIG. 8A shows the perception unit positioned to move linearly toward a further extended unloading position, and FIG. 8B shows the perception unit dropping an object from an extended position into a destination location. The linear track 74 has also traveled on the transversely running tracks 76 to position the perception transfer unit 72 over a different selected destination location than that of FIGS. 7C and 7D. At the same time, the programmable motion device 34 has returned the end effector 36 to a position at which it is ready to select a new object. With reference to FIG. 7D, the perception transfer unit 72 may then drop the object into the selected destination output container actuatable drop floor panels, while the end effector 36 of the programmable motion device 34 is grasping a new object.

Figure 9:
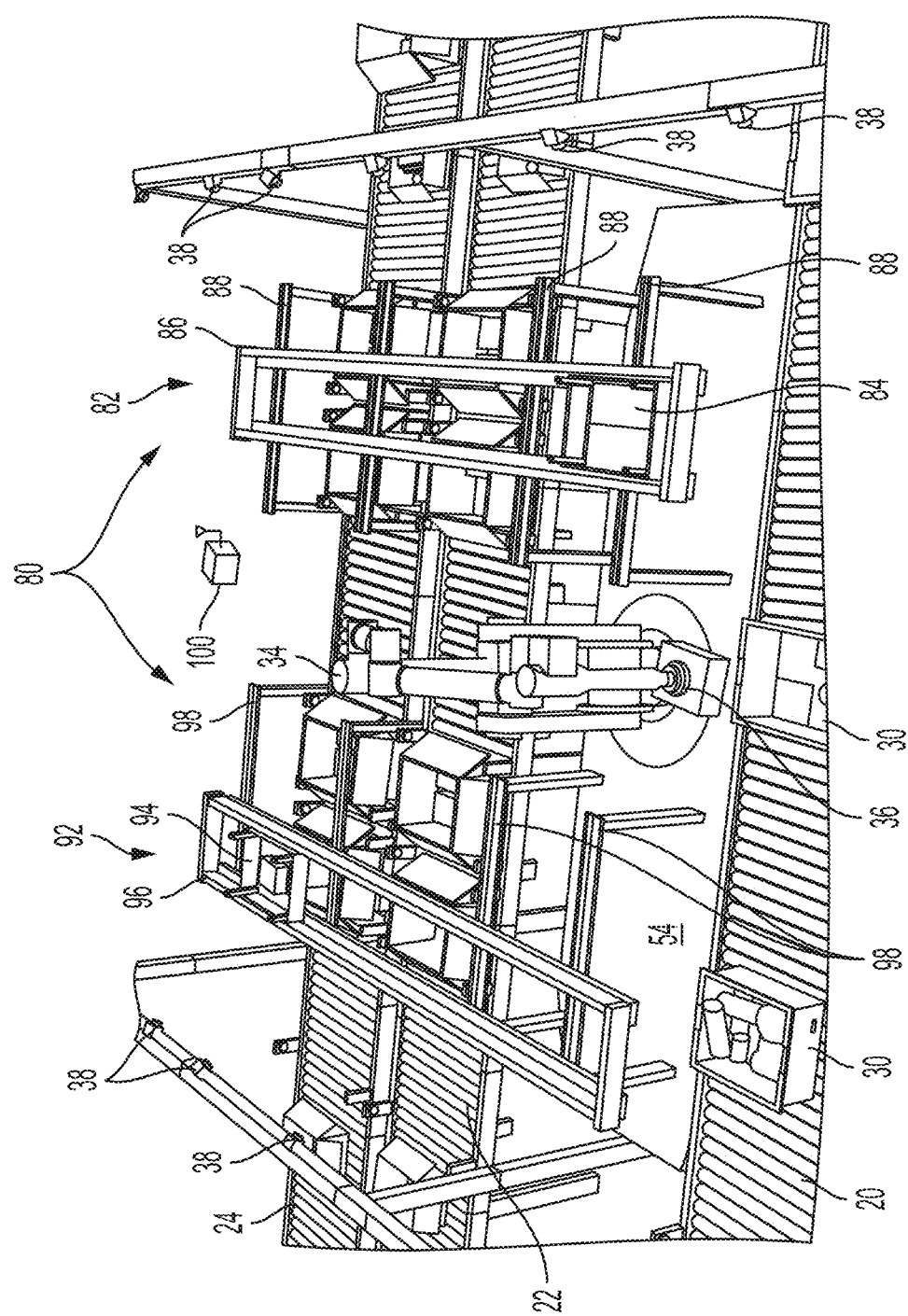
FIG. 9 shows an illustrative diagrammatic view of an object processing system in accordance with a further aspect of the present invention that includes dual perception linear transfer units.

In accordance with a further aspect of the present invention (and with reference to FIG. 9), a perception transfer system 80 may include a pair of linear movement systems 82, 92. The linear movement system 82 includes a perception transfer unit 84 that travels along a linear track 86, and the track 86 is movable along a transverse track 88 that is mounted, at least on part, on a base 52 common to the programmable motion device. The linear movement system 92 includes a perception transfer unit 94 that travels along a linear track 96, and the track 96 is movable along a transverse track 98 that is mounted, at least on part, on a base 52 common to the programmable motion device. The perception transfer units 84, 94 each include perception units as discussed above as well as actuatable panels for releasing objects into output containers. The linear movement systems may, in accordance with an aspect of the invention, generally move in directions opposite one another as shown, such that they alternately provide objects to either of two general areas of the pair of output conveyors 22, 24, each of which being alternately provided objects by the end effector 36 of the programmable motion device 34, thereby increasing throughput processing speed.

Again, systems and method in accordance with aspects of the invention may therefore provide a dynamic movement analytics system that includes a programmable motion device including an end-effector, and a perception transfer system for receiving an object from the end-effector and for moving the object toward any of a plurality of destination containers, e.g., along linear directions. The perception transfer system includes at least one perception unit for providing perception data regarding any of weight, shape, pose authority, position authority or identity information regarding the object as it is moved toward the any of the plurality of destination containers.

Figure 10A:
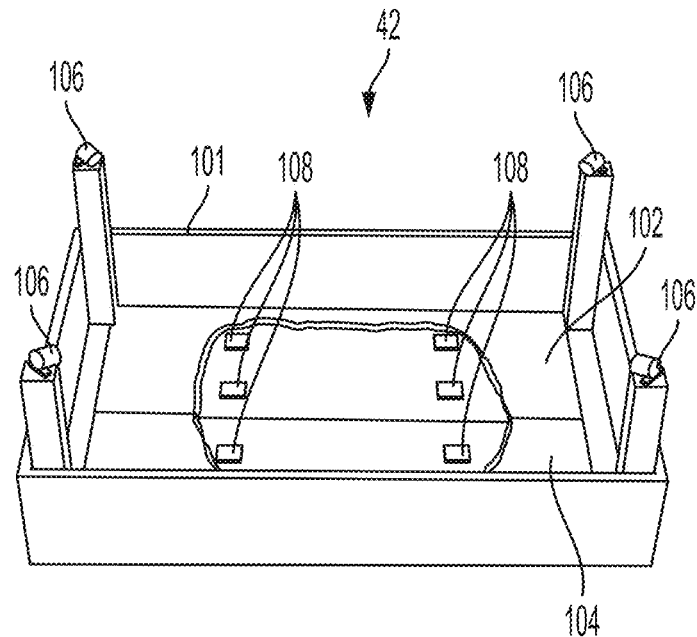
FIGS. 10A-10B show illustrative diagrammatic cut-away views of a perception transfer unit in accordance with an aspect of the present invention, showing the perception transfer unit doors in the closed position (FIG. 10A), and the open position (FIG. 10B)
Figure 10B:
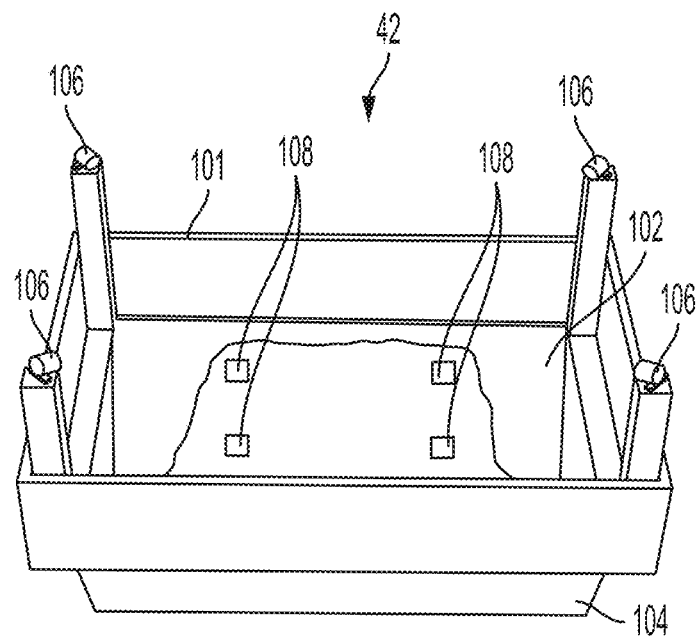

FIGS. 10A and 10B show an enlarged view of the perception transfer unit 42 of each of the above disclosed systems. The perception transfer unit 42 includes a frame 101 and a pair of actuatable drop floor panels 102, 104, each of which is formed of top and bottom plates that are separated by force sensors 108. The frame 101 includes side walls that facilitate containing an object that may have low position authority (such as an object that may roll). The top plate is shown partially broken away exposing the force sensors 108, and FIG. 10A shows the drop floor panels closed, while FIG. 10B shows the drop floor panels opened. While the perception units 106 obtain data regarding any movement of an object in the unit 42 during transfer, the force sensors 108 may also provide a substantial amount of information, such as a mass of the object and different positions of the object within the unit 42 during transfer. This information may confirm or augment the information obtained by the perception units 106.

The perception transfer unit 42 may therefore obtain a substantial amount of data regarding an object on the perception transfer unit 42 as an object is being moved to a destination container, either by rotational motion or linear motion, both of which, for example, may elicit any of position and/or orientation changes of the object on the perception transfer unit 42. This data may include 3D information from 3D scanner(s)), barcode(s) information, RFID information from RFID scanner(s), other label information (e.g., text and symbols), and other identifying features such as color, color combinations, and non-standard shape(s).

Figure 11A:
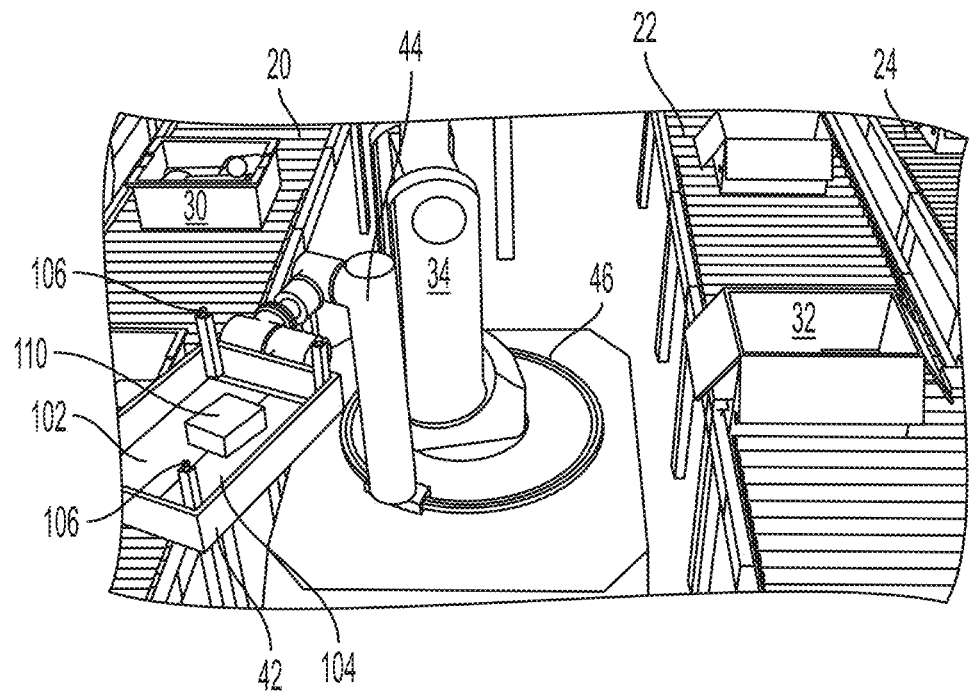
FIGS. 11A-11D show illustrative diagrammatic enlarged views of the system of FIGS. 3A-3D, showing the object placed into the perception transfer unit (FIG. 11A), the object moving with the perception transfer unit (FIG. 11B), showing the object moving radially outward due to the rotation (FIG. 11C), and showing the object moving in an tangential direction due the unit stopping (FIG. 11D)
Figure 11B:
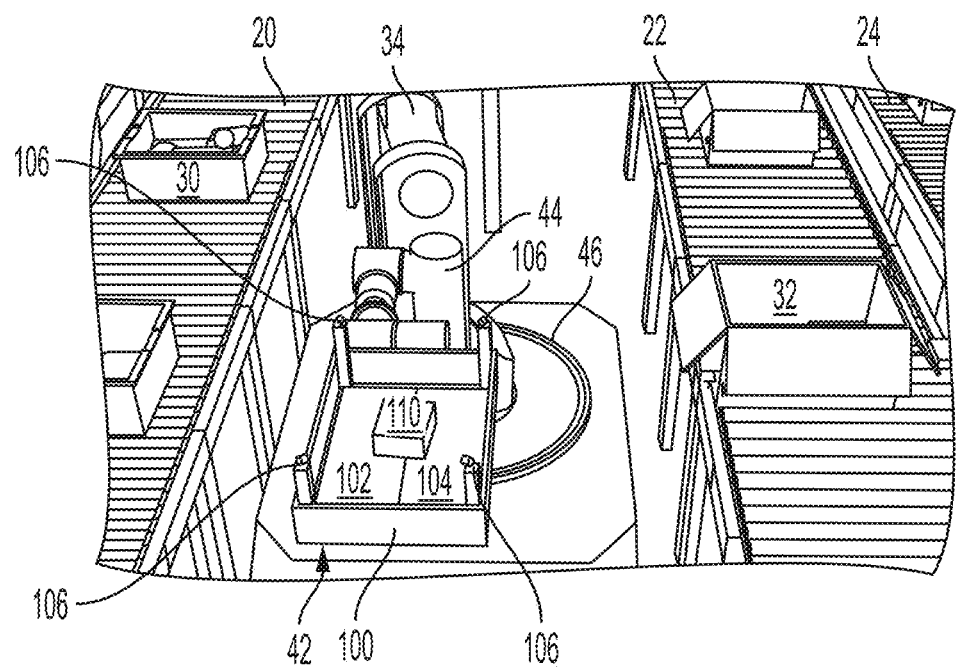
Figure 11C:
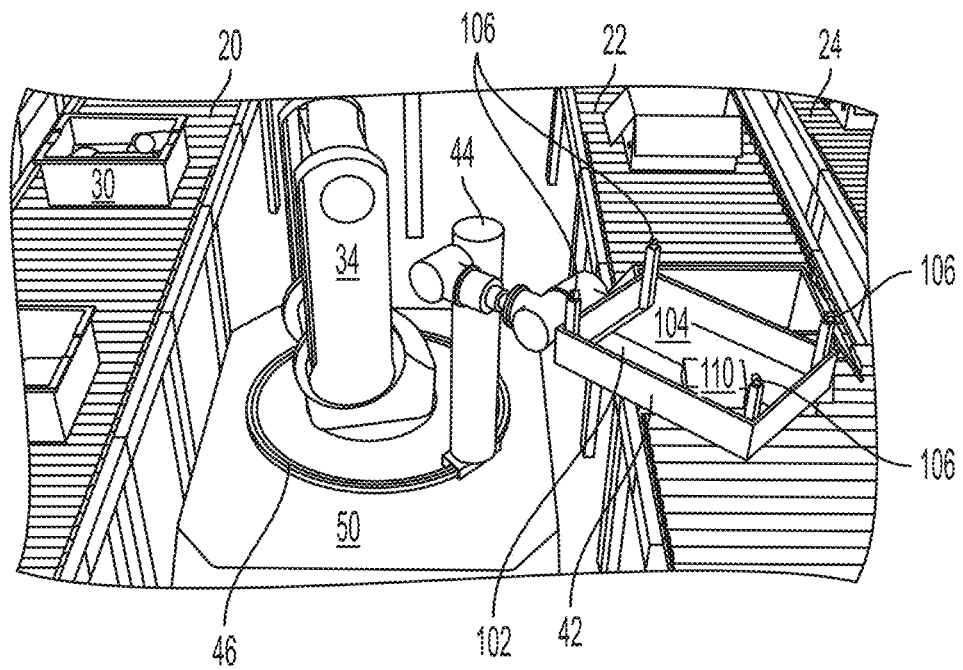
Figure 11D:
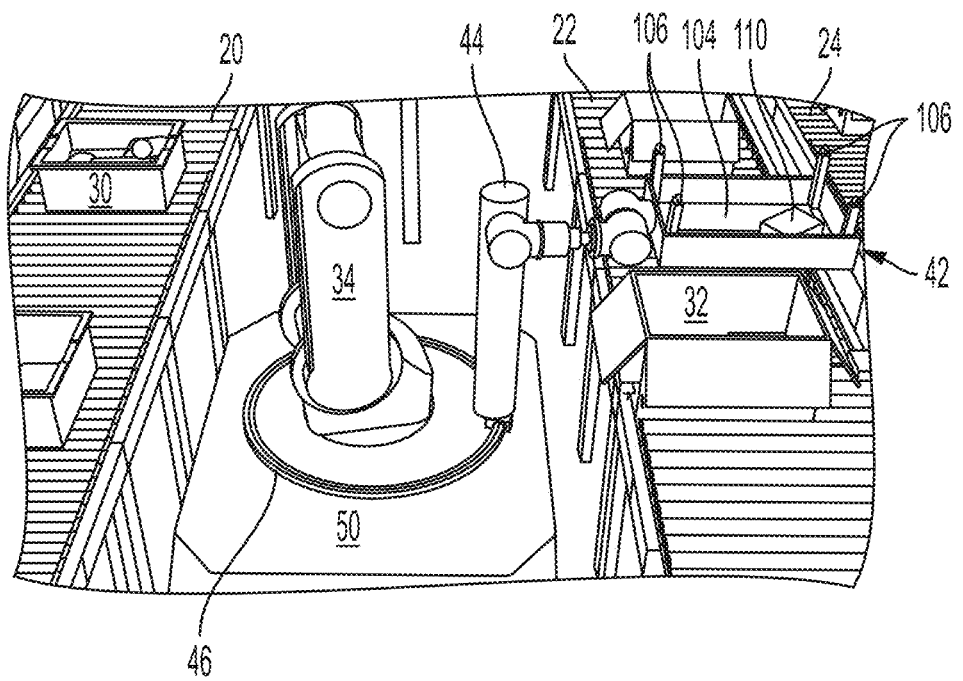

For example and with reference to FIGS. 11A-11D, as the perception transfer unit 42 is moved in a radial direction (with radial acceleration, velocity and deceleration), an object 110 on the perception transfer unit 42 may move (e.g., change position and/or orientation) with respect to the perception transfer unit 42. FIG. 11A shows the object placed into the perception transfer unit, FIG. 11B shows the object moving with the perception transfer unit, FIG. 11C shows the object moving radially outward due to the rotation, and FIG. 11D shows the object moving in a tangential direction due the unit stopping. These responses (in addition to other perceived data such as mass, shape and size), may be used to verify an identity of an object, and/or detect a multi-pick. In particular, the system (including the one or more computer processing systems), may access previously stored data regarding expected responses to known items. These expected responses may be provided by any of experience, modelling or associative assignment based on similar objects.

Figure 12A:
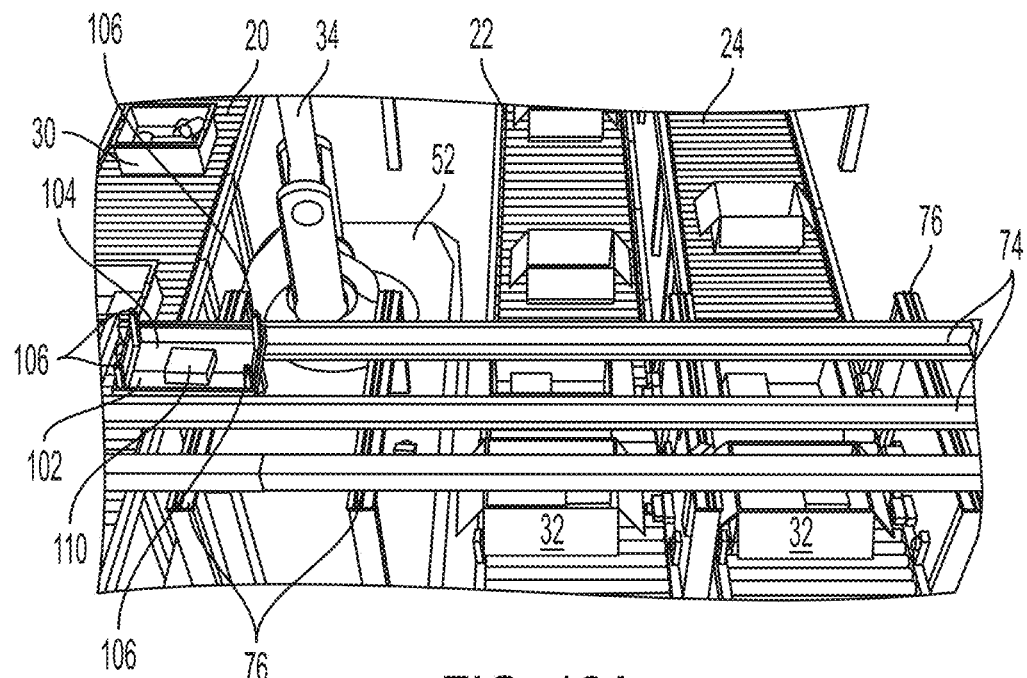
FIGS. 12A-12D show illustrative diagrammatic enlarged views of the object processing system of FIGS. 7A-7D, showing the object placed in the perception transfer unit (FIG. 12A), showing the object undergoing first linear movement due the unit accelerating linearly (FIG. 12B), showing the object moving with an attained speed (FIG. 12C), and showing the object undergoing deceleration when the unit stops (FIG. 12D)
Figure 12B:
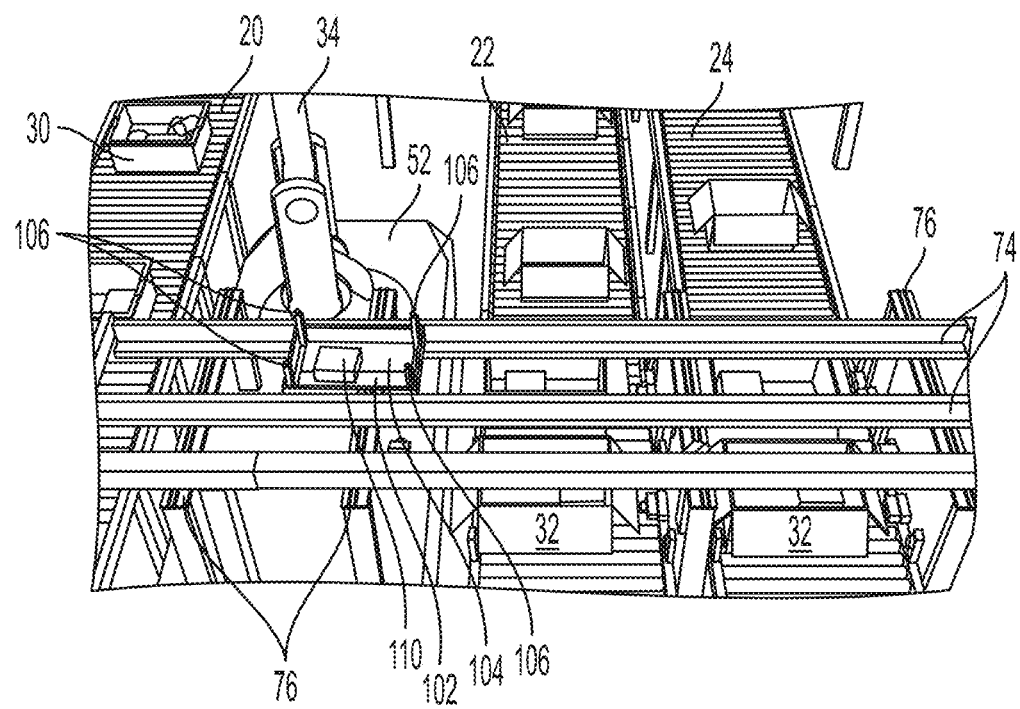
Figure 12C:
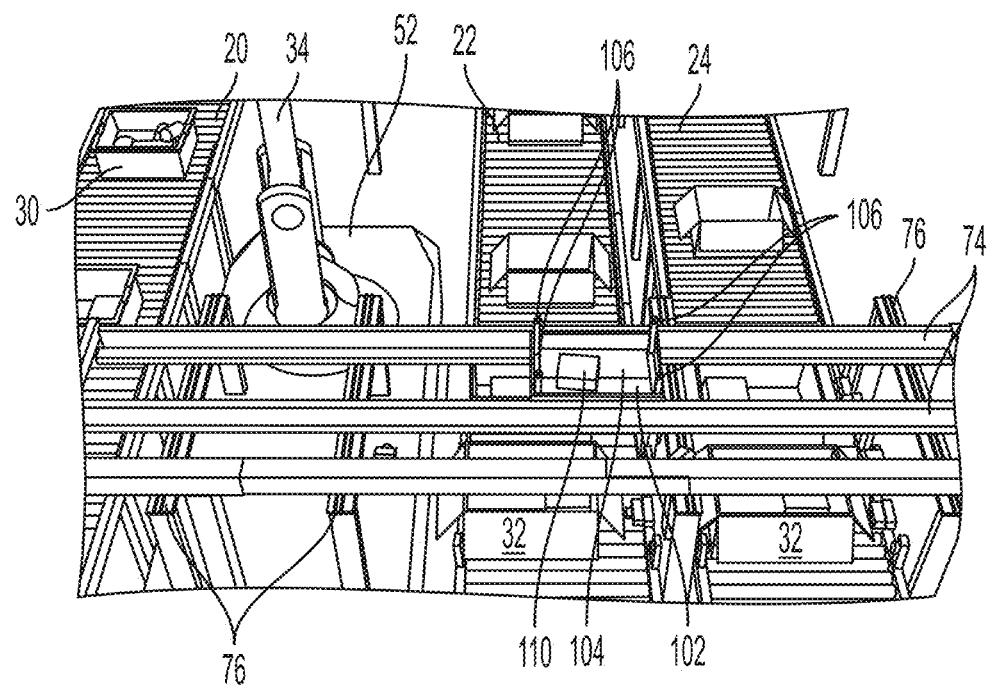
Figure 12D:
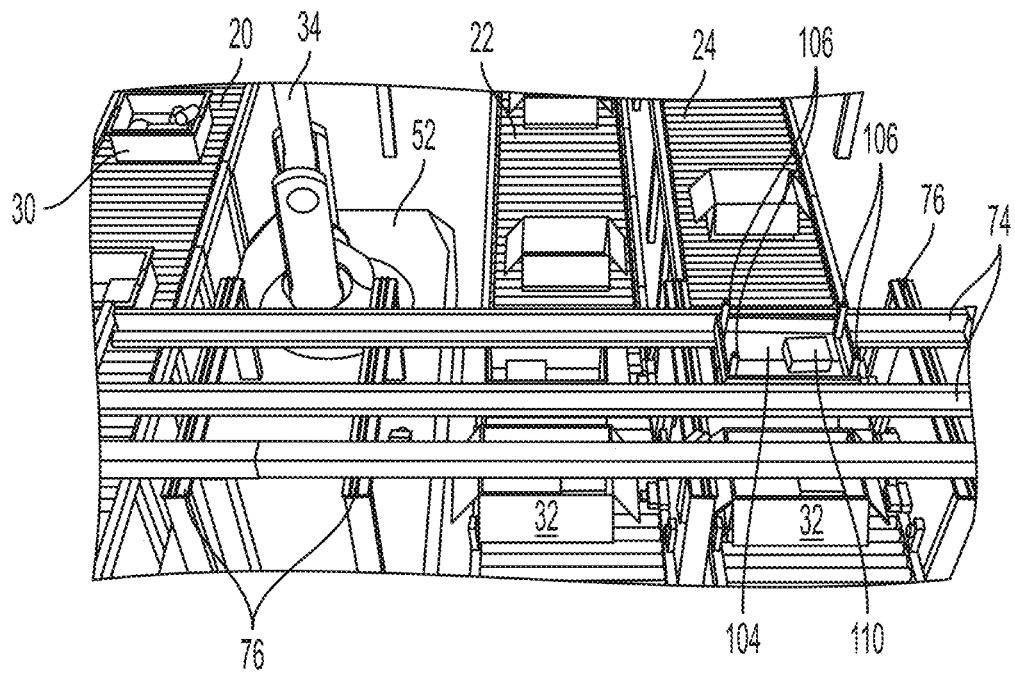

With reference to FIGS. 12A-12D, as the perception transfer unit 42 is moved in a linear direction (with linear acceleration, velocity and deceleration), an object 110 on the perception transfer unit 42 may move (e.g., change position and/or orientation) with respect to the perception transfer unit 42. FIG. 12A shows the object placed in the perception transfer unit, FIG. 12B shows the object undergoing first linear movement due the unit accelerating linearly, FIG. 12C shows the object moving with an attained speed, and FIG. 12D shows the object undergoing deceleration when the unit stops. These responses (in addition to other perceived data such as mass, shape and size), may be used to verify an identity of an object, and/or detect a multi-pick. Again, the system (including the one or more computer processing systems), may access previously stored data regarding expected responses to known items. These expected responses may be provided by any of experience, modelling or associative assignment based on similar objects.

Figure 13A:
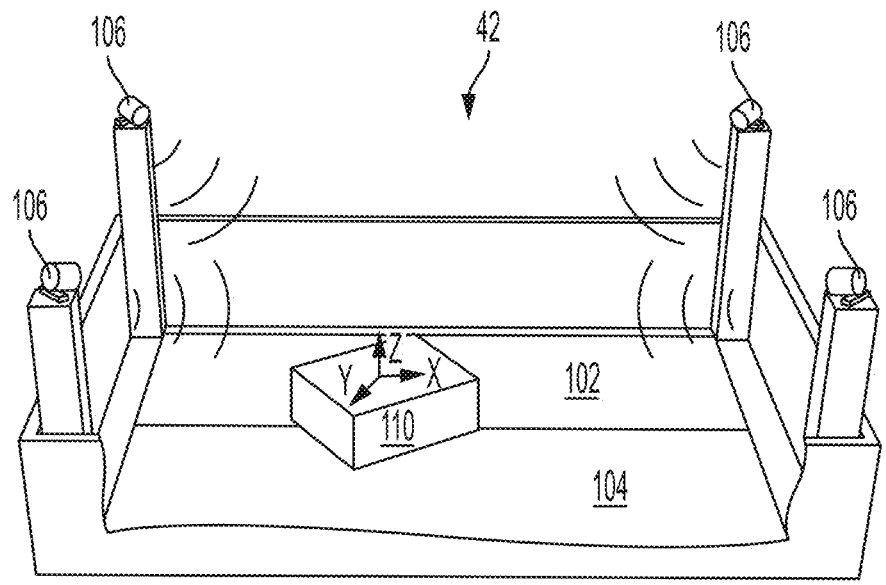
FIGS. 13A-13B show illustrative diagrammatic views of an object in a perception transfer unit moving from a first position and orientation (FIG. 13A) to a second position and orientation (FIG. 13B)
Figure 13B:
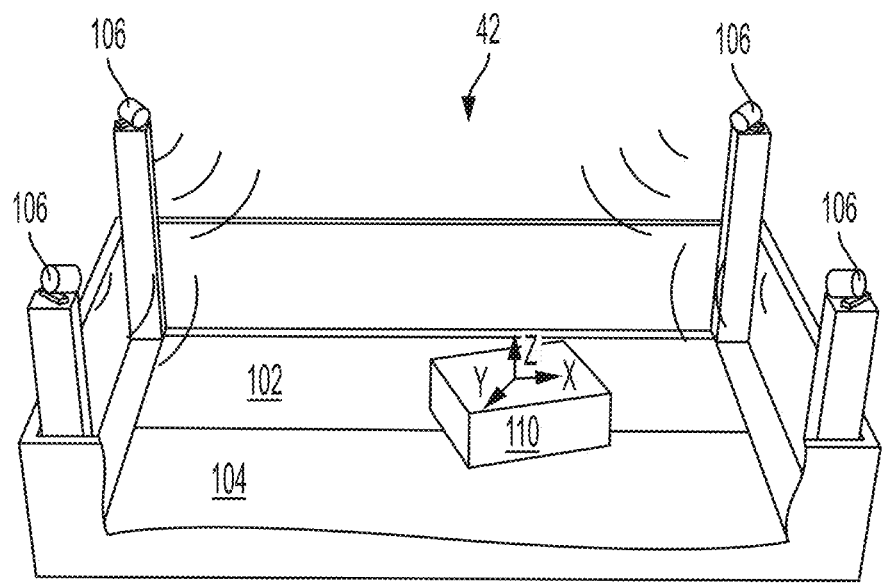
Figure 14A:
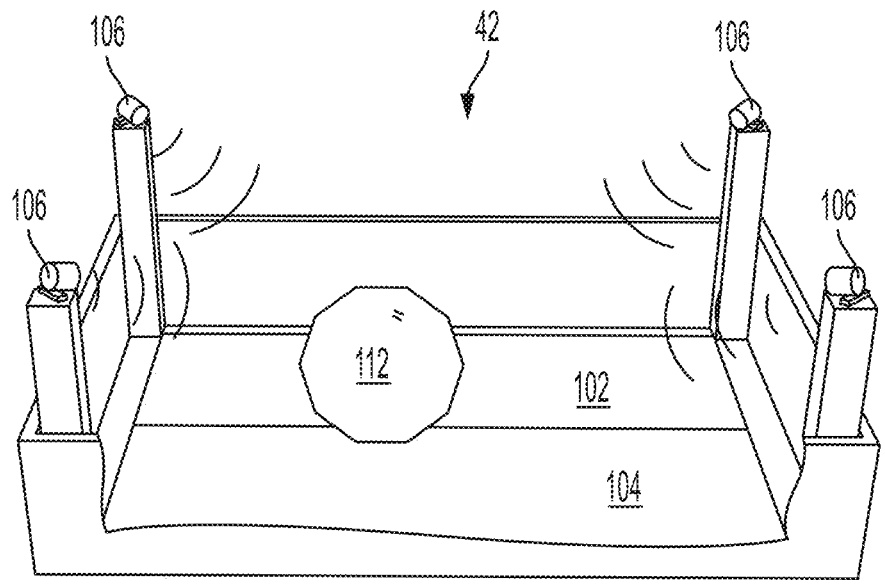
FIGS. 14A-14B show illustrative diagrammatic views of an object with low position authority in a perception transfer unit moving from a first position and orientation (FIG. 14A) to a second position and orientation (FIG. 14B)
Figure 14B:
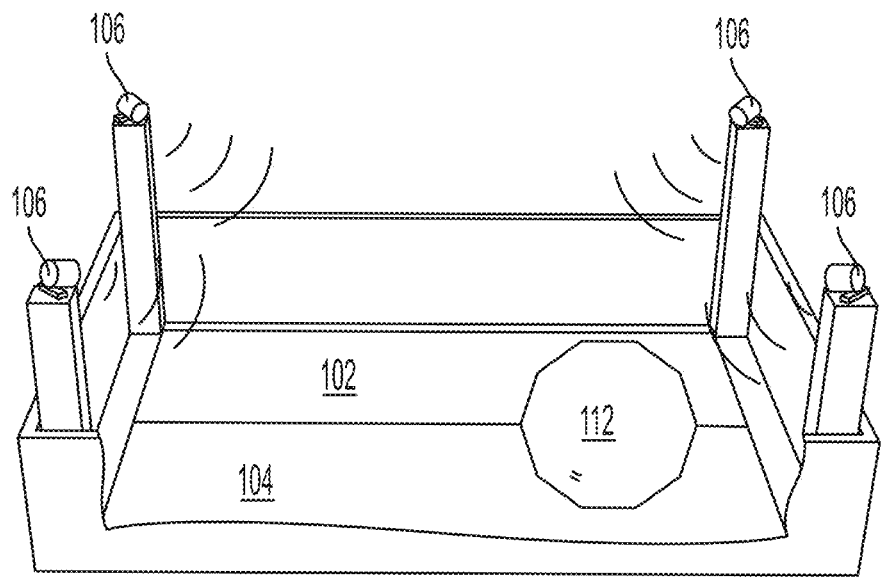
Figure 15A:
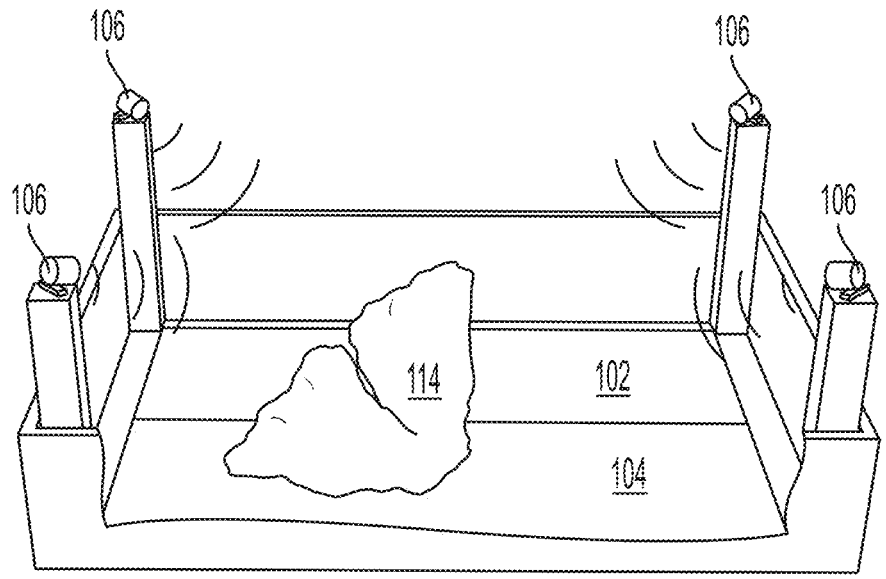
FIGS. 15A-15B show illustrative diagrammatic views of an object with low pose authority in a perception transfer unit moving from a first position and orientation (FIG. 15A) to a second position and orientation (FIG. 15B)
Figure 15B:
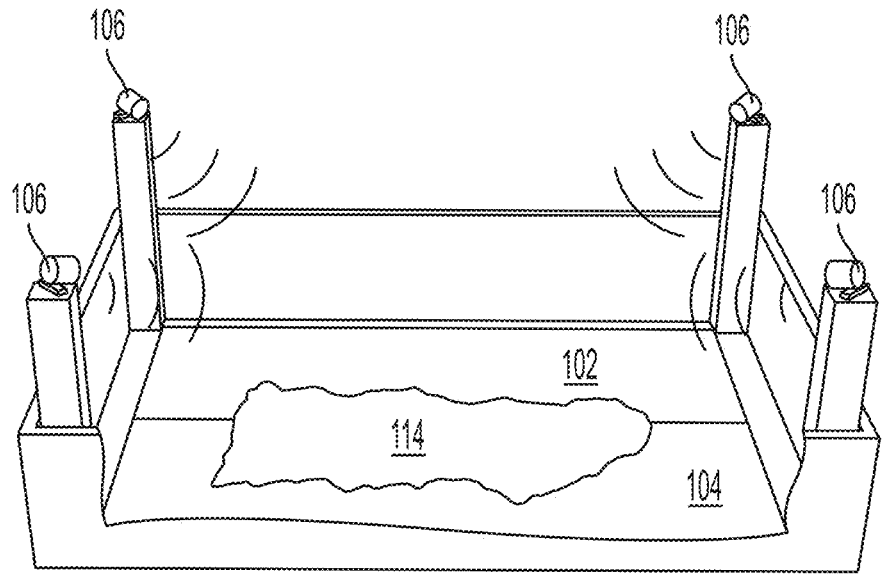

FIGS. 13A and 13B diagrammatically show the generally rectangular object 110 in the perception transfer unit 42 undergoing a change in position and/or orientation with respect to the perception transfer unit 42 while perception units 106 are capturing these changes in position and/or orientation with respect to the perception transfer unit 42. FIG. 13A shows an object in a perception transfer unit moving from a first position and orientation, and FIG. 13B shows the object having moved to a second position and orientation. FIGS. 14A and 14B diagrammatically show a generally spherical object 112 in the perception transfer unit 42 undergoing a change in position and/or orientation with respect to the perception transfer unit 42 while perception units 106 are capturing these changes in position and/or orientation with respect to the perception transfer unit 42. FIG. 14A shows an object with low position authority in a perception transfer unit moving from a first position and orientation, and FIG. 14B shows the object having moved to a second position and orientation. FIGS. 15A and 15B diagrammatically show object 114 in the perception transfer unit 42 that has any of low position authority (e.g., an object that may roll) or low pose authority (e.g., a shipping bag of polyethylene containing one or more objects). FIG. 15A shows an object with low pose authority in a perception transfer unit moving from a first position and orientation, and FIG. 15B shows the object having moved to a second position and orientation. The object 114 is shown undergoing a change in position and/or orientation (and in fact unfolding) with respect to the perception transfer unit 42 while perception units 106 are capturing these changes in position and/or orientation with respect to the perception transfer unit 42.

Figure 16A:
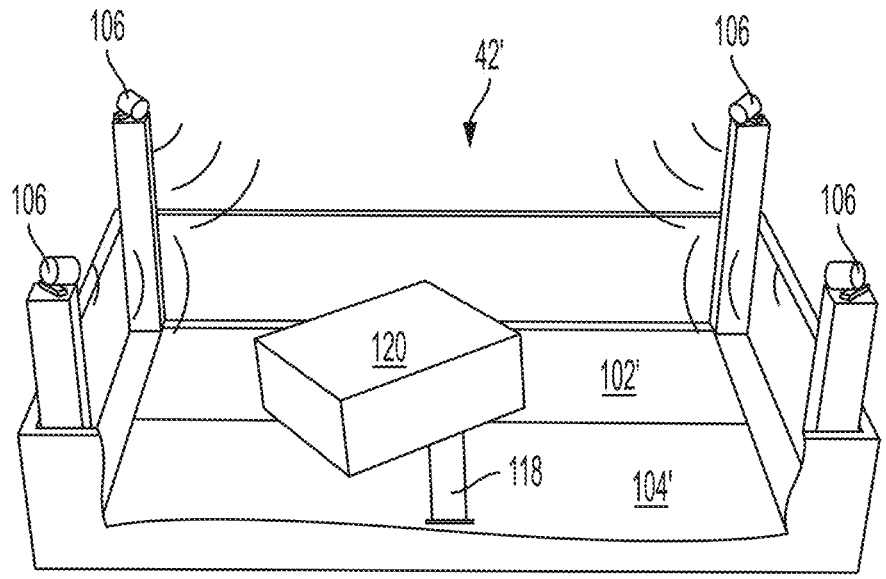
FIGS. 16A-16B show illustrative diagrammatic views of an object in a perception transfer unit of an aspect of the invention that includes actuatable rollers, showing the object in a first position (FIG. 16A), and in a second position upon actuation of the rollers (FIG. 16B)
Figure 16B:
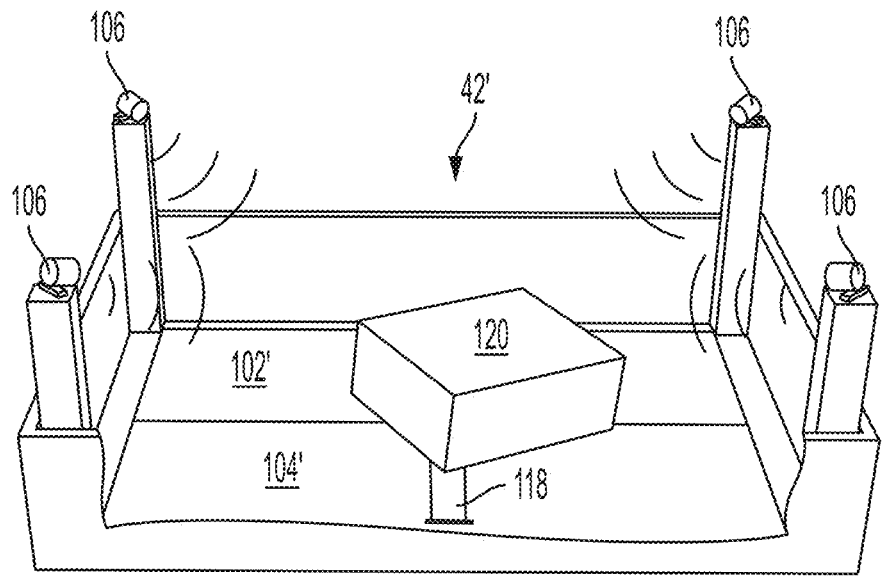
Figure 17A:
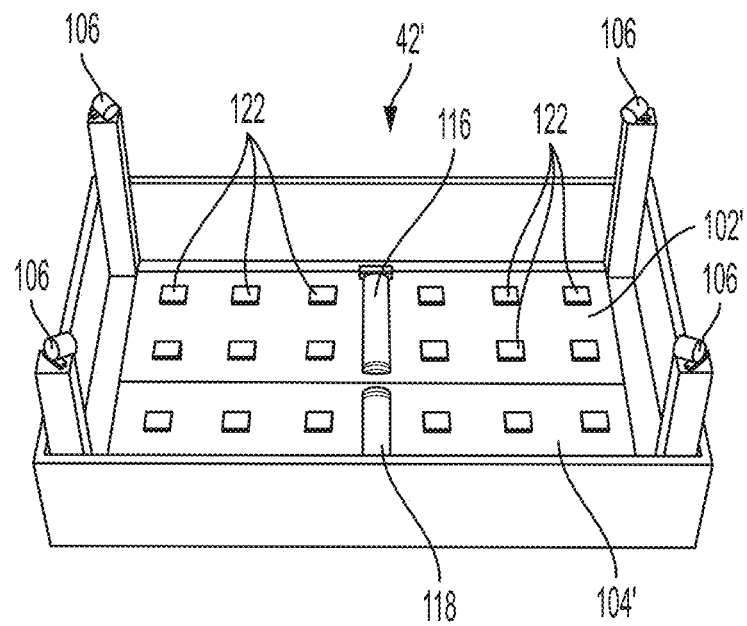
FIGS. 17A-17B show illustrative diagrammatic views of an object in a perception transfer unit of an aspect of the invention that includes actuatable rollers and force sensors, showing the doors in a closed position (FIG. 17A), and showing the doors in an open position (FIG. 17B)
Figure 17B:
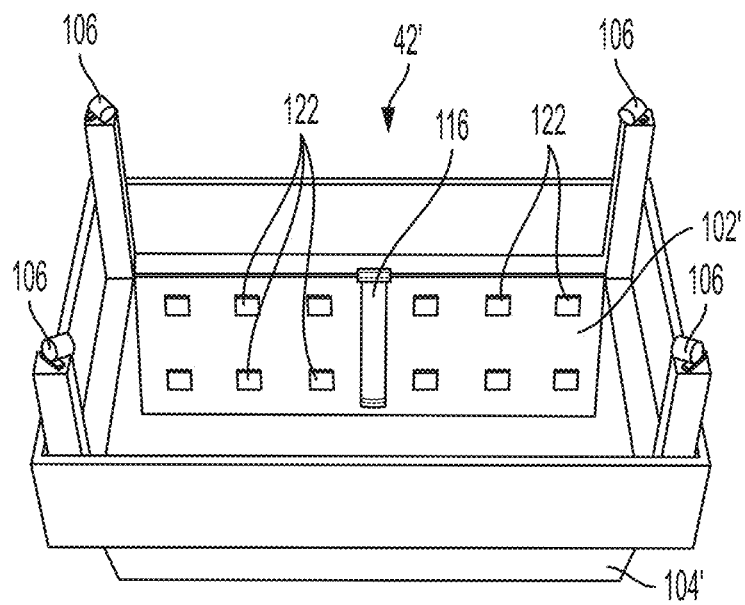

In accordance with a further aspect, the perception transfer unit may include an active element that may be used to elicit a particular response (which particular response may be then used to verify an identity of the object). For example, FIGS. 16A and 16B show a perception transfer unit 42' that includes one or more active rollers (e.g., formed of rubber or polyurethane) that cause an object then to be briefly accelerated over the roller(s) 116, 118. FIG. 16A shows an object in a perception transfer unit of an aspect of the invention that includes actuatable rollers, showing the object in a first position, and FIG. 16B shows the object having moved to a second position upon actuation of the rollers. Roller 116 is shown in FIGS. 17A and 17B. As further shown in FIGS. 17A and 17B, the perception transfer unit 42' may also include a plurality of force sensors 122 for also capturing data regarding an object on the unit 42'. FIG. 17A shows an object in a perception transfer unit of an aspect of the invention that includes actuatable rollers and force sensors, showing the doors in a closed position, and FIG. 17B shows the doors in an open position. Similarly, responses to the movement of the briefly actuated rollers 116, 118 (in addition to other perceived data such as mass, shape and size), may be used to verify an identity of an object, and/or detect a multi-pick. In particular, the system (including the one or more computer processing systems), may access previously stored data regarding expected responses to known items. These expected responses may be provided by any of experience, modelling or associative assignment based on similar objects.

Figure 18:
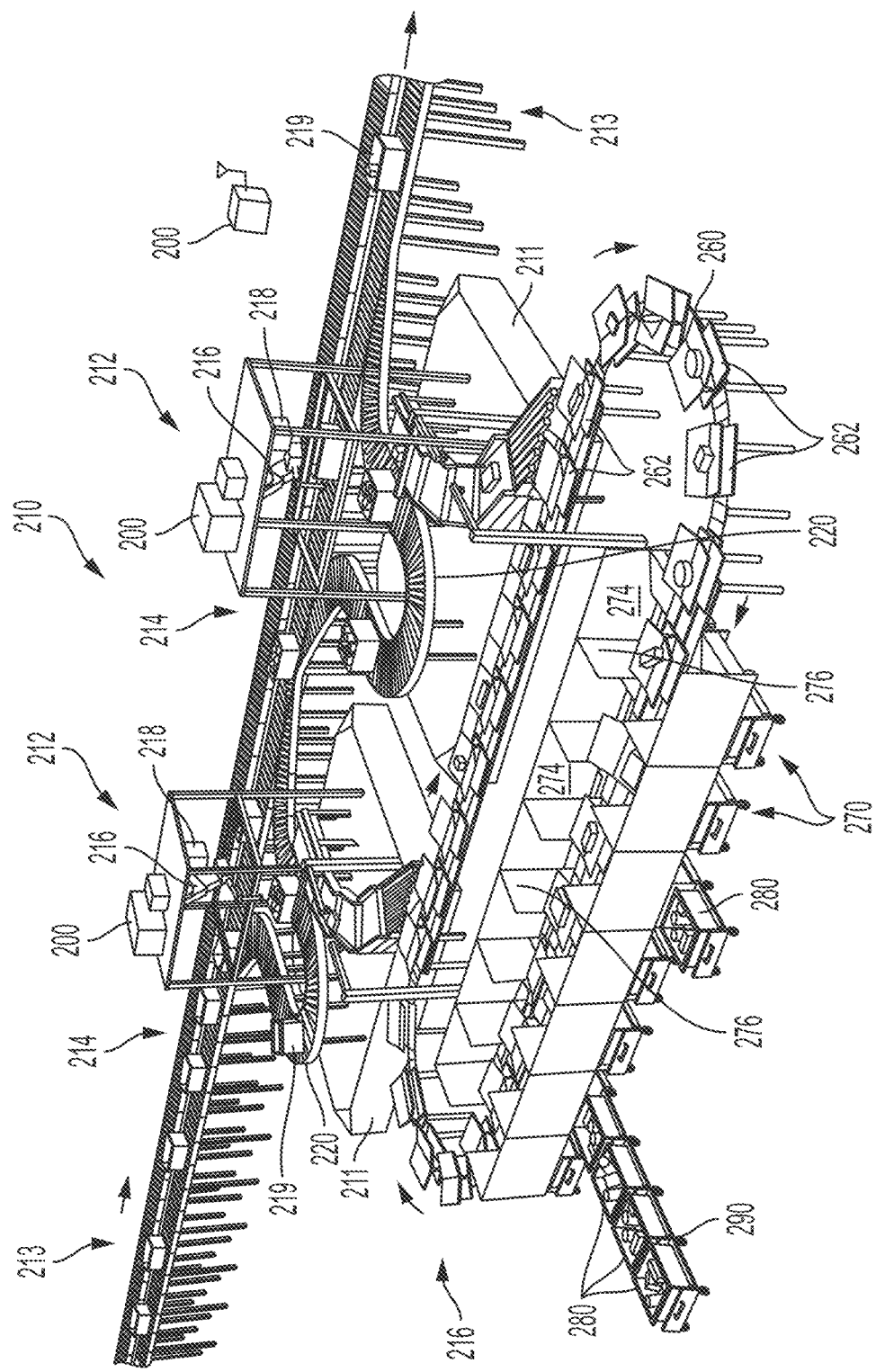
FIG. 18 shows an illustrative diagrammatic view of an object processing system in accordance with a further aspect of the present invention that provides dynamic movement analysis and transfer to a distribution system using a differentially-belted speed matching conveyor.

In accordance with further aspects and with reference to FIG. 18, a dynamic movement analysis system 210 is provided that includes a plurality of processing stations 212 that receive objects at an associated infeed area 214 and provide processed objects at an output area 216. The infeed area 214 may, for example, include one or more input conveyors 213 that may cooperate (via transfer sections) to selectively provide objects (e.g., in-feed containers 219) to processing sections 220 of each processing station 212 via diverters. The output area 216 includes a tilt tray conveyor loop 260 that provides objects to any of a plurality of destination locations 270 that include containers provided in sets (e.g., of four) on movable carts 290.

Figure 19:
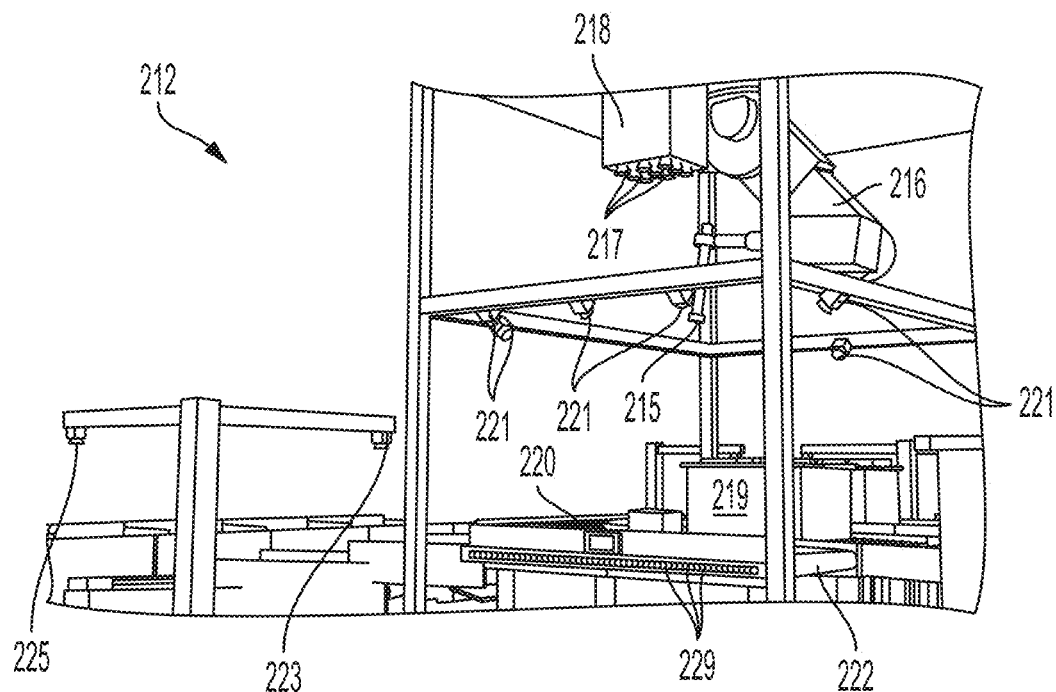
FIG. 19 shows an illustrative diagrammatic underside view a processing station in the system of FIG. 18.

With further reference to FIG. 19, each processing station 212 includes a programmable motion device 216 such as an articulated arm with an end effector 215 for grasping objects from in-feed containers 219 and moving them onto a perception transfer system as discussed in more detail below. Each processing station 212 also includes a top perception system 218 with a plurality of different perception units 217 for assessment dimensional data (including 3D information from 3D scanner(s)), barcode(s) information, RFID information from RFID scanner(s), other label information (e.g., text and symbols), and other identifying features such as color, color combinations, and non-standard shape(s). Each processing station 212 may also include a plurality of additional perception units 221 for determining any further such scan information as well as assisting the programmable motion device 216 in grasping and moving objects.

Figure 20:
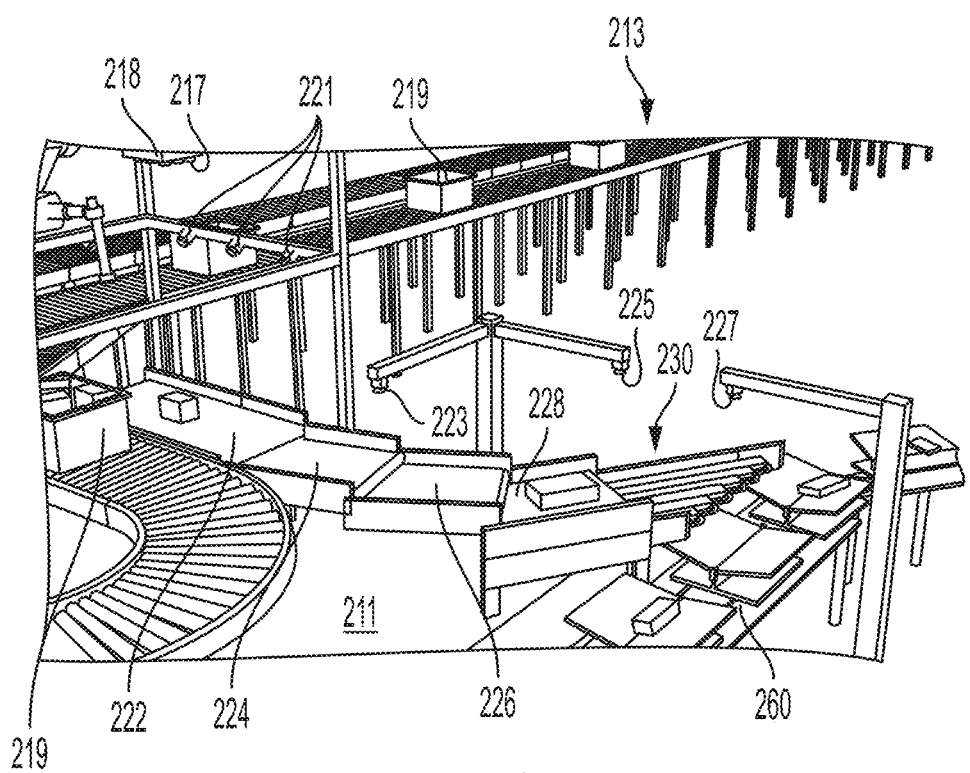
FIG. 20 shows an illustrative diagrammatic view of conveyor sections in the processing station of FIG. 19.
Figure 21A:
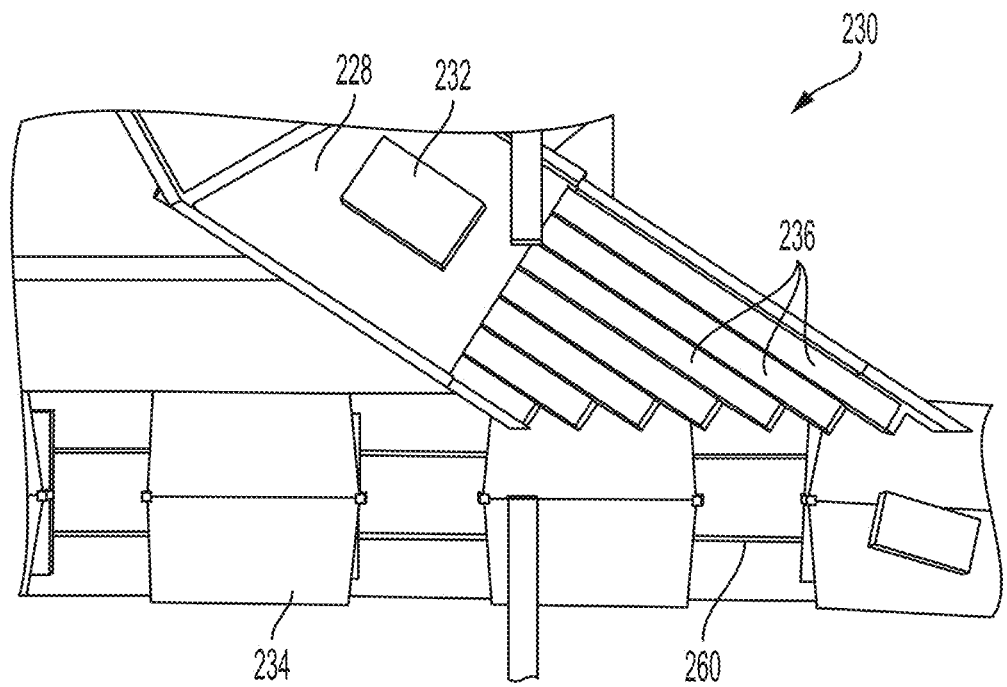
FIGS. 21A-21D show illustrative diagrammatic plan views of a differentially belted conveyor section of the processing station of FIG. 19, showing an object positioned to enter the differentially belted conveyor section (FIG. 21A), entering the differentially belted conveyor section (FIG. 21B); traveling along the differentially belted conveyor section (FIG. 21C), and being discharged from the differentially belted conveyor section (FIG. 21D)
Figure 21B:
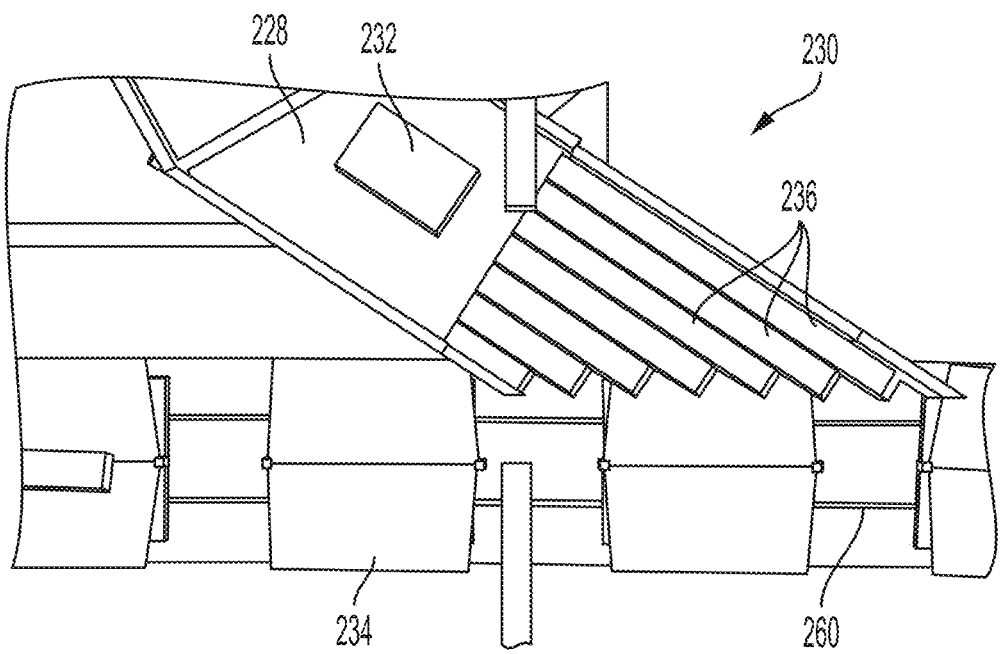
Figure 21C:
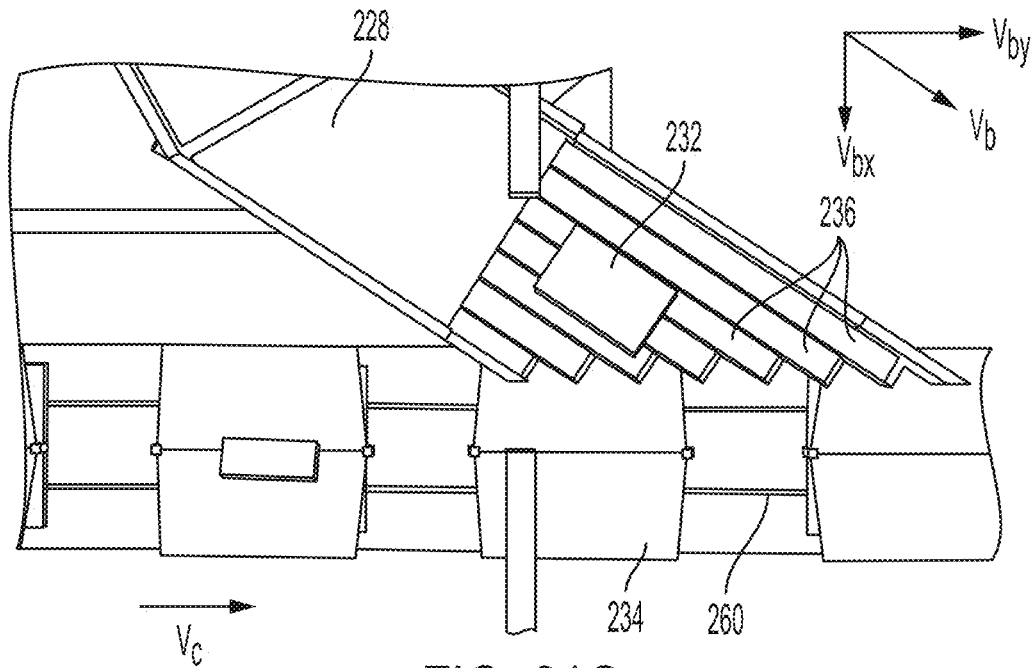
Figure 21D:
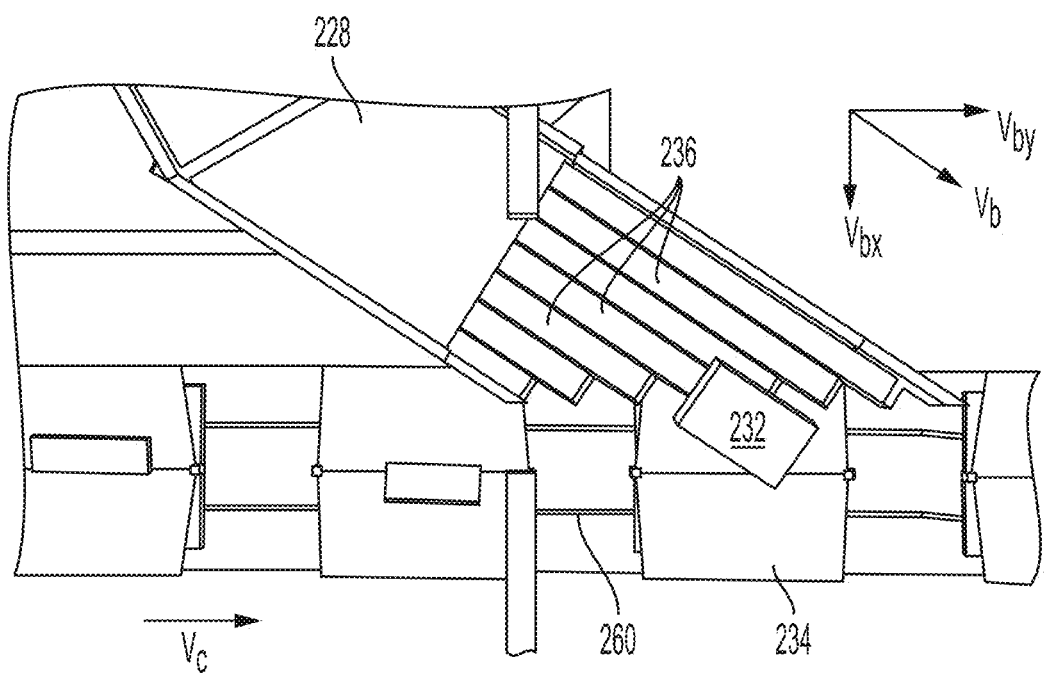

Each processing station 212 also includes a weight sensing conveyor section 222 with a plurality of weight detection sensors 229 such as load cells or force sensors that may determine any of weight, footprint, center of mass, position authority, and/or pose authority of an object placed in the conveyor section 222, providing additional object identification/verification information as shown in FIG. 20. The conveyor section 222 may lead to a series of conveyor sections 224, 226, 228 under one or more additional perception units 223 that are independently motion and speed controllable to buffer each object for delivery at desired times to the tilt tray conveyor loop 260. With further reference to FIGS. 21A and 21B, once an object (e.g., 232) is selected for transfer to a particular tray (e.g., 234) of the tilt tray conveyor 260, perception units 225, 227 may be engaged to monitor the position and speed of the object 232 and the designated tilt-tray 234. FIG. 21A shows an object positioned to enter the differentially belted conveyor section, FIG. 21B shows the object entering the differentially belted conveyor section; FIG. 21C shows the object traveling along the differentially belted conveyor section, and FIG. 21D shows the object being discharged from the differentially belted conveyor section. In particular, the conveyor section 228 will hold the object 232 (FIG. 21A) until the designated tilt tray 234 is aligned with the object (as shown in FIG. 21). Once aligned, the conveyor section 228 will move the object 232 onto conveyance section 230 that includes a plurality of varying length belt conveyors 236.

Figure 22A:
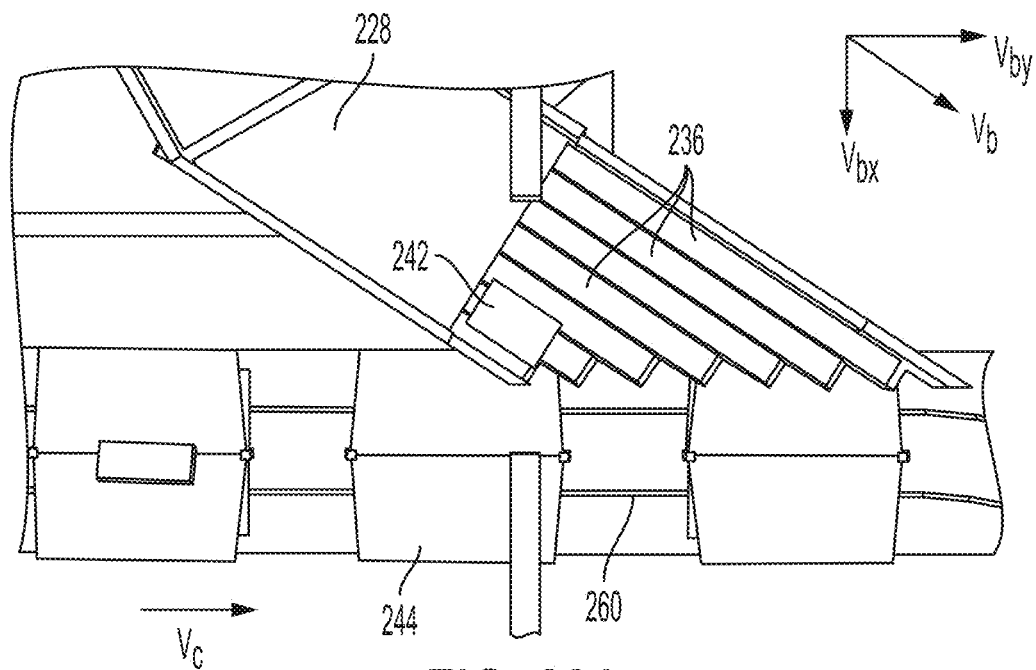
FIGS. 22A-22B show illustrative diagrammatic plan views of the differentially belted conveyor section of FIG. 19 with an object being moved thereon, showing the object entering the differentially belted conveyor section at a first side thereof (FIG. 22A), and being discharged from the differentially belted conveyor section (FIG. 22B)
Figure 22B:
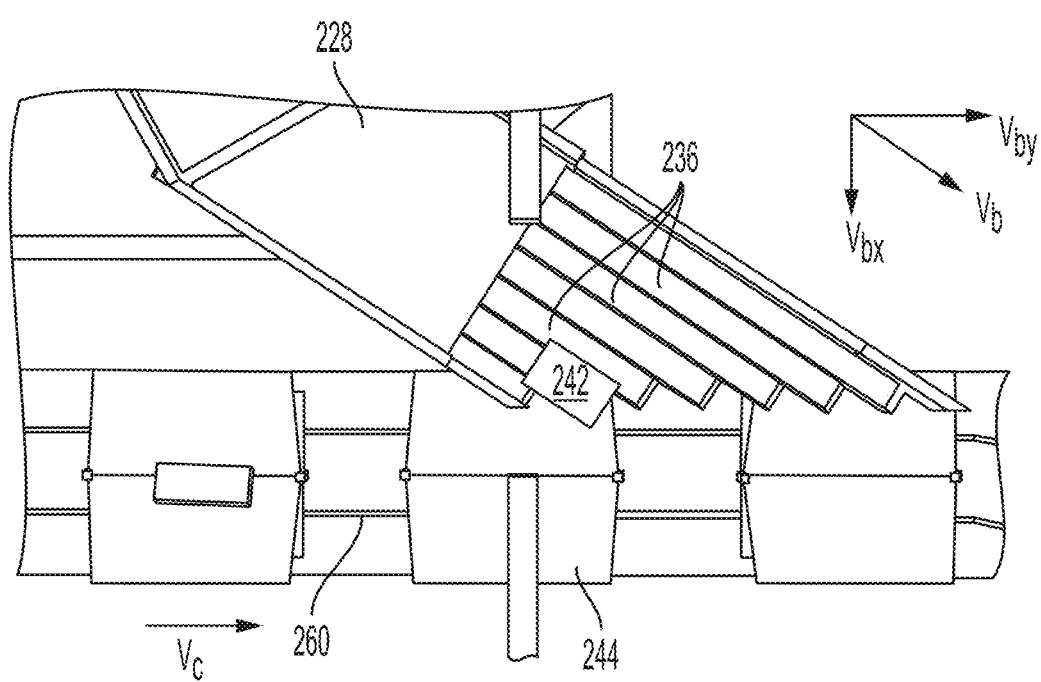
Figure 23A:
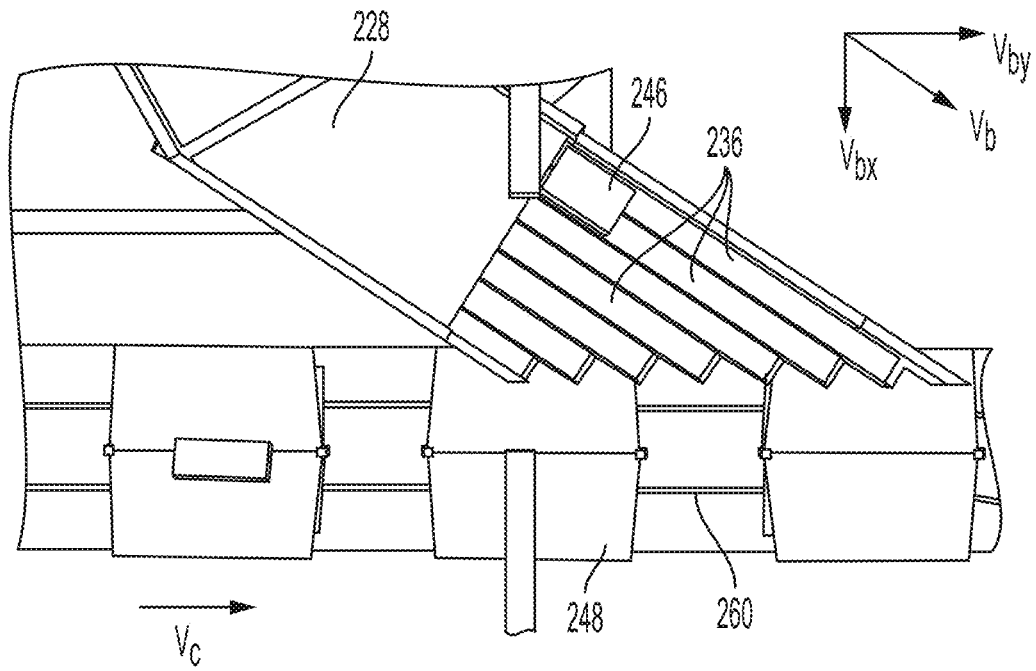
FIGS. 23A-23B show illustrative diagrammatic plan views of the differentially belted conveyor section of FIG. 19 with an object being moved thereon, showing the object entering the differentially belted conveyor section at a second side thereof (FIG. 23A), and being discharged from the differentially belted conveyor section (FIG. 23B)
Figure 23B:
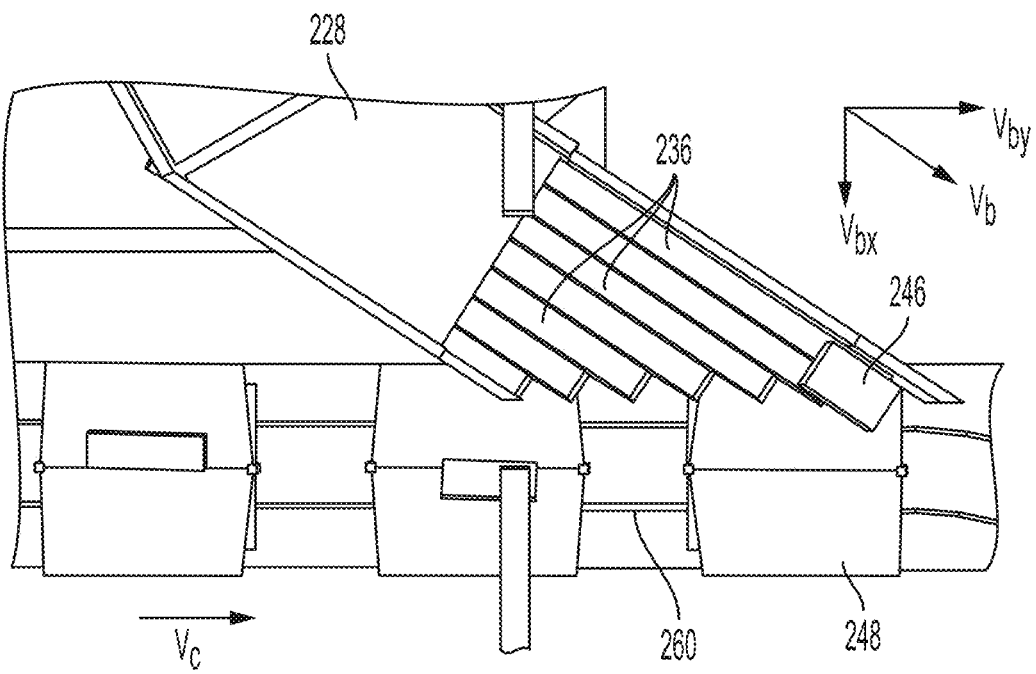

The belt conveyors 236 move in a belt direction at a speed of $V_b$ and the conveyor loop 260 moves in a conveyor direction (at the area of transfer) at a speed of $V_c$. With reference to FIG. 21C, if an X-Y grid is applied, for example, with the Y direction along the direction of the conveyor ($V_c$), then the vector for the speed $V_b$ will have X and Y components ($V_{bX}$, $V_{bY}$) as shown. In accordance with certain aspects, the speed $V_{bY}$ should be the same as the speed $V_c$. In other words, the component of the speed of the belts 236 in the direction of movement of the conveyor 260 should be matched. The will ensure that as the object travels on the belts 236, the object (e.g., 232) will contact the selected tilt tray (e.g., 234 as shown in FIG. 21D) regardless of which of the plurality of belts 236 carries the object. FIG. 22A shows the object entering the differentially belted conveyor section at a first side thereof, and FIG. 22B shows the object being discharged from the differentially belted conveyor section. In particular, if an object 242 destined for tilt-tray 244 is provided on the shortest belts 236 as shown in FIG. 22A, the object 242 will properly contact the selected tilt-tray 244 as shown in FIG. 22B. Showing the object entering the differentially belted conveyor section at a first side thereof (FIG. 22A), and being discharged from the differentially belted conveyor section (FIG. 22B). Similarly, if an object 246 destined for tilt-tray 248 is provided on the longest belts 236 as shown in FIG. 23A, the object 242 will properly contact the selected tilt-tray 248 as shown in FIG. 23B. FIG. 23A shows the object entering the differentially belted conveyor section at a second side thereof, and FIG. 23B shows the object being discharged from the differentially belted conveyor section. Even though the opening area at the discharge end of the belt conveyor section 230 is larger than a single tilt-tray, the objects will be properly loaded onto the selected tilt-trays.

Figure 24A:
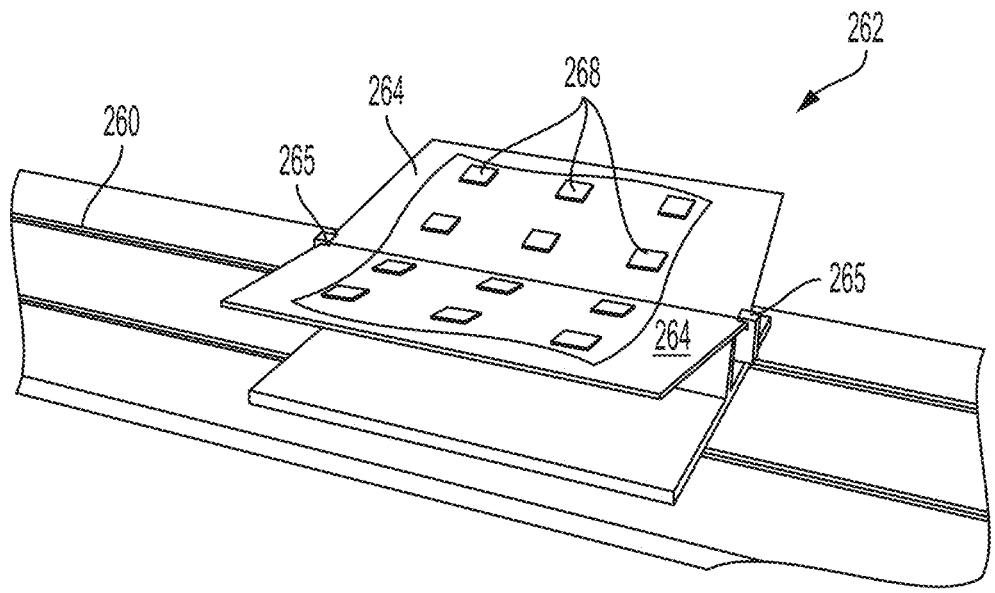
FIGS. 24A-24B show illustrative diagrammatic cut-away views of a weight-sensing tilt-tray of a system in accordance with an aspect of the present invention, showing the weight sensing tilt-tray in a loading position (FIG. 24A), and showing the weight sensing tilt-tray in a discharge position (FIG. 24B)
Figure 24B:
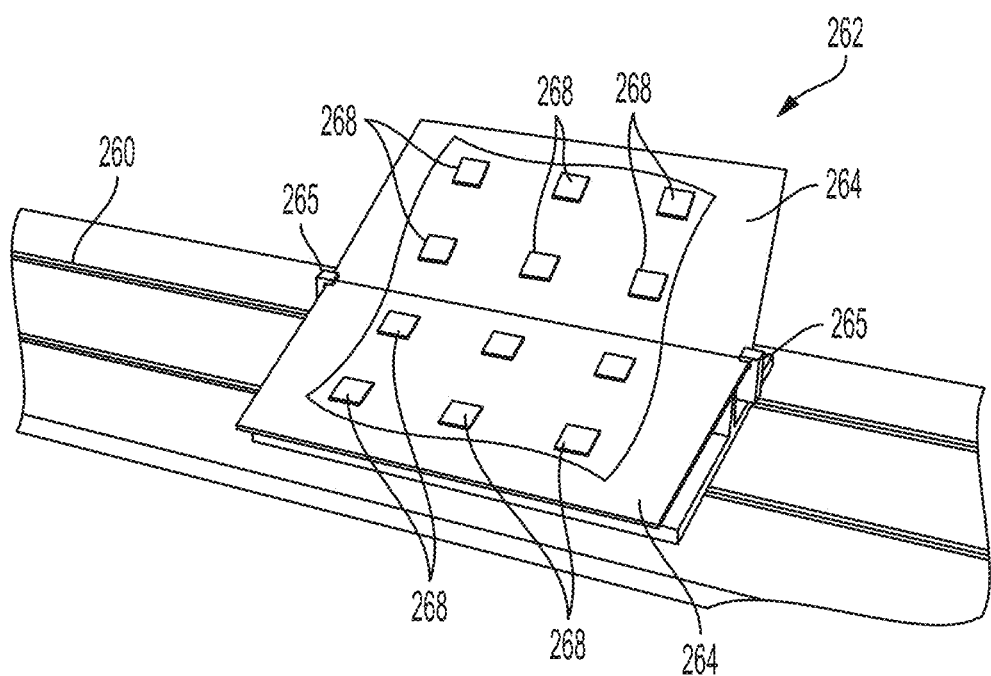

With further reference to FIGS. 24A and 24B, each tilt-tray (e.g., 262) includes a pair of tray sections 264 that form a V-shaped support structure that is mounted on a base 266 for pivotable movement with respect to the base 266. FIG. 24A shows the weight sensing tilt-tray in a loading position, and FIG. 24B shows the weight sensing tilt-tray in a discharge position. In particular, FIG. 24A shows the tilt-tray sections in a non-pivoted position in which they may receive and carry and object. The pivotable movement may be actuated by pivot motors 265, and when tilted as shown in FIG. 24B, cause an object on the tray sections 264 to be dropped from the tilt-tray 262. As shown in the broken-away sections of the tilt-tray sections 264 in FIGS. 24A and 24B, each tilt-tray section may be provided with interior weight sensors 268 such as force sensors or load cells, which provide information regarding an object (such as weight) on the tilt-tray. Each set of sensors or load cells 268 may be sandwiched between plates to form a tray section. Weight data from the sensors 268 may also be used to confirm receipt of an object as well as discharge of the object from the tilt-tray.

Figure 25A:
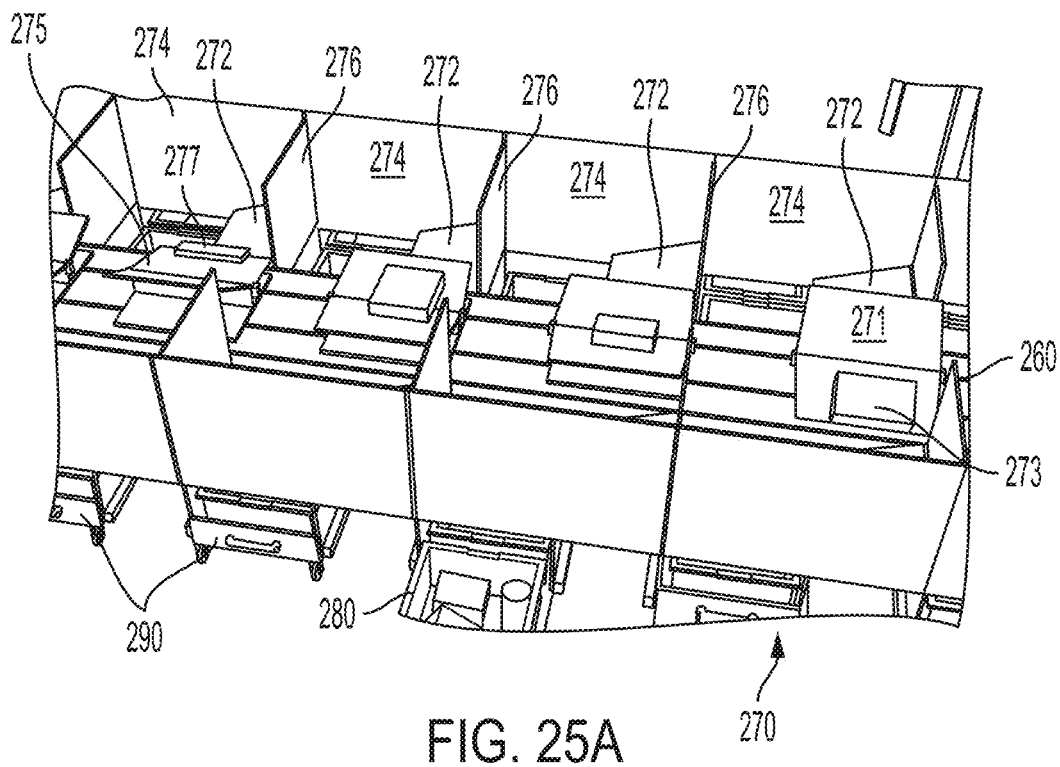
FIGS. 25A-25B show illustrative diagrammatic views of an output area of the system of FIG. 18, showing a tilt-tray beginning to discharge an object while moving (FIG. 25A), and fully discharging the object while still moving (FIG. 25B)
Figure 25B:
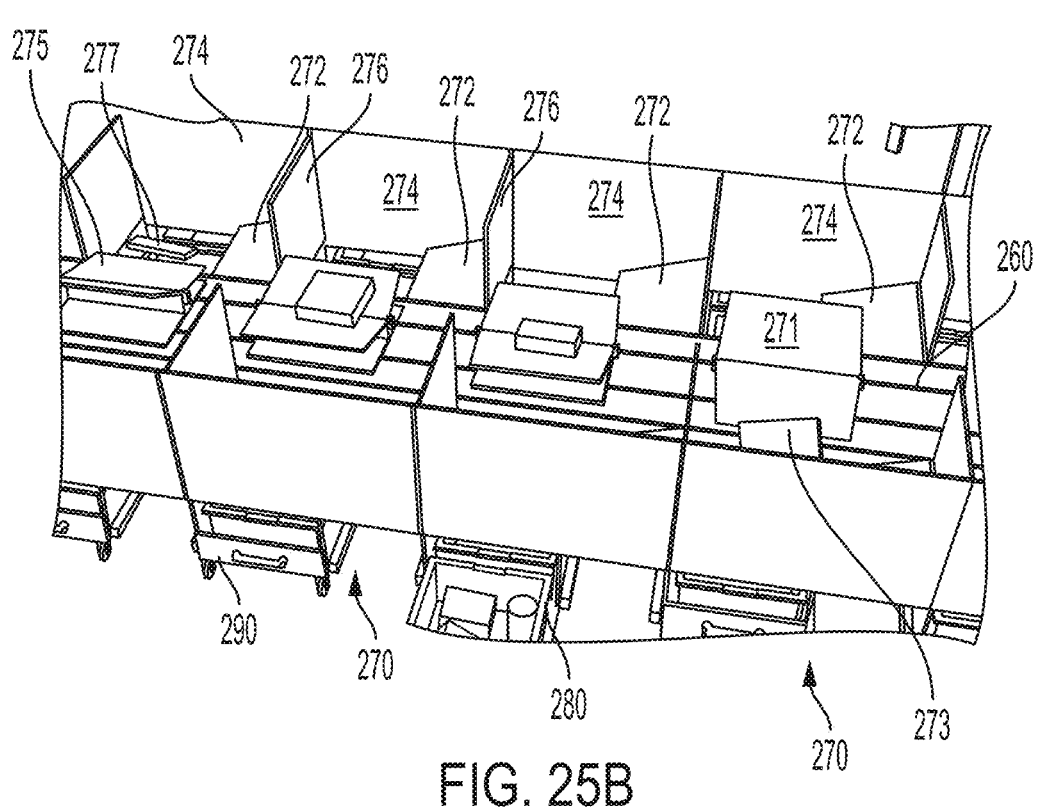

The tilt trays on the tilt-tray conveyor 260 bring the objects to the output area 216 that includes the destination stations 270 as shown in FIG. 18. With reference to FIG. 25A, as tilt-trays (e.g., 271, 275) travel along the conveyor 260, the tilt-trays begin to tilt to drop an object thereon into the selected destination location 270 as it is dropped from a tilt-tray while the tilt-tray conveyor is moving. FIG. 25A shows the tilt-tray beginning to discharge an object while moving, and FIG. 25B shows the tilt-tray fully discharging the object while still moving. Each destination location 270 includes an associated ramp surface 272 as well as a back wall 274 and side wall(s) 276, which help guide an object into the destination location 270. For example, FIG. 25A shows tilt-tray 271 beginning to drop an object 273 into a destination location on one side of the conveyor 260, and also shows a tilt-tray 275 beginning to drop an object 277 into a different destination location on the other side of the conveyor 260. With reference to FIG. 25B, as the conveyor 260 moves, the objects (273 and 277) separate from the respective tilt-trays and drop into the selected destination locations.

Figure 26A:
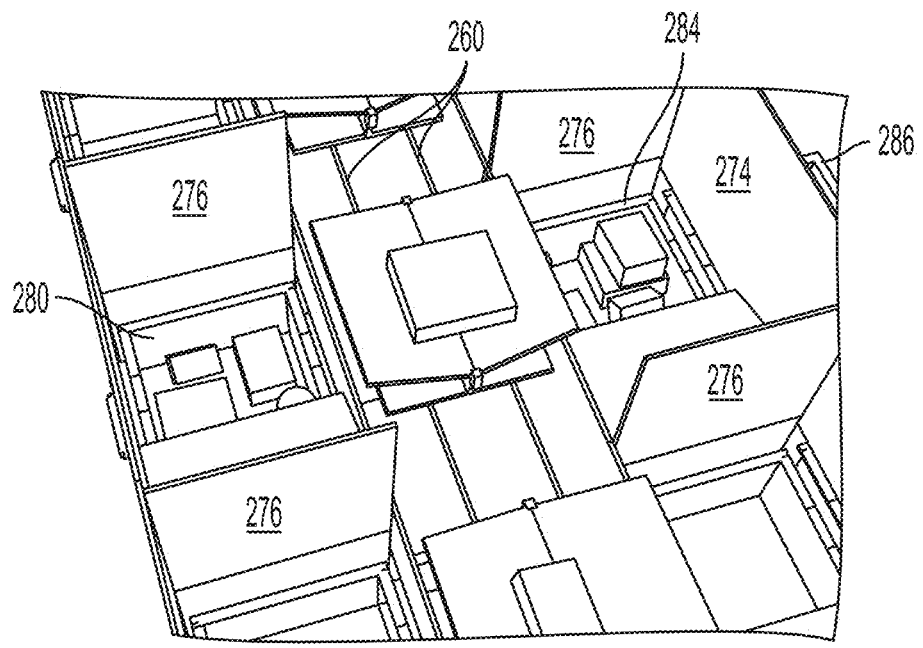
FIGS. 26A-26B show illustrative diagrammatic views of pull-out drawers of the output area of the system of FIG. 18, showing a drawer being processed (FIG. 26A), and showing the drawer being removed for processing of the destination containers (FIG. 26B)
Figure 26B:
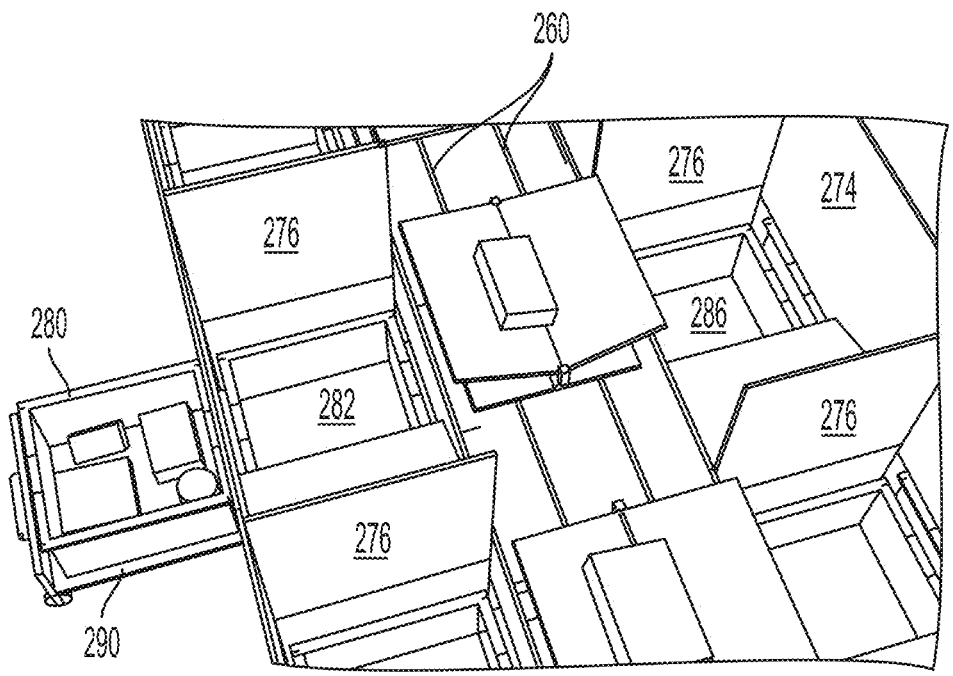

Each destination location 270 may include a container (such as a bin, a box or a tote), and multiple containers may be provided on a single pull-out drawer 290. Each pull-out drawer 290 may include, for example, a container on either side of the tilt-tray conveyor 260. In certain embodiments, two containers may be assigned to each opposing set of destination locations. In particular, FIGS. 26A and 26B show a pull-out drawer 290 that includes four containers 280, 282, 284 and 286. FIG. 26A shows the drawer being processed, and FIG. 26B shows the drawer being removed for processing of the destination containers. In FIG. 26A, containers 280 and 284 are provided at the destination locations on either side of the tilt-tray conveyor 260. When both of the containers 280, 284 are completed or otherwise finished with the processing, the drawer 290 may be moved (as shown in FIG. 26B) to expose containers 282 and 286 at the destination locations vacated by the containers 280 and 284. In this way, four containers may service two destination locations.

Figure 27A:
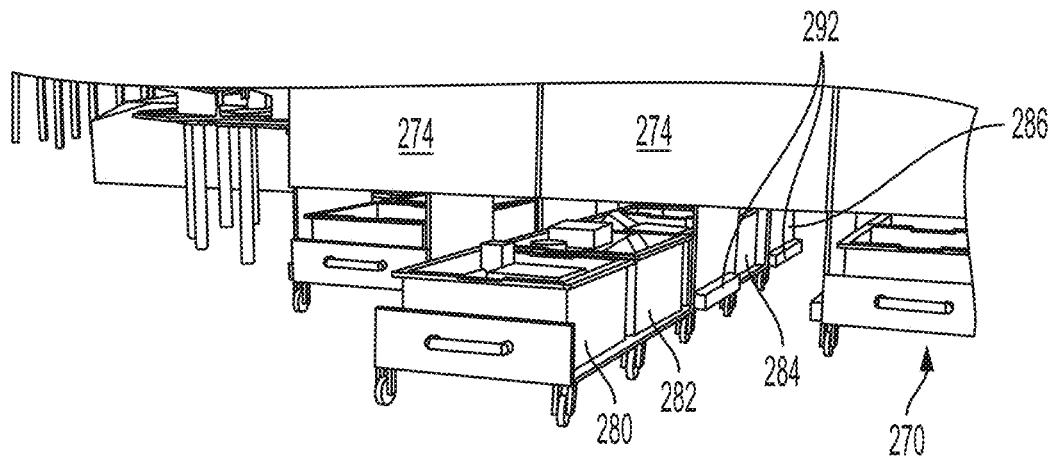
FIGS. 27A-27B show illustrative diagrammatic views of the pull-out drawer of FIGS. 26A-26B, showing the drawer partially withdrawn (FIG. 27A), and fully withdrawn (FIG. 27B)
Figure 27B:
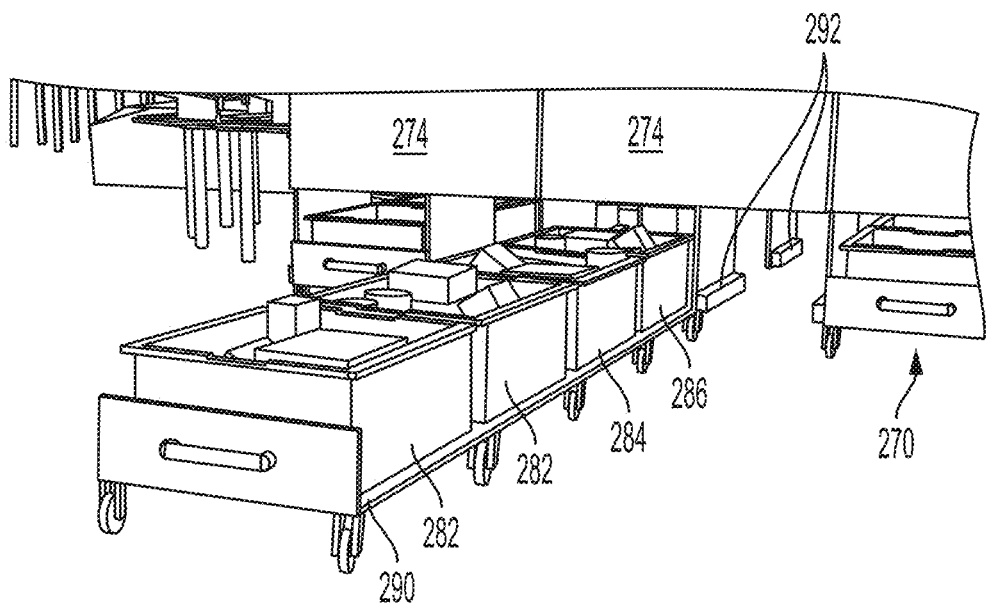
Figure 28:
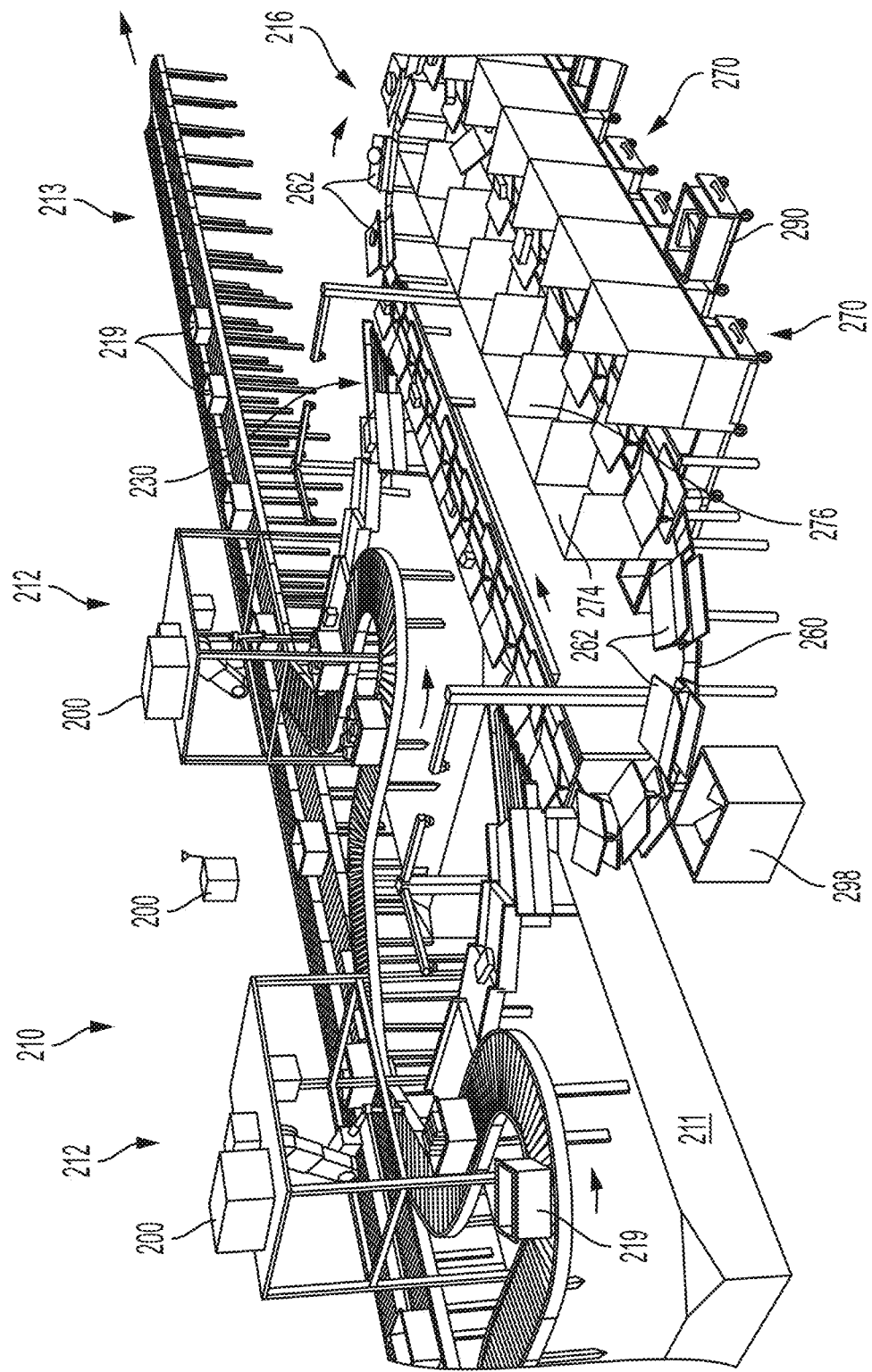
FIG. 28 shows an illustrative diagrammatic view of an object processing system of FIG. 18, showing a designated exceptions bin.

FIG. 27A shows the drawer 290 partially pulled out from the output section 216, and FIG. 27B shows the drawer 290 fully removed from the output section 216. Movement of the drawer may be automated by using linear gear motors 292 that engage each drawer 290 to move the drawer as required. Any of the destination locations may also be designated to provide an exceptions container into which objects are dropped that may not be otherwise processed by the system. In certain embodiments, a designated exceptions bin 298 may be provided apart from the destination locations as shown in FIG. 28, which shows the system 210 from the in-feed side. The exceptions bin 298 may, for example, be positioned downstream of the destination locations pass. Tilt-trays including objects that are unknown or that have associated inconsistencies (e.g., with any of 3D information, barcode(s) information, RFID information, other label information (e.g., text and symbols), and other identifying features such as color, color combinations, and non-standard shape(s)) as compared with any known or perceived information regarding the object, the object may be dropped into the exceptions bin 298.

Figure 29:
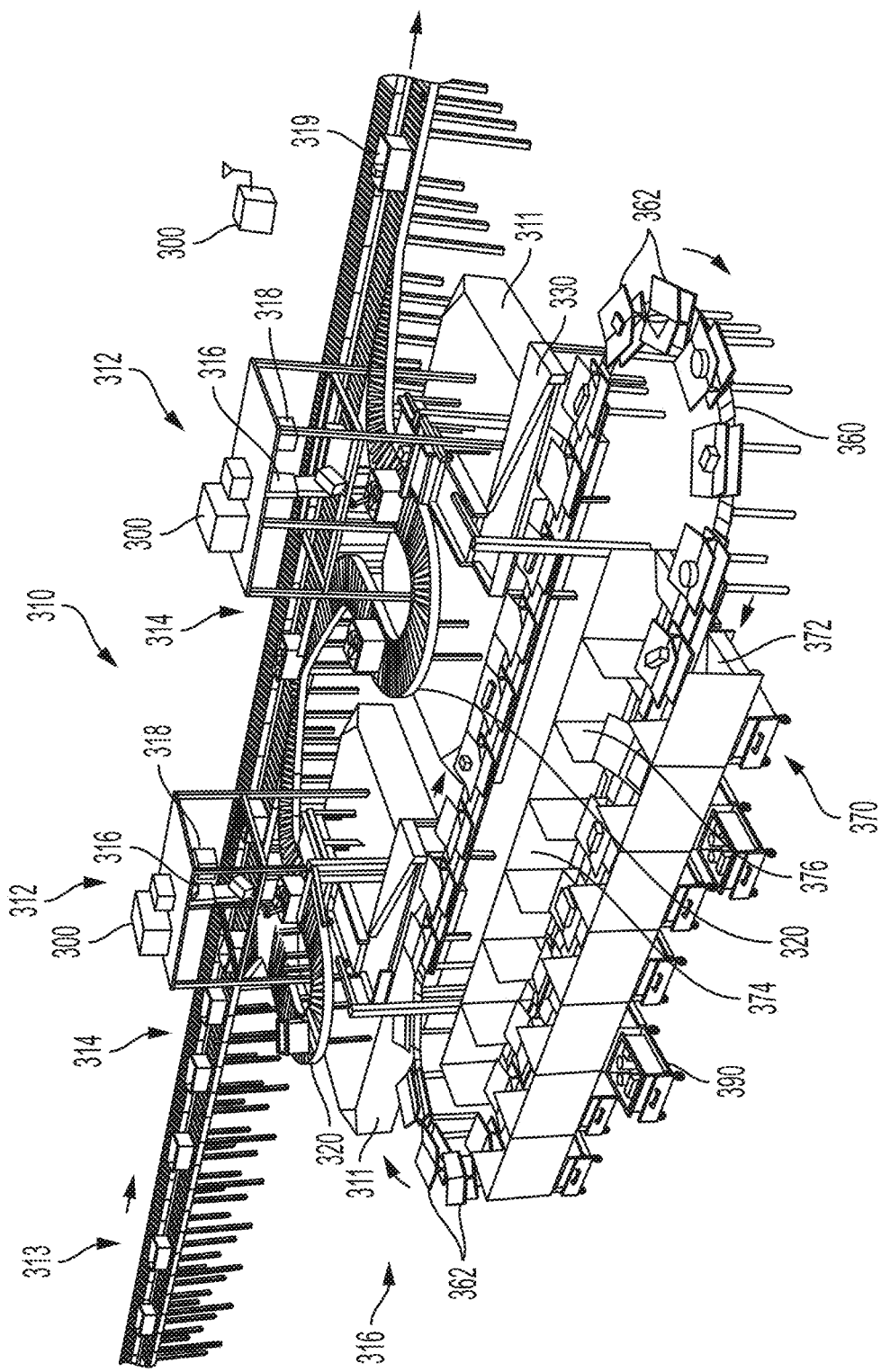
FIG. 29 shows an illustrative diagrammatic view of an object processing system in accordance with a further aspect of the present invention that provides dynamic movement analysis and transfer to a distribution system using a single belted speed matching conveyor.

In accordance with further aspects and with reference to FIG. 29, a dynamic movement analysis system 310 is provided that includes a plurality of processing stations 312 that receive objects at an associated infeed area 314 and provide processed objects at an output area 316. The infeed area 314 may, for example, include one or more input conveyors 313 that may cooperate (via transfer sections) to selectively provide objects (e.g., in in-feed containers 319) to processing sections 320 of each processing station 312 via diverters. The output area 316 includes a tilt tray conveyor loop 360 that provides objects to any of a plurality of destination locations 370 that include containers provided in sets (e.g., of four) on movable carts 390.

Figure 30:
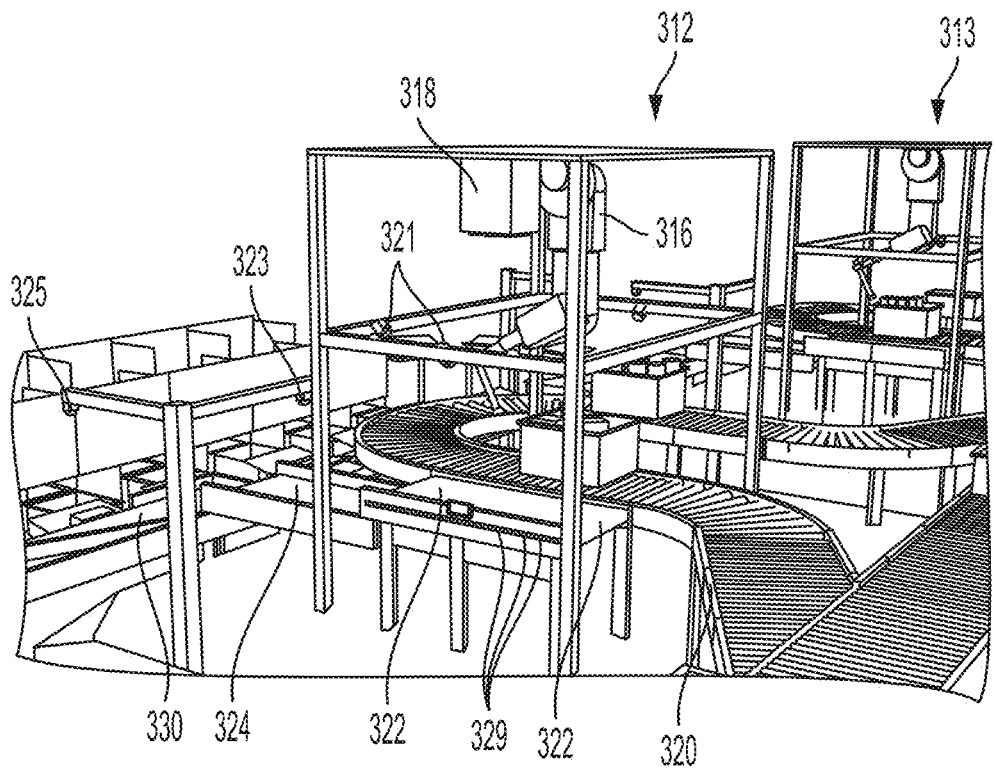
FIG. 30 shows an illustrative diagrammatic underside view a processing station in the system of FIG. 29.

With further reference to FIG. 30, each processing station 312 includes a programmable motion device 316 such as an articulated arm with an end effector 315 for grasping objects from in-feed containers 319 and moving them onto a perception transfer system as discussed in more detail below. Each processing station 312 also includes a top perception system 318 with a plurality of different perception units 317 for determining assessment data (including 3D information from 3D scanner(s)), barcode(s) information, RFID information from RFID scanner(s), other label information (e.g., text and symbols), and other identifying features such as color, color combinations, and non-standard shape(s). Each processing station 312 may also include a plurality of additional perception units 321 for determining any further such scan information as well as assisting the programmable motion device 316 in grasping and moving objects.

Figure 31:
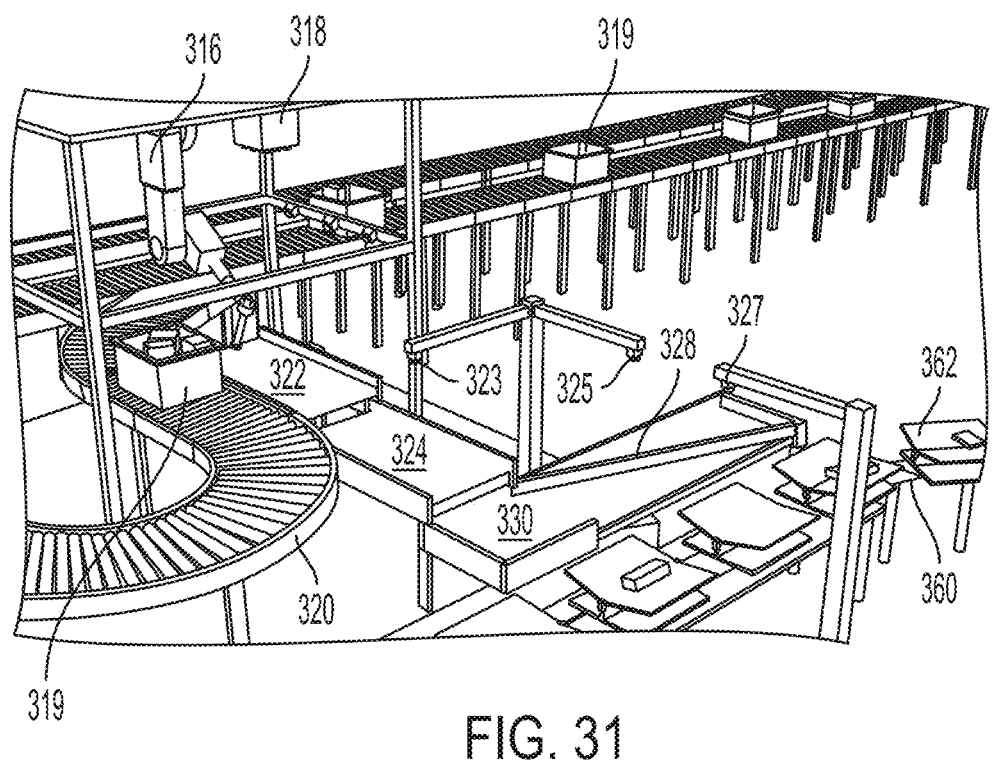
FIG. 31 shows an illustrative diagrammatic view of conveyor sections in the processing station of FIG. 29.
Figure 32A:
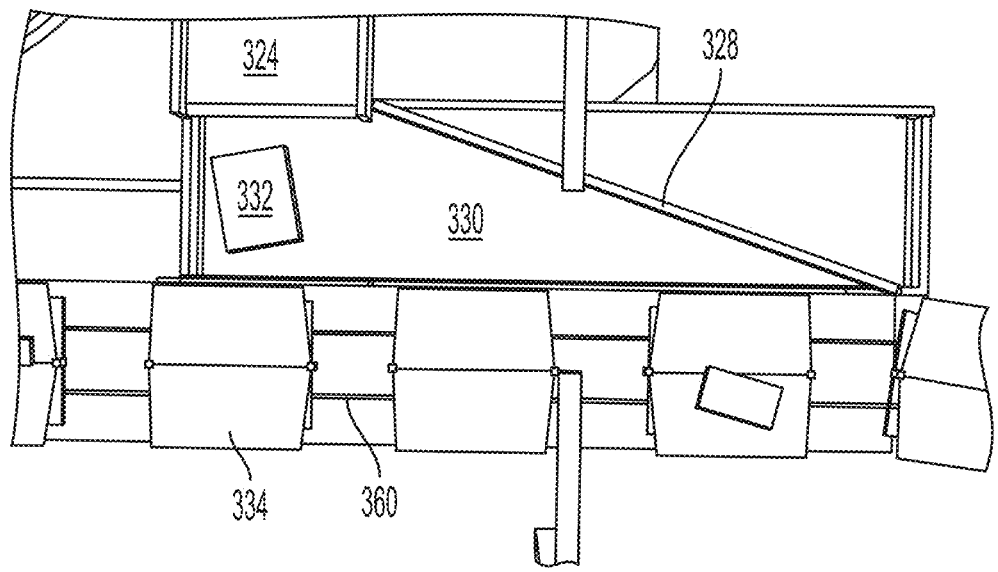
FIGS. 32A-32B show illustrative diagrammatic plan views of the single belted conveyor section of FIG. 29 with a large object being moved thereon, showing the object on the single belted conveyor section at a first end thereof (FIG. 32A), and being discharged from the single belted conveyor section (FIG. 32B)
Figure 32B:
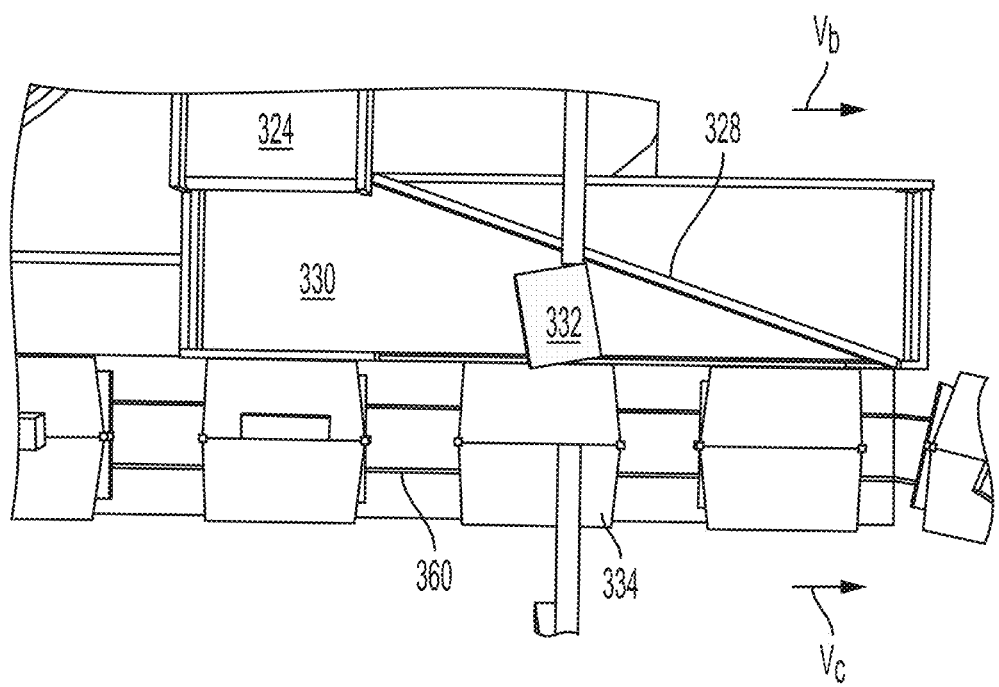

Each processing station 312 also includes a weight sensing conveyor section 322 with a plurality of weight sensors 329 such as load cells or force sensors that may determine any of weight, footprint, center of mass, position authority, and/or pose authority of an object placed in the conveyor section 322, providing additional object identification/verification information. The conveyor section 322 may lead to a series of conveyor sections 324, 326 under one or more additional perception units 323 that are independently motion and speed controllable act to buffer each object for delivery at desired times to the tilt tray conveyor loop 360 as shown in FIG. 31. With further reference to FIGS. 32A and 32B, once an object (e.g., 332) is selected for transfer to a particular tray (e.g., 334) of the tilt tray conveyor 360, perception units 225, 227 may be employed to monitor the position and speed of the object 232 and the designated tilt-tray 234. In particular, the conveyor section 328 will hold the object 332 (FIG. 32A) until the desired tilt tray 334 is aligned with the object (as shown in FIG. 32B). Once aligned, the conveyor section 328 will move the object 332 onto conveyance section 330 that includes a transfer bar 328 that urges objects off of the conveyor section 330 onto the tilt-tray conveyor.

Figure 33A:
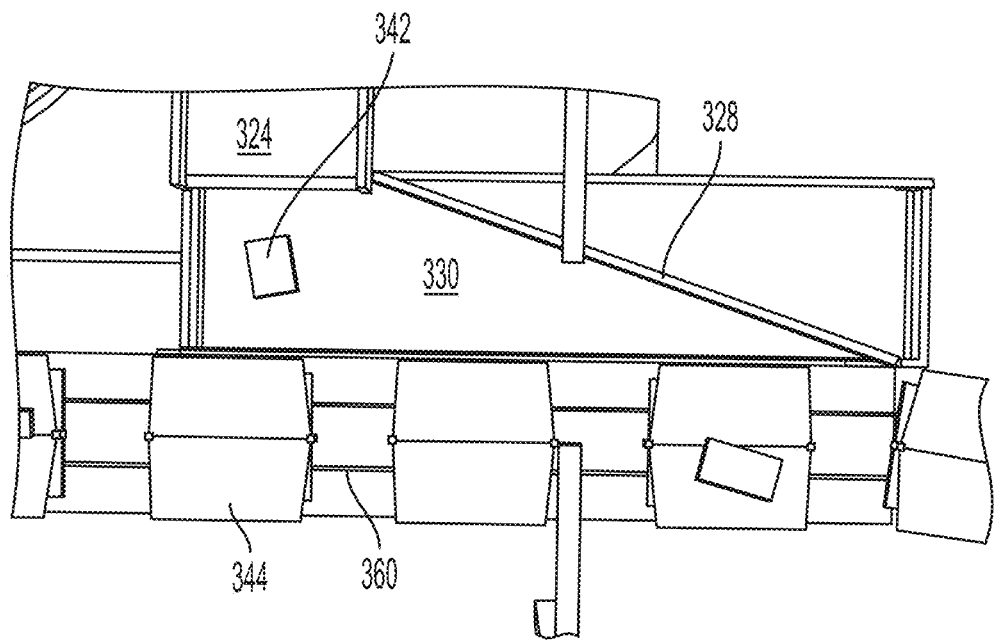
FIGS. 33A-33B show illustrative diagrammatic plan views of the single belted conveyor section of FIG. 29 with a small object being moved thereon, showing the object on the single belted conveyor section at a first end thereof (FIG. 33A), and being discharged from the single belted conveyor section from further along the single belted conveyor section (FIG. 33B)
Figure 33B:
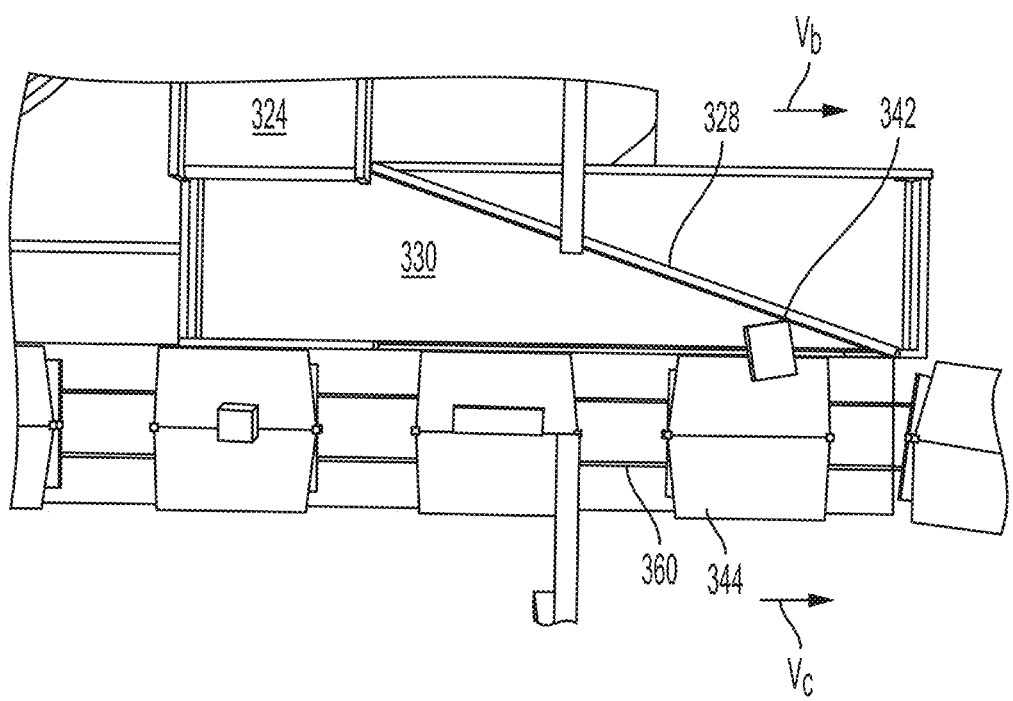

The belt conveyor section 330 moves in a belt conveyor direction at a speed of $V_b$ and the conveyor loop 360 moves in a conveyor direction (at the area of transfer) at a speed of $V_c$, which speeds should be very closely matched. This will ensure that as the object travels on the conveyor section 330, the object (e.g., 332) will contact the selected tilt tray (e.g., 334) regardless of size and where on the conveyor section 330 the object is carried by having the object urged by the transfer bar 328 onto the associated tilt-tray regardless of when the transfer occurs. FIGS. 32A and 32B show the processing of a fairly large object, and FIGS. 33A and 33B show the processing of a smaller object. FIG. 32A shows the object on the single belted conveyor section at a first end thereof, and FIG. 32B shows the object being discharged from the single belted conveyor section. In particular, if an object 342 destined for tilt-tray 344 is provided a smaller object as shown in FIG. 33A, the object 342 will properly contact the selected tilt-tray 344 as shown in FIG. 33B by traveling further along the belt conveyor section 330 until urged by the transfer bar 328 off of the conveyor section 330. FIG. 33A shows the object on the single belted conveyor section at a first end thereof, and FIG. 33B shows the object being discharged from the single belted conveyor section from further along the single belted conveyor section.

As discussed above with reference to FIGS. 24A and 24B, each tilt-tray (e.g., 334, 344) includes a pair of tray sections that form a V-shaped support structure that is mounted on a base for pivotable movement with respect to the base. Each tilt-tray section may be provided with interior weight sensor, which provide information regarding an object (such as weight) on the tilt-tray as discussed above. Each set of weight sensors may be sandwiched between plates to form a tray section. Weight data from the sensors may also be used to confirm receipt of an object as well as discharge of the object from the tilt-tray.

As also discussed above, the tilt trays on the tilt-tray conveyor 360 bring the objects to the output area 316 that includes the destination stations 370. As the tilt-trays travel along the conveyor 360, the tilt-trays begin to tilt to drop an object thereon into the selected destination location 370. Each destination location 370 includes an associated ramp surface as well as a back wall and side wall(s) as discussed above, which help guide an object into the destination location 370.

Each destination location 370 may include a container (such as a bin, a box or a tote), and multiple containers may be provided on a single pull-out drawer 390, and each pull-out drawer 390 may include, for example, a container on either side of the tilt-tray conveyor 360 as discussed above. Again, in certain embodiments, two containers may be assigned to each opposing set of destination locations, and four containers may service two destination locations.

Figure 34:
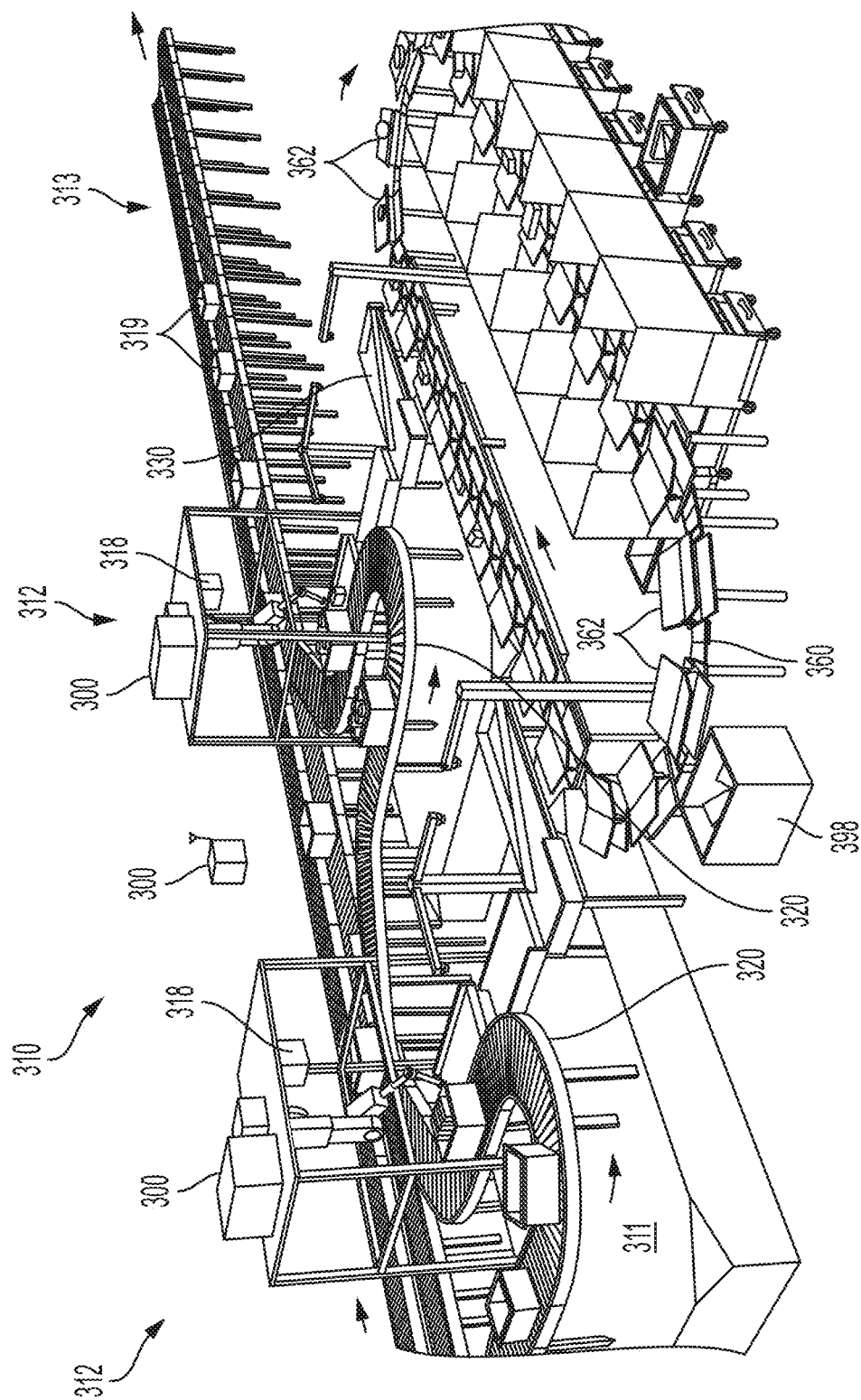
FIG. 34 shows an illustrative diagrammatic view of an object processing system of FIG. 29, showing a designated exceptions bin.

Again, movement of the drawer may be automated by using linear gear motors that engage each drawer 390 to move the drawer as required. Any of the destination locations may also be designated to provide an exceptions container into which objects are dropped that may not be otherwise processed by the system. In certain embodiments, a designated exceptions bin 398 may be provided apart from the destination locations as shown in FIG. 34, which shows the system 310 from the in-feed side. The exceptions bin 398 may, for example, be positioned downstream of the destination locations pass. Tilt-trays including objects that are unknown or that have associated inconsistencies (e.g., with any of 3D information, barcode(s) information, RFID information, other label information (e.g., text and symbols), and other identifying features such as color, color combinations, and non-standard shape(s)) as compared with any known or perceived information regarding the object, the object may be dropped into the exceptions bin 398.

Figure 35:
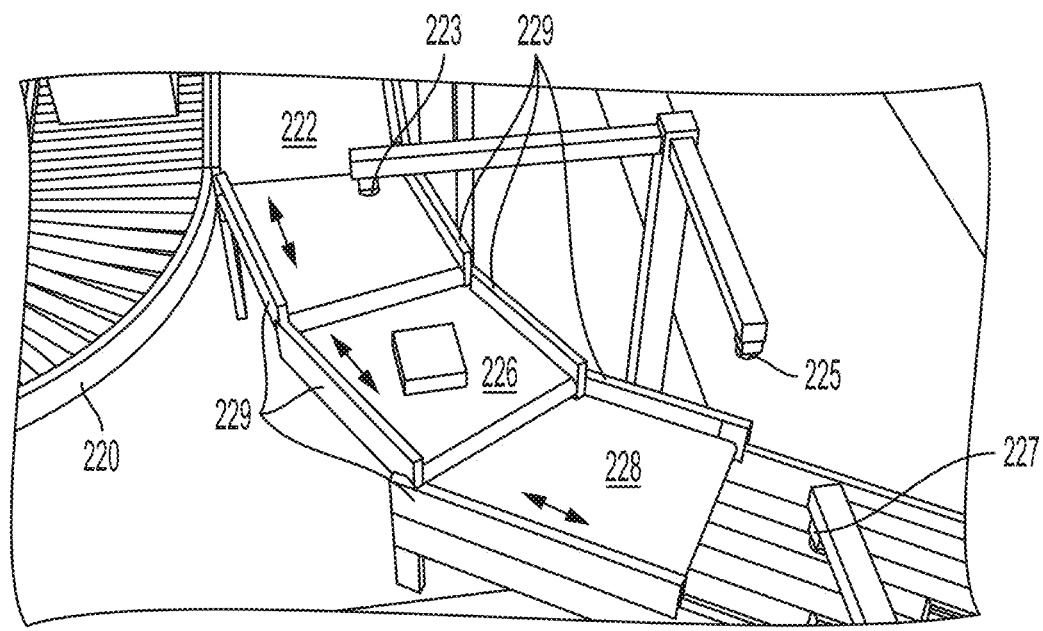
FIG. 35 shows an illustrative diagrammatic view of a conveyor section for use in the processing station of FIG. 29, showing a multi-stage multi-directional plurality of conveyors.
Figure 36:
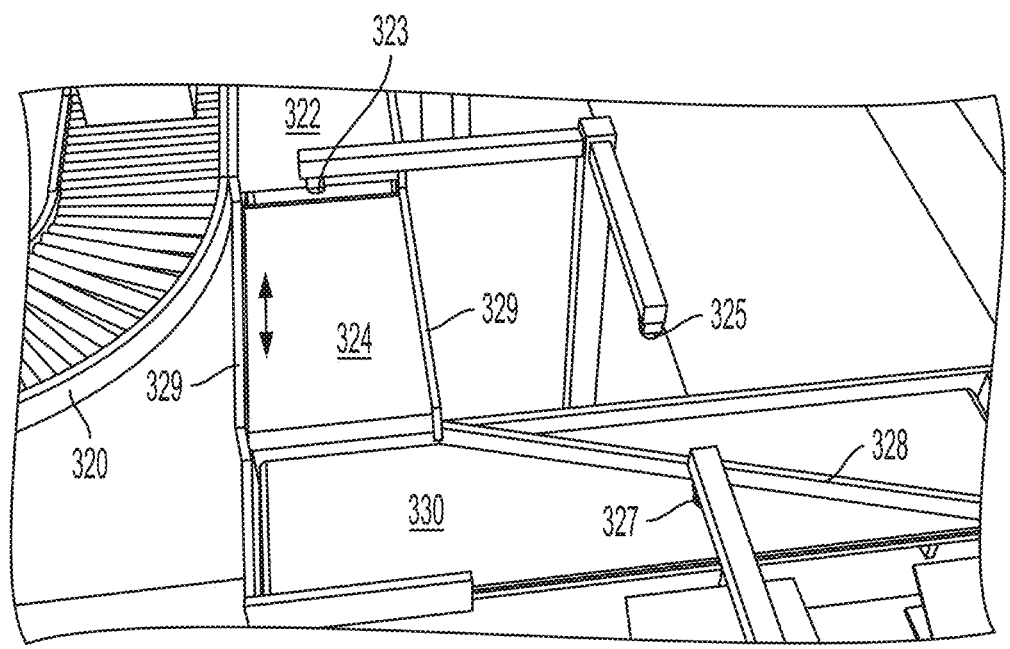
FIG. 36 shows an illustrative diagrammatic view of an alternate conveyor section for use in the processing station of FIG. 29, showing a single-stage multi-direction conveyor section.
Figure 37:
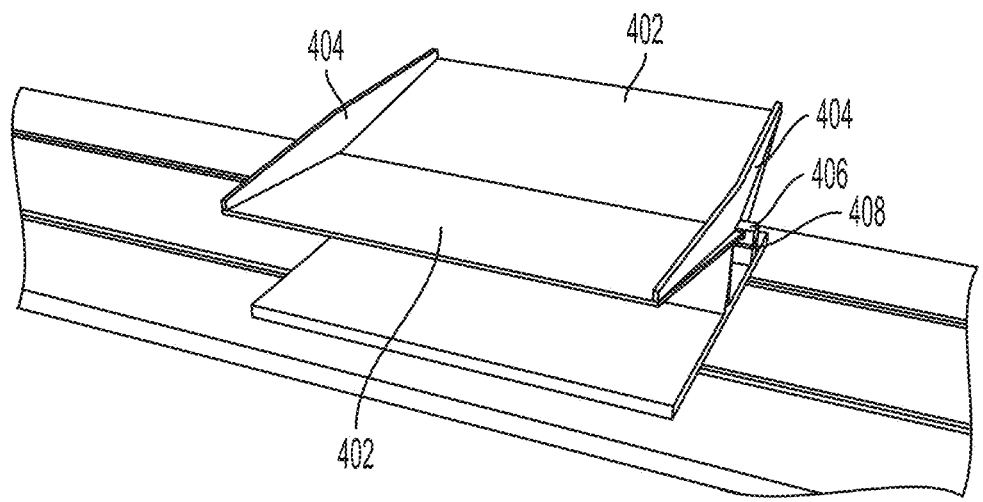
FIG. 37 shows a weight-sensing tilt-tray in the output processing system of FIG. 29, showing tilt actuators and mounting of the tilt-tray bed on weight sensors with the tilt-tray bed in a loading position.
Figure 38:
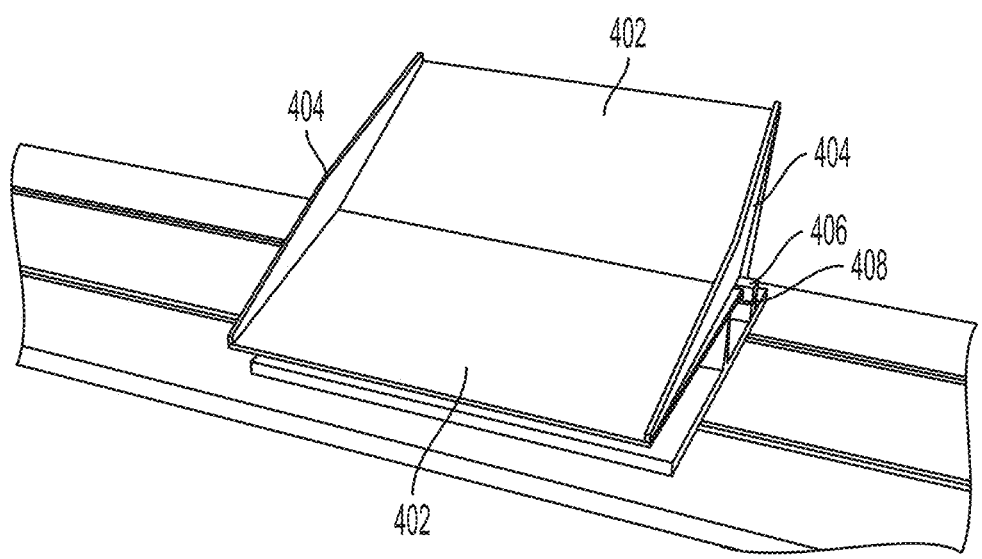
FIG. 38 shows the weight-sensing tilt-tray of FIG. 37 with the tilt-tray bed in an unloading position.

Movement of objects on the conveyors and on the tilt-trays may also be contained in the systems of FIGS. 18-34 by using a combination of walls as well as perception systems and conveyor motion. In particular, FIG. 35 shows conveyor sections 224, 226 and 228 of the system of FIGS. 18-28 with walls 229 for containing any objects with low position authority (e.g., that may roll). Additionally, each conveyor section 224, 226, 228 may move in a reverse direction (responsive to input from the perception units 223, 225) to further contain objects on the conveyor sections 224, 226, 228. Similarly, FIG. 36 shows conveyor section 324 of the system of FIGS. 29-34 with walls 329 for containing any objects with low position authority (e.g., that may roll). Additionally, the conveyor section 324 may move in a reverse direction (responsive to input from the perception unit 323) to further contain objects on the conveyor section 324. In both systems, positioning of objects with respect to the sides of the conveyor is accommodated by the transfer system (e.g., the belts 236 or transfer bar 328) to ensure that each object is properly transferred to the designated tilt-tray. With reference to FIG. 37, the tilt-trays 262, 362 (as shown in FIG. 37 at 402) may each also include walls 404 to facilitate maintaining objects on the tilt-trays during transfer to the tilt-trays and during movement along the tilt-tray conveyors 260, 360. FIG. 38 shows the tilt-tray 402 of FIG. 37 in the discharge position under the control of the actuators 406. As shown at 408, each of the actuators 406 (on both sides) may be mounted on a weight sensor 408 for determining a weight of the content of the tilt-tray, for providing, for example, weight information as discussed above with reference to the systems of FIGS. 18-35. The weight sensors 408 may be used to any of confirm the receipt of an object as well as discharge of the object from the tilt-tray.

Those skilled in the art will appreciate that numerous modifications and variations may be made to the above disclosed systems and methods without departing from the spirit and scope of the present invention.

What is claimed is:

1. A dynamic movement analytics system, comprising:
a programmable motion device including an end-effector;
a tilt-tray conveyor comprising a plurality of tilt-trays;
a perception transfer system including a plurality of conveyors for receiving an object from the end-effector and for moving the object toward the tilt-tray conveyor moving in a first direction at a first speed, the plurality of conveyors of said perception transfer system including a perception conveyor, a transfer conveyor, and a buffer conveyor disposed between the perception conveyor and the transfer conveyor,
the perception conveyor including at least one perception unit for providing perception data regarding any of weight, shape, pose authority, position authority or identity information regarding the object,
the buffer conveyor receiving the object from the perception conveyor and selectively providing the object to the transfer conveyor,
the transfer conveyor including a differentially belted conveyor section having a plurality of varying length belt conveyors, wherein each of the plurality of varying length belt conveyors is operated to move the object in a direction at a speed that matches the first direction at the first speed of the tilt-tray conveyor for transferring the object to a designated tilt-tray among the plurality of tilt-trays;

and
  a plurality of perception units for monitoring a position of the object on the buffer conveyor and the designated tilt-tray, wherein the buffer conveyor selectively provides the object to the transfer conveyor by moving the object onto the differentially belted conveyor section of the transfer conveyor once the designated tilt-tray is aligned with the position of the object on the buffer conveyor.

2. The dynamic movement analytics system as claimed in claim 1, wherein at least one perception unit of the perception conveyor includes at least one optical perception unit and at least one weight detection sensor that together provide perception information regarding any of weight data, 3D information, barcode information, RFID information, label information, color, color combinations, and shapes.

3. The dynamic movement analytics system as claimed in claim 1, wherein the at least one perception unit of the perception conveyor includes a weight detecting sensor.

4. The dynamic movement analytics system as claimed in claim 1, wherein each of the plurality of conveyors is operable at independently variable speeds.

5. The dynamic movement analytics system as claimed in claim 1, wherein the tilt-tray conveyor includes weight sensing tilt-trays.

6. The dynamic movement analytics system as claimed in claim 1, wherein the tilt-tray conveyor leads to a plurality of destination locations, each destination location including at least one associated guide wall for guiding the object from the designated tilt-tray into a selected destination location.

7. A dynamic movement analytics system, comprising;
  a programmable motion device including an end-effector;
  a tilt-tray conveyor comprising a plurality of tilt-trays;
  a perception transfer system including a plurality of conveyors for receiving an object from the end-effector and for moving the object toward the tilt-tray conveyor moving in a first direction at a first speed, the plurality of conveyors of said perception transfer system including a weight sensing conveyor, a transfer conveyor, and a buffer conveyor between the weight sensing conveyor and the transfer conveyor,
    the weight sensing conveyor including a plurality of weight detection sensors for determining any of weight, footprint, center of mass, position authority, or pose authority of the object,
    the buffer conveyor receiving the object from the weight sensing conveyor and selectively providing the object to the transfer conveyor, and
    the transfer conveyor being operated to move the object in a direction at a speed that matches the first direction at the first speed of the tilt-tray conveyor for transferring the object to a designated tilt-tray among the plurality of tilt-trays; and
  a plurality of perception units for monitoring a position of the object on the buffer conveyor and the designated tilt-tray, wherein the buffer conveyor selectively provides the object to the transfer conveyor by moving the object onto the transfer conveyor once the designated tilt-tray is aligned with the position of the object on the buffer conveyor.

8. The dynamic movement analytics system as claimed in claim 7, further comprising at least one optical perception unit and the at least one weight detection sensor together provide perception information regarding any of weight data, 3D information, barcode information, RFID information, label information, color, color combinations, and shapes.

9. The dynamic movement analytics system as claimed in claim 7, wherein each of the plurality of conveyors is operable at independently variable speeds.

10. The dynamic movement analytics system as claimed in claim 7, wherein the tilt-tray conveyor includes weight sensing tilt-trays.

11. The dynamic movement analytics system as claimed in claim 7, wherein the transfer conveyor includes a plurality of transfer conveyor belts, each of the plurality of transfer conveyor belts having a different length.

12. The dynamic movement analytics system as claimed in claim 7, wherein the transfer conveyor includes a guide for urging objects from the transfer conveyor onto the tilt-tray conveyor.

13. The dynamic movement analytics system as claimed in claim 7, wherein the tilt-tray conveyor leads to a plurality of destination locations, each destination location including at least one associated guide wall for guiding an object from the object from the designated tilt tray into a selected destination location.

14. A dynamic movement analytics system, comprising;
  a programmable motion device including an end-effector;
  a conveyor loop that leads to a plurality of destination locations;
  a perception transfer system including a plurality of conveyors for receiving an object from the end-effector and for moving the object toward the conveyor loop moving in a first direction at a first speed, the plurality of conveyors of said perception transfer system including a perception conveyor, a transfer conveyor, and a buffer conveyor between the perception conveyor and the transfer conveyor,
    the perception conveyor including a perception unit for providing perception data regarding the object,
    the buffer conveyor receiving the object from the perception conveyor and selectively providing the object to the transfer conveyor, and
    the transfer conveyor being operated to move the object in a direction at a speed that matches the first direction at the first speed of the conveyor loop for transferring the object to a designated section of the conveyor loop;
and
  a plurality of perception units for monitoring a position of the object on the buffer conveyor and the designated section of the conveyor loop, wherein the buffer conveyor moves the object onto the transfer conveyor once the designated section of the conveyor loop is aligned with the position of the object on the buffer conveyor.

15. The dynamic movement analytics system as claimed in claim 14, wherein the perception unit of the perception conveyor includes at least one optical perception unit and at least one weight detection sensor that together provide perception information regarding any of weight data, 3D information, barcode information, RFID information, label information, color, color combinations, and shapes.

16. The dynamic movement analytics system as claimed in claim 14, wherein the perception unit of the perception conveyor includes a weight detecting sensor.

17. The dynamic movement analytics system as claimed in claim 14, wherein each of the plurality of conveyors is operable at independently variable speeds.

18. The dynamic movement analytics system as claimed in claim 14, wherein the transfer conveyor includes a plurality of transfer conveyor belts, each of the plurality of transfer conveyor belts having a different length.

19. The dynamic movement analytics system as claimed in claim 14, wherein the conveyor loop is a tilt-tray conveyor loop, and wherein the transfer conveyor provides objects onto a designated tilt-tray of the tilt-tray conveyor loop.

20. The dynamic movement analytics system as claimed in claim 19, wherein the tilt-tray conveyor loop includes weight sensing tilt-trays.

21. The dynamic movement analytics system as claimed in claim 19, wherein the transfer conveyor includes a guide for urging objects from the transfer conveyor onto the tilt-tray conveyor loop.

22. The dynamic movement analytics system as claimed in claim 19, wherein the tilt-tray conveyor loop leads to the plurality of destination locations, each destination location including at least one associated guide wall for guiding the object from the designated tilt tray into a selected destination location.

23. A method of processing objects comprising:
  moving an object from an input area using a programmable motion device including an end-effector;
  receiving the object from the end-effector of the programmable motion device on a perception conveyor, wherein the perception conveyor includes a perception unit;
  providing perception data regarding any of weight, shape, pose authority, position authority or identity information regarding the object by the perception unit of the perception conveyor;
  moving the object from the perception conveyor to a buffer conveyor;
  monitoring a position of the object on the buffer conveyor and a designated tilt-tray of a tilt-tray conveyor;
  moving the object from the buffer conveyor to a transfer conveyor once the designated tilt-tray is aligned with the position of the object on the buffer conveyor;
  moving the object along the transfer conveyor in a direction at a speed that matches a first direction at a first speed of the designated tilt-tray of the tilt-tray conveyor; and
  transferring the object to the designated tilt-tray of the tilt-tray conveyor.

24. The method as claimed in claim 23, wherein providing the perception data includes providing perception information regarding any of weight data, 3D information from 3D scanners, barcode information, RFID information from RFID scanners, label information, color, color combinations, and shapes.

* * * * *